United States Patent
Cohen et al.

(10) Patent No.: US 10,761,712 B2
(45) Date of Patent: Sep. 1, 2020

(54) ANCHORING VIEWPORT

(71) Applicant: Apple Inc., Cupertino, CA (US)

(72) Inventors: Michael Cohen, San Francisco, CA (US); Alexis Allison Iskander, San Jose, CA (US); Brian Kirsch, Honolulu, HI (US); Mischa McLachlan, San Francisco, CA (US); Ramiro Calvo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 15/660,759

(22) Filed: Jul. 26, 2017

(65) Prior Publication Data

US 2017/0322694 A1   Nov. 9, 2017

Related U.S. Application Data

(63) Continuation of application No. 14/502,975, filed on Sep. 30, 2014, now Pat. No. 9,841,887.

(60) Provisional application No. 62/042,773, filed on Aug. 27, 2014.

(51) Int. Cl.
| | |
|---|---|
| *G06F 3/048* | (2013.01) |
| *G06F 3/0485* | (2013.01) |
| *G06F 3/0482* | (2013.01) |
| *G06F 3/0488* | (2013.01) |
| *G06F 3/0481* | (2013.01) |

(52) U.S. Cl.
CPC .......... *G06F 3/0485* (2013.01); *G06F 3/0482* (2013.01); *G06F 3/0488* (2013.01); *G06F 3/04817* (2013.01)

(58) Field of Classification Search
None
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |

(Continued)

OTHER PUBLICATIONS

Non-Final Office Action received for U.S. Appl. No. 14/502,975, dated Sep. 16, 2016, 19 pages.

(Continued)

*Primary Examiner* — Claudia Dragoescu
(74) *Attorney, Agent, or Firm* — Dentons US LLP

(57) ABSTRACT

The present disclosure relates to techniques of configuring a layout of graphical objects for display. In one example process, the device detects a scroll request and determines whether the scroll request meets predetermined criteria. If the scroll request meets the criteria, the device configures the layout of graphical objects that are to be displayed once the display is scrolled so that the graphical objects are arranged on the display differently than the arrangement in which the graphical objects would have been displayed, had the layout not been configured. If the scroll request does not meet the criteria, the device forgoes the configuration of the layout of graphical objects.

60 Claims, 39 Drawing Sheets

(56) References Cited

U.S. PATENT DOCUMENTS

| | | |
|---|---|---|
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 2002/0015024 A1 | 2/2002 | Westerman et al. |
| 2005/0190059 A1 | 9/2005 | Wehrenberg |
| 2006/0017692 A1 | 1/2006 | Wehrenberg et al. |
| 2006/0026536 A1 | 2/2006 | Hotelling et al. |
| 2006/0033724 A1 | 2/2006 | Chaudhri et al. |
| 2006/0197753 A1 | 9/2006 | Hotelling |
| 2008/0320391 A1 | 12/2008 | Lemay et al. |
| 2011/0145737 A1 | 6/2011 | Laugwitz et al. |
| 2012/0110499 A1* | 5/2012 | Hance ............... G06F 9/452 715/781 |
| 2012/0299933 A1* | 11/2012 | Lau ................... G06T 13/80 345/473 |
| 2014/0101609 A1 | 4/2014 | Bamford et al. |
| 2014/0250371 A1* | 9/2014 | Wabyick ............ G06F 17/21 715/243 |
| 2015/0186012 A1* | 7/2015 | Coleman ........... G06F 3/04842 715/752 |
| 2016/0062584 A1 | 3/2016 | Cohen et al. |
| 2016/0065505 A1 | 3/2016 | Iskander |

OTHER PUBLICATIONS

Non-Final Office Action received for U.S. Appl. No. 14/503,041, dated Sep. 29, 2016, 22 pages.

Notice of Allowance received for U.S. Appl. No. 14/502,975, dated Mar. 30, 2017, 10 pages.

Notice of Allowance received for U.S. Appl. No. 14/502,975, dated Sep. 15, 2017, 10 pages.

Notice of Allowance received for U.S. Appl. No. 14/503,041, dated Apr. 12, 2017, 9 pages.

Notice of Allowance received for U.S. Appl. No. 14/503,041, dated Sep. 15, 2017, 7 pages.

* cited by examiner

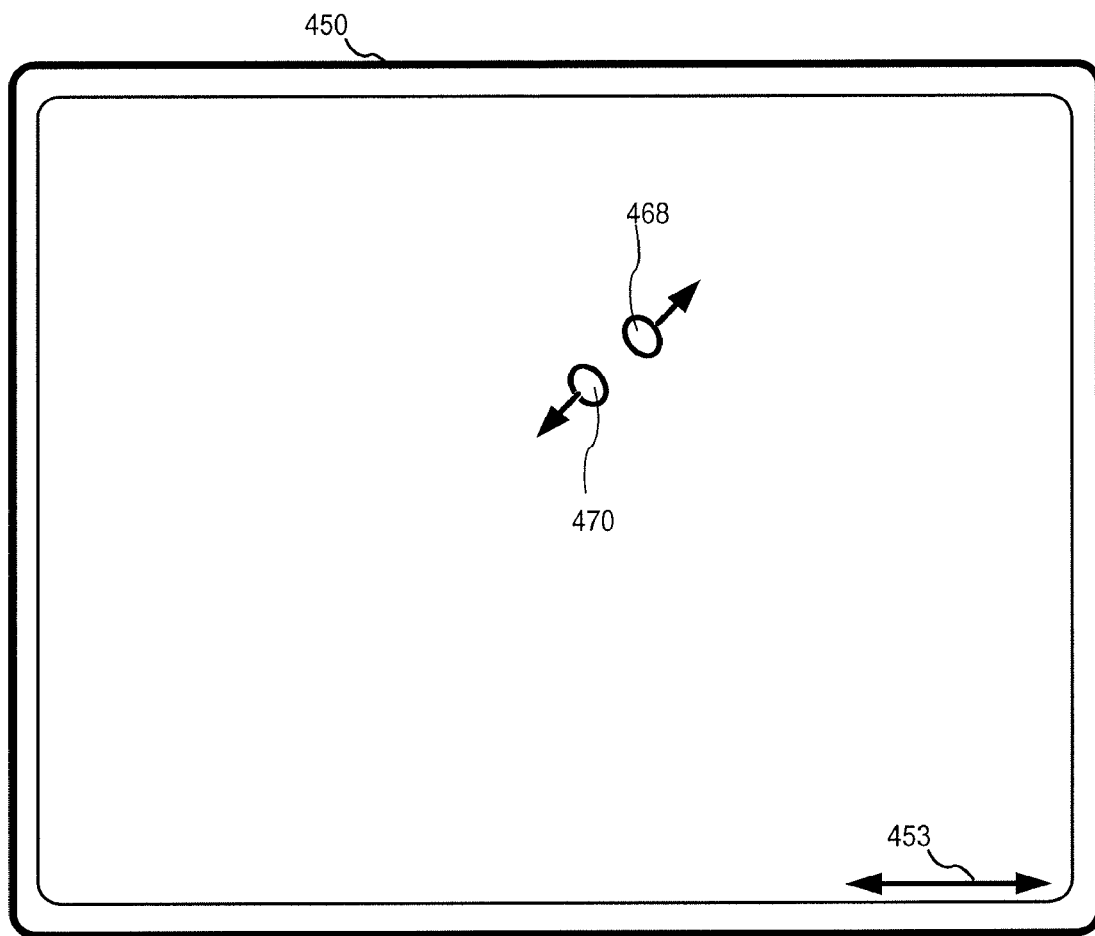
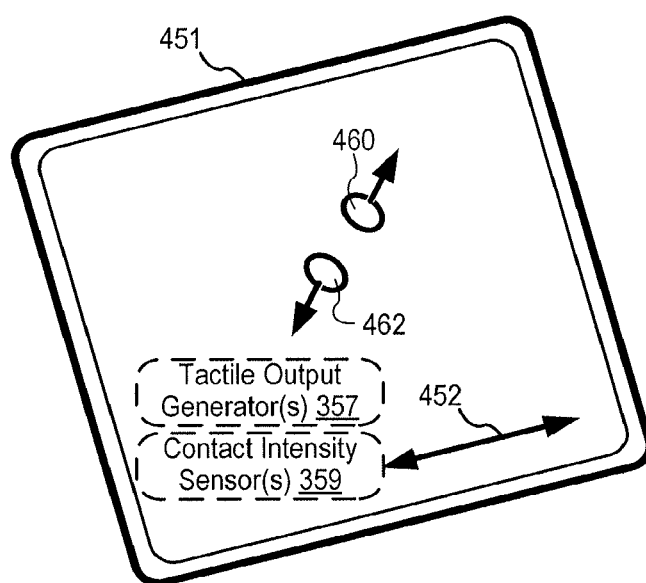
FIG. 4B

716 If determined that the detected change is associated with a location after the anchor within the subset, configure layout of graphical representations in accordance with the detected change in the collection 716-1 The layout is configured so that the subset of graphical representations, displayed on the display, are arranged in a second direction starting from the anchor in the subset 716-2 The second direction is different from the first direction 716-3 The second direction is opposite from the first direction 716-4 Arranging in the first direction is arranging in a plurality of columns and rows from bottom right to top left 716-5 Arranging in the second direction is arranging in a plurality of columns and rows from top left to bottom right 716-6 Displaying animation of moving one or more graphical representations on the display 716-7 Maintaining the display of the graphical representation of the data object corresponding to the anchor on the display 718 Detect an input corresponding to a request to scroll the display to display a view of one or more graphical representations after the subset 720 Display the graphical representations of the one or more data objects after the subset as being arranged in the second direction starting from the anchor in the subset 720-1 Anchor changes as the display is scrolled to display a view different from the view of the subset

FIG. 7C

722 If determined that the detected change is associated with a location below the subset, configure the layout of graphical representations of data objects below the subset in accordance with the detected change in the collection

722-1 The layout is configured so that graphical representations below the subset are arranged in the second direction starting from the anchor in the subset

722-2 Anchor in the subset is a graphical representation in the subset that is displayed in a predetermined position in a window of the display

722-3 A predefined position is the top left area in the window of the display

724 Maintain the display of the view of the subset on the display

726 Detect an input corresponding to a request to scroll the display to display a view of one or more data objects below the subset

728 Display the view of one or more data objects below the subset, wherein displaying the view of the one or more data objects below the subset comprises displaying graphical representations of the one or more data objects below the subset arranged in the second direction starting from the anchor in the subset

728-1 The anchor changes as the display is scrolled to display a view different from the view of the subset

802 Display a subset of graphical representations of data objects in a collection

802-1 Displaying the subset comprises displaying graphical representations in the subset arranged in an order in a plurality of columns and rows

802-2 One or more rows in the plurality of rows above the subset contain a number of graphical representations that is not evenly divisible by the number of columns in the plurality of columns

802-3 detecting a change in the collection of data objects that causes the one or more rows in the plurality of rows above the subset to contain the number of graphical representations that is not evenly divisible by the number of columns

802-4 detecting a change in display properties associated with the display of the subset that causes the one or more rows in the plurality of rows Above the subset to contain the number of graphical representations that is not evenly divisible by the number of columns.

804 Detect an input corresponding to a request to scroll the display to display one or more graphical representations above the subset

806 Determine whether the detected input meets the layout-adjustment criteria

806-1 Adjustment criteria are met when the detected input corresponds to a request to scroll the display to display a view of a different subset of graphical representations that are non-overlapping with the first subset

806-2 Adjustment criteria are met when the detected input corresponds to a request to scroll the display to display a graphical representation representing the beginning data object in the collection

806-3 Adjustment criteria are met when the detected input is movement of a finger on the display, and the detected movement is associated with a speed greater than or equal to a threshold speed

806-4 Adjustment criteria are met when the detected input is movement of a finger on the display, and the detected movement on the display is associated with a distance greater than or equal to a threshold distance on the display

FIG. 8A

808 In accordance with a determination that the detected input does not meet the layout-adjustment criteria, scroll the display in accordance with the detected input to display one or more graphical representations above the subset 808-1 The one or more rows in the plurality of rows above the subset continues to contain the number of Graphical representations not evenly divisible by the number of columns 808-2 The one or more rows in the plurality of rows above the subset includes the top row in the plurality of rows 808-3 Forgo configuring the layout of graphical representations

810 In accordance with a determination that the detected input meets the layout-adjustment criteria, configure the layout of graphical representations, so that the one or more rows in the plurality of rows above the subset contains a different number of data objects that is evenly divisible by the number of columns 812 Scroll the display in accordance with the detected input to display one or more graphical representations above the subset 812-1 displaying a predefined visual effect before displaying the one or more graphical representations above the subset on the display

FIG. 8B

ANCHORING VIEWPORT

RELATED APPLICATION

This application is a Continuation of U.S. Non-Provisional application Ser. No. 14/502,975, filed Sep. 30, 2014 which claims priority to U.S. Provisional Application Ser. No. 62/042,773, filed Aug. 27, 2014, which is incorporated herein in its entirety. This application relates to the following provisional application: U.S. Provisional Application Ser. No. 62/042,779, "Anchored Approach To Scrolling," filed Aug. 27, 2014, which is incorporated by reference herein in its entirety.

FIELD

This application relates generally to displaying multiple graphical objects on a display, and, more specifically, to techniques for configuring a layout of graphical objects for display.

BACKGROUND

Some modern computing devices simultaneously display multiple graphical objects. In order to deliver an organized view of multiple graphical objects, some devices configure a layout of multiple graphical objects using the layout to determine how the multiple graphical objects are to be arranged in a designated portion of the display. As such, the determination of the layout of graphical objects affects the overall readability and display quality of the displayed content.

BRIEF SUMMARY

Some techniques for configuring the layout of graphical objects for display, however, are inefficient and suboptimal. For example, some conditions that the device took into consideration to determine the layout of graphical objects for display can be changed while the graphical objects are already displayed, rendering the current display of the objects substandard. Accordingly, in order to ensure that users experience the optimized display quality at all relevant times, regardless of the various changes that occur while the device is already displaying graphical objects in certain arrangement, a more flexible layout configuration technique is needed, which permits the device to dynamically adjust the layout of the graphical objects in response to the various changes that are detected during the display.

In some embodiments, an electronic device with a display is provided. The device displays a subset of graphical representations of data objects in a collection. The graphical representations are arranged in an order. While displaying the subset, the device detects a change in the collection of data objects. In response to detecting the change in the collection, the device determines whether the detected change is associated with a location above the subset of graphical representations of data objects in the collection. In accordance with a determination that the detected change is associated with a location above the subset of graphical representations of data objects in the collection, the device configures the layout of graphical representations in accordance with the detected change in the collection (e.g., so that the updated layout of the graphical representations reflects the change). The layout of graphical representations is configured such that the graphical representations of data objects above the subset are arranged in a first direction starting from an anchor in the subset. This configuration does not disturb the layout of graphical representations in the subset (that is currently displayed). Therefore, the device can preserve the consistency of the display of the subset of graphical representations. The changed arrangement of the graphical representations above the subset is not displayed until the display is scrolled up to display the graphical representations above the subset.

In some embodiments, the device determines that the detected change is associated with a location after the anchor within the subset of graphical representations. In response, the device configures the layout of graphical representations in accordance with the detected change, which results in an adjustment of the layout of graphical representations of the subset. The layout of graphical representations is configured so that the graphical representations before the anchor are arranged in a first direction, and the graphical representations after the anchor are arranged in a second direction (different from the first direction) starting from the anchor in the subset. These changes are made to the layout of the graphical representations of the subset (that is currently displayed), and therefore, can be displayed as an animation of moving graphical representations. Optionally, the second direction is opposite the first direction. Optionally, arranging in the first direction is arranging from bottom right to top left in a grid, and arranging in the second direction is arranging from top left to bottom right in a grid.

In some embodiments, the device determines that the detected change is associated with a location below the subset of graphical representations of data objects in the collection. In response, the device configures the layout of graphical representations below the subset in accordance with the detected change in the collection (e.g., so that the updated layout of the graphical representations reflects the change). The layout of graphical representations is configured such that the graphical representations of data objects below the subset are arranged in a second direction starting from an anchor in the subset. This configuration does not disturb the layout of graphical representations in the subset (that is currently displayed). Therefore, the device can preserve the consistency of the display of the subset of graphical representations. The changed arrangement of the graphical representations below the subset is not displayed until the display is scrolled down to display the graphical representations below the subset.

In some embodiments, the device displays a subset of graphical representations of data objects in a collection. The subset of graphical representations are arranged in an order in a plurality of columns and rows, and one or more rows in the plurality of rows above the subset (e.g., a row containing an anchor in the subset) include a number of graphical representations that is not evenly divisible by the number of columns in the plurality of columns. The device detects an input corresponding to a request to scroll the display to display one or more graphical representations above the subset and determines whether the detected scrolling input meets the layout-adjustment criteria. In accordance with a determination that the detected input meets the layout-adjustment criteria, the device configures the layout of graphical representations above the subset, so that the rows above the subset (e.g., above the row containing the anchor in the subset) include a different number of graphical representations that is evenly divisible by the number of columns after the configuration of the layout is complete. The device scrolls the display in accordance with the detected input to display the one or more graphical representations according to the configured layout.

In some embodiments, in accordance with a determination that the detected input does not meet the layout-adjustment criteria, the device forgoes the configuration of the layout of the graphical representations above the subset and scrolls the display in accordance with the detected input, with the rows above the subset (e.g., above the row containing the anchor in the subset) continuing to include the number of graphical representations that is not evenly divisible by the number of columns in the plurality of columns. In this case, since the layout of the graphical representations remains the same as before the detection of the scroll input and after the detection, the continuity and consistency of the display is preserved between the pre-scroll display layout of the graphical objects and the post-scroll display layout of the graphical objects.

In some embodiments, in accordance with a determination that the detected input meets the layout-adjustment criteria, the device configures the layout of the graphical representations above the subset so that they are displayed on the display (as the display is scrolled in accordance with the detected input) as being arranged toward the beginning of the plurality of columns and rows. In accordance with a determination that the detected input does not meet the layout-adjustment criteria, as the display is scrolled in accordance with the detected input, the graphical representations above the subset are displayed on the display as being arranged toward the subset.

In some embodiments, the layout-adjustment criteria are met when the detected input corresponds to a request to scroll the display to display a new subset of graphical representation that are non-overlapping with the subset; when the detected input corresponds to a request to scroll the display to display a graphical representation that corresponds to the beginning of the plurality of columns and rows; when the detected input is movement of a finger on the display, and the movement of the finger is associated with a speed that is greater than or equal to a threshold speed; and/or when the detected input is movement of a finger on the display, and the movement of the finger is associated with a distance that is greater than or equal to a threshold distance.

DESCRIPTION OF THE FIGURES

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7E is an exemplary flow diagram illustrating a process for configuring layout in response to a change in the collection and/or display properties.

FIGS. 8A-8B is an exemplary flow diagram illustrating a process for configuring layout in response to a scroll input.

DETAILED DESCRIPTION

Figure 1A:
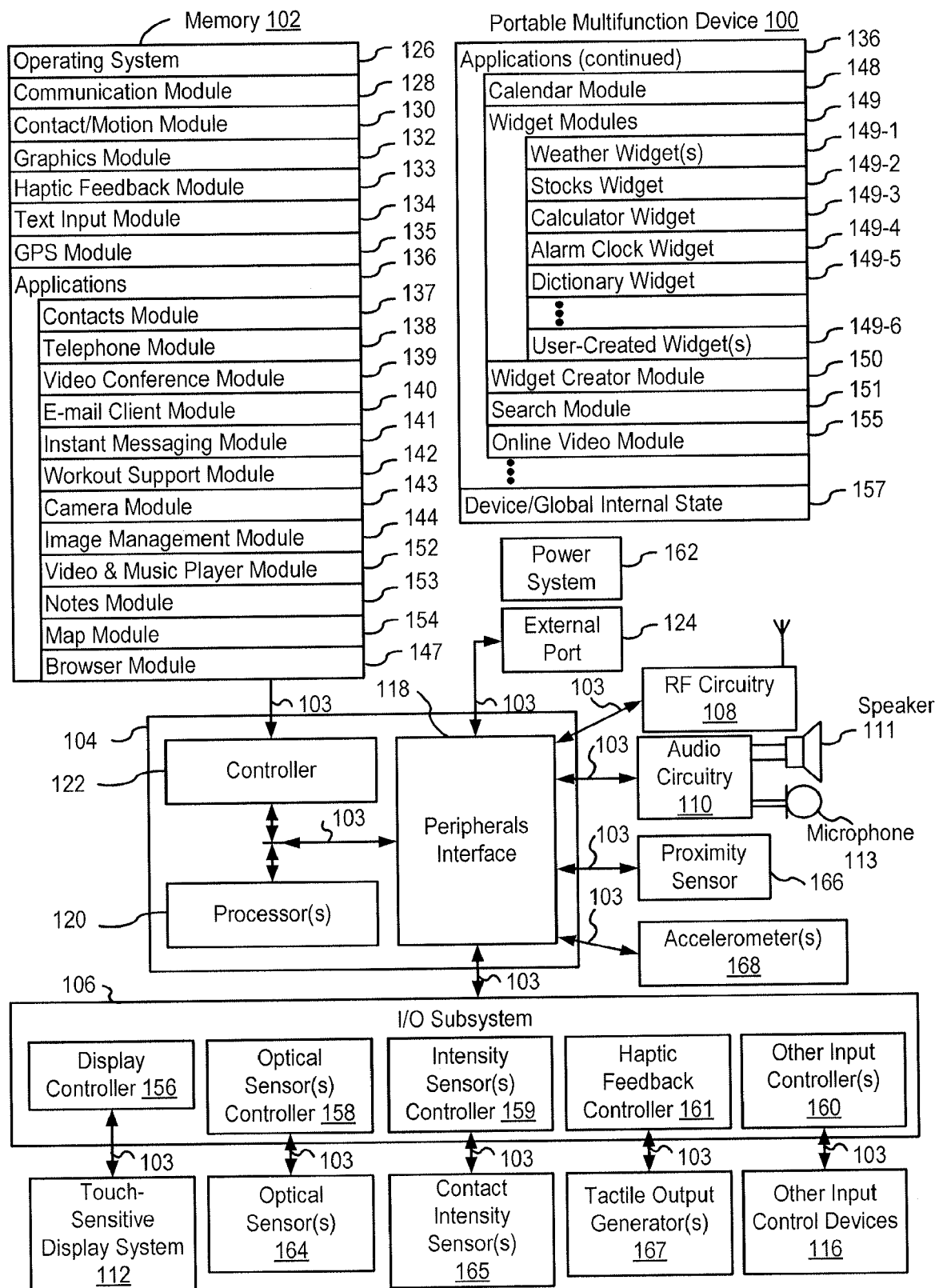
FIG. 1A is a block diagram illustrating a portable multifunction device with a display in accordance with some embodiments.

With increased connectivity and accessibility these days, a modern computing device often accesses data stored on remote devices via a network and display graphical representations of such data for a user of the device without requiring local storage of the data in the device. For example, a web browser displaying web contents includes graphical representations of the data stored in a remote server. Some photo applications allow a device to access a certain collection of image data stored in different devices (e.g., other personal computing devices or a remote server system, sometimes referred to as "cloud storage") through a wirelesses connection (e.g., WiFi or Bluetooth) and to display graphical representations of such data without locally storing the data collection in the device. In some circumstances, a device displays a portion of the collection of data and allows a user to navigate through the collection by changing the portion that is displayed.

Before displaying, a device configures a layout of graphical representations of the portion of the data—e.g., an arrangement indicating how the graphical representations are to be displayed in a window or a page on a display. In some circumstances, a device employs a fixed layout assigned to a particular application or data type, for example, a grid for displaying images or an arbitrary arrangement of content blocks for displaying a mix of text blocks and images (e.g., a webpage), etc.

After the device determines an appropriate layout of the graphical representations based on the above-explained factors and conditions (e.g., data, application, display properties, display device specifications, etc.), the device can start displaying the objects in the determined layout and not configure the layout during display. This helps preserve the continuity and consistency of the display because the layout of the displayed content is undisturbed during display.

However, in some cases, the device detects a change to such factors and conditions it used to determine the current layout, and those changed factors and conditions make the current layout inapplicable or sub-optimal. For example, the device determines a grid layout for displaying graphical representations of five image files (e.g., five photos), and during display of the five photos in the grid, one of the five image files is deleted. In such cases, the device can provide a cleaner view of the remaining four photos if the layout of those photos is adjusted in view of the deleted file, instead of displaying an empty area where the deleted photo used to appear. In some circumstances, the device determines that the displayable area on the display is reduced (e.g., reduced display area on a page or a window), and in response, the device adjusts the layout so that a fewer number of photos are simultaneously displayed to fit the reduced display area.

In some embodiments, a change in the underlying data objects can be made by a different device than the device displaying the graphical representations of such data objects. For example, the data is stored in a remote device, and such data can be accessed by multiple devices at the same time. So, in some circumstances, while one device displays graphical representations of the data, a different device modifies the data. To ensure that the displayed content reflects the current state of the data, a device configures the layout of graphical representations dynamically in response to the changing conditions in the data. Optionally, when configuring the layout of graphical representation during display, the device chooses the layout that will cause the least amount of disturbance to the overall readability of the displayed content. Further, there are many other various factors and conditions (e.g., conditions specific to the display device, conditions specific to the data or any other conditions that affect the viewport of the display device) that can be used to trigger configuration of the layout (e.g., adjustment of the layout) during display to optimize display quality regardless of the changing conditions.

Further, in some embodiments, the device accesses a collection of data objects (e.g., stored on a cloud storage) that includes a large number of data objects. In such cases, the device uses a viewport that permits the device to display graphical representations of only a portion of data objects in the collection and move the viewport to change the portion displayed. This is an efficient way to allow navigation of the entire layout, thus displaying different portions in the layout of the collection. Optionally, the device configures the layout of graphical representations of data objects within the viewport separately from the configuration of the layout of graphical representations of data objects outside the viewport. Optionally, the device configures the layout of graphical representations of data objects within and outside the viewport all together. Optionally, the device further divide up the layout of the collection into different positions (e.g., a portion within the viewport, a portion above the viewport, a portion below the viewport, etc.) and configures the layout of each portion separately or together in any order and/or combination.

In the following description of the disclosure and embodiments, reference is made to the accompanying drawings in which it is shown by way of illustration specific embodiments that can be practiced. It is to be understood that other embodiments and examples can be practiced and changes can be made without departing from the scope of the disclosure.

Below, FIGS. 1A-1B, 2, 3 and 4A-4B provide a description of exemplary devices for dynamically configuring a layout of graphical representations during display. FIGS. 5A-5P illustrate exemplary layout configuration techniques to dynamically configure the layout of graphical representations (corresponding to a collection of data that may be stored in a remote device) while displaying a subset of such graphical representations based on a change made to data (e.g., by a remote device) during display. FIGS. 5Q-5R exemplary layout configuration techniques to dynamically configure the layout of graphical representations while displaying a subset of such graphical representations based on a change made to display properties to optimize the view of the graphical representation on the display. The embodiments illustrated in FIGS. 5A-5R concern a collection of data objects that includes a relatively small number of data objects, for simplicity of drawings. However, the dynamic layout configuration techniques described herein are equally advantageous, if not more, for the applications concerning a collection that includes a large numbers of data objects. For example, in some cases, the techniques are best applicable to devices accessing cloud storage with a large memory space for storing data dumped by multiple devices.

FIGS. 6A-6D exemplary layout configuration techniques to dynamically configure the layout of graphical representations while displaying a subset of such graphical representations based on an input requesting to scroll the display (e.g., to change the portion or subset of graphical representations displayed on the display) to better optimize the view on the display. The techniques illustrated in these figures are also used to illustrate the layout configuration processes described below, including the processes in FIGS. 7A-7E and 8A-8B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals t/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
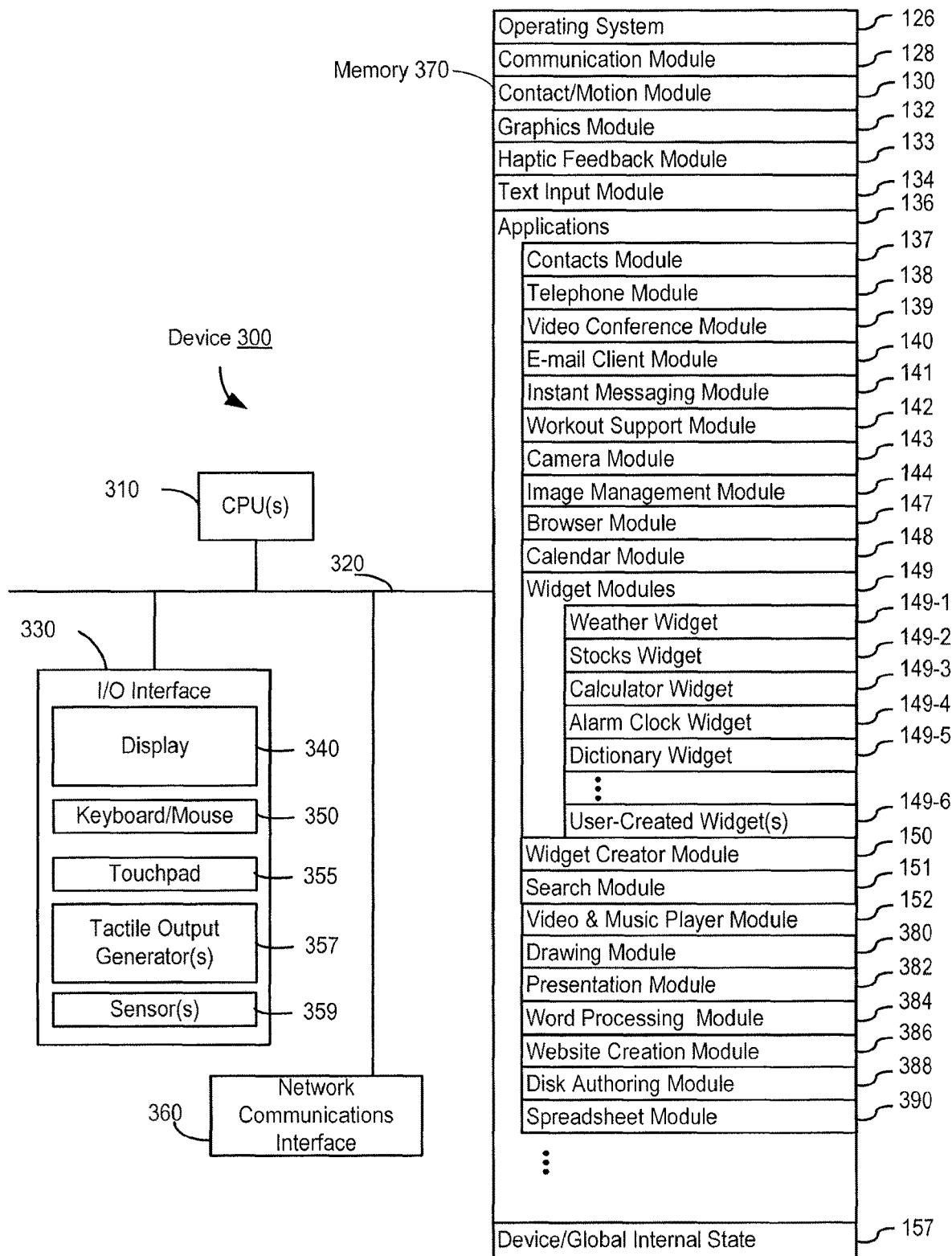
FIG. 3 is a block diagram of an exemplary multifunction device with a display in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:

Contacts module 137 (sometimes called an address book or contact list);
Telephone module 138;
Video conferencing module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
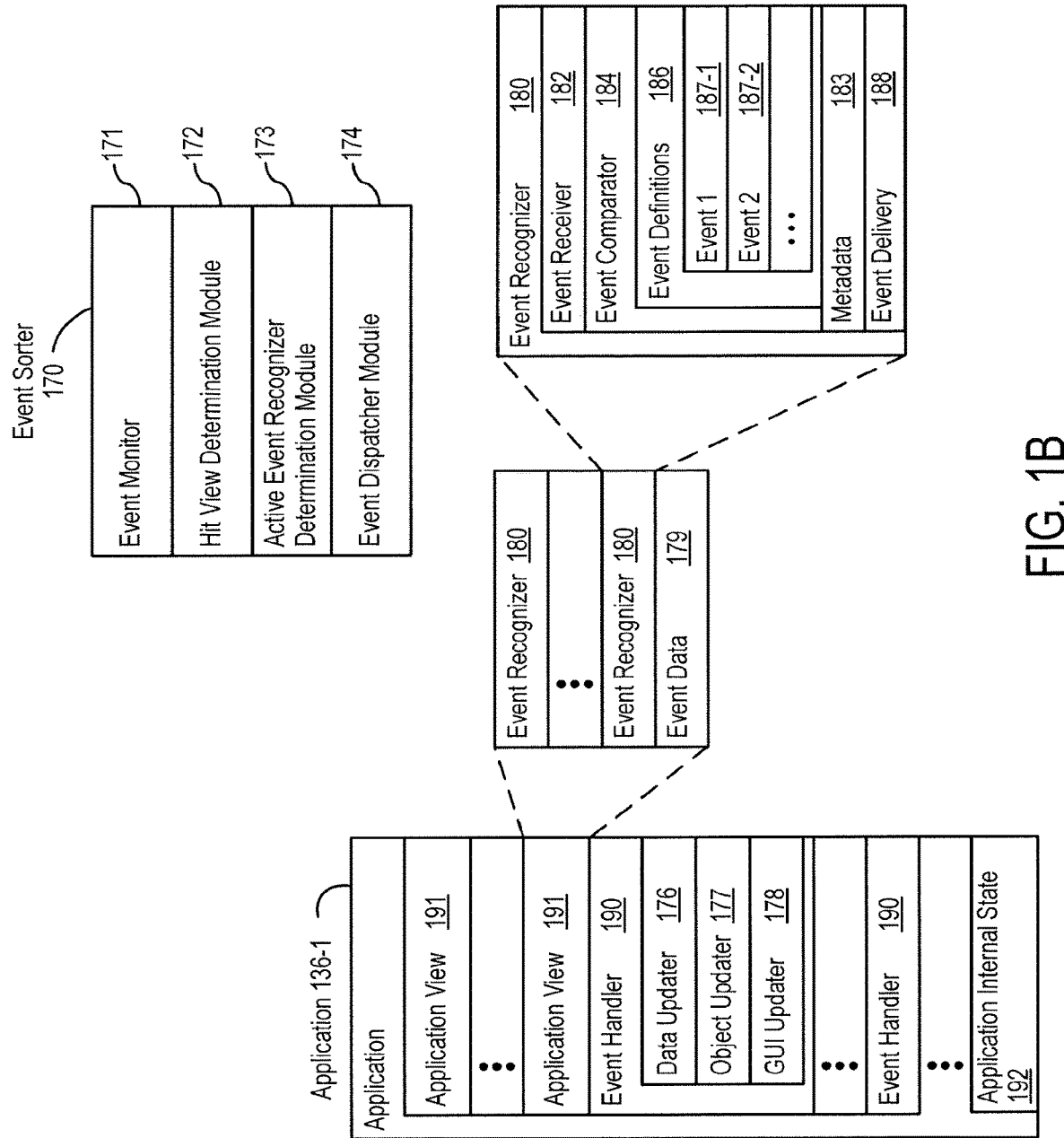
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
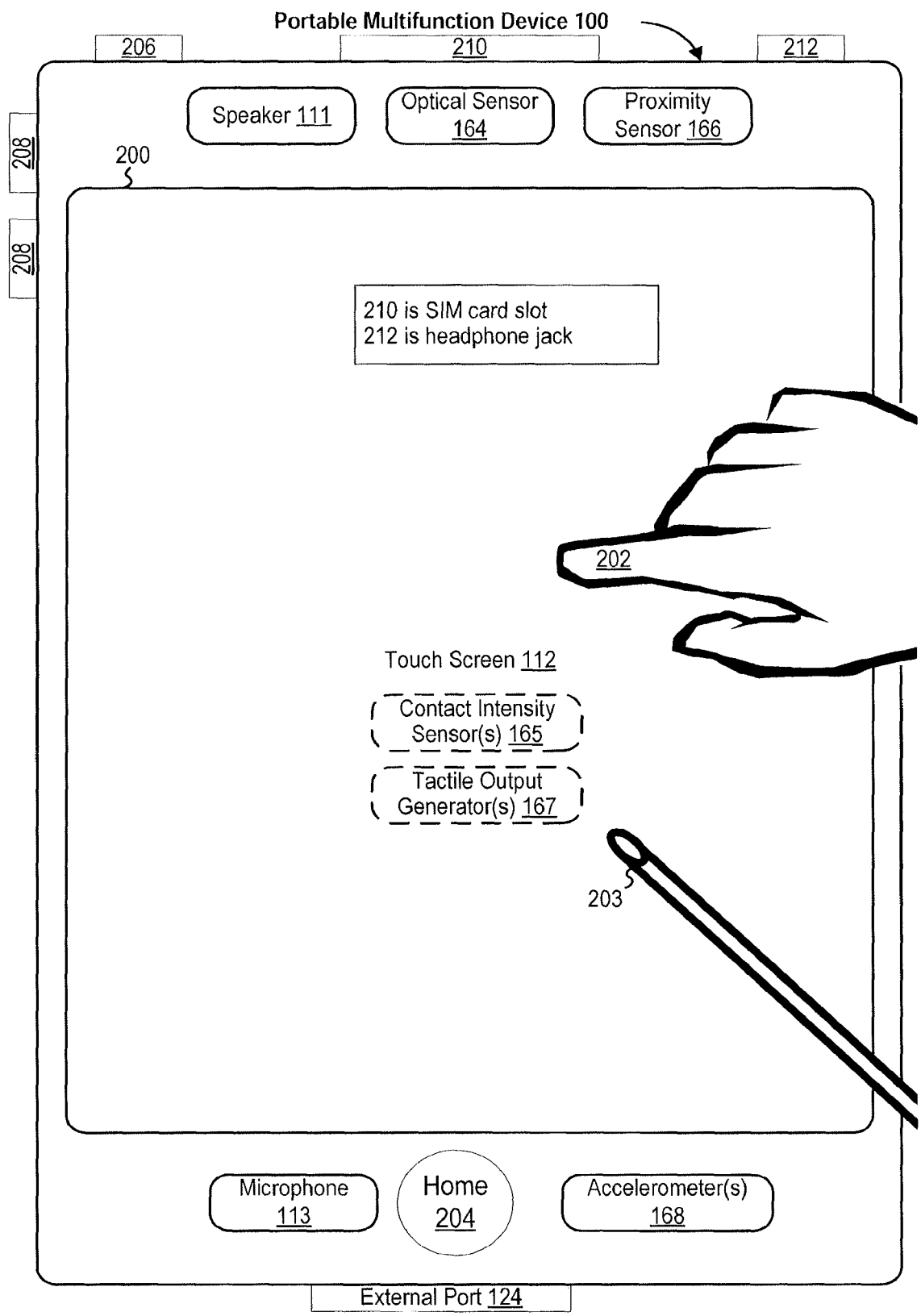
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
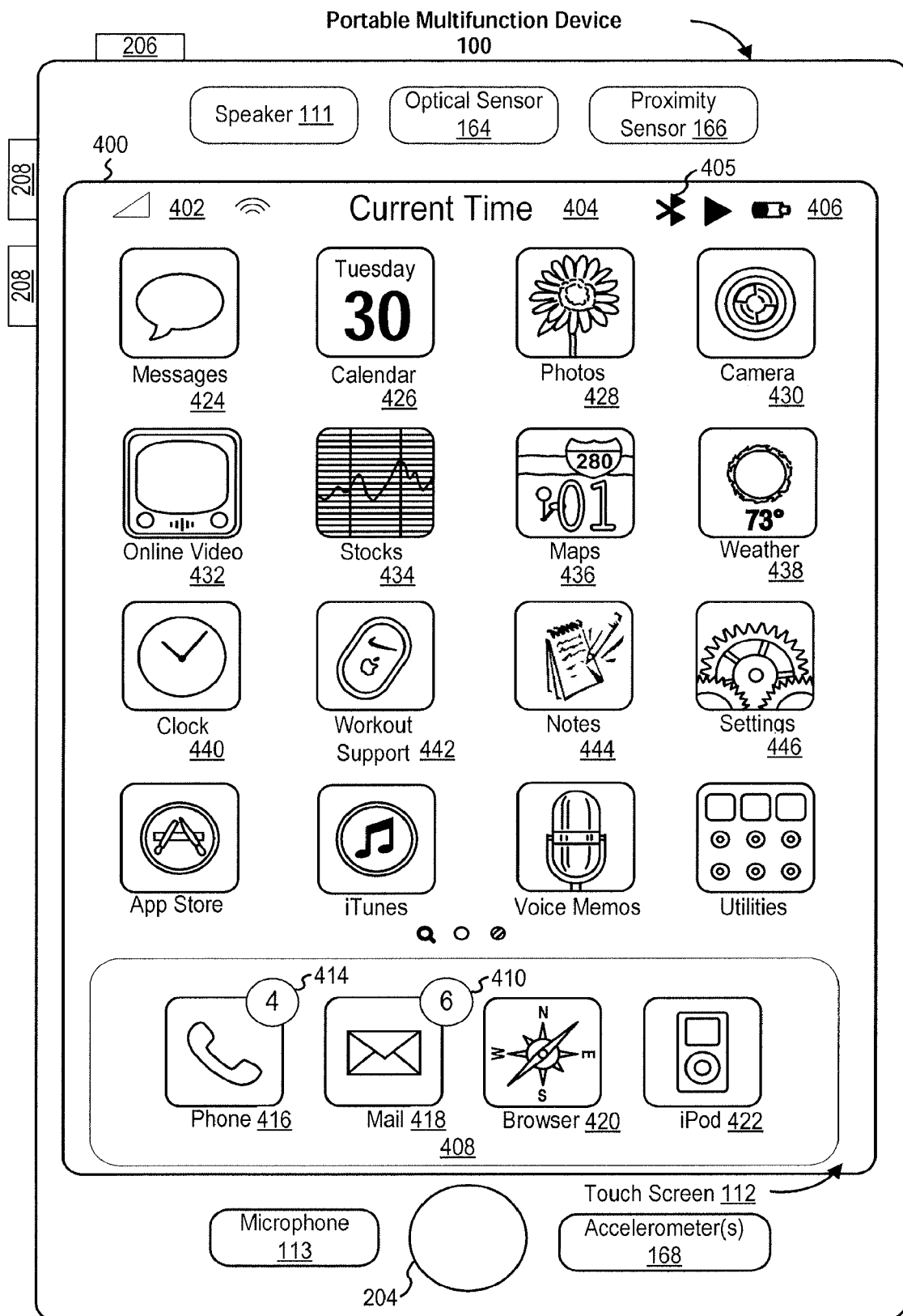
FIG. 4A illustrates an exemplary user interface for a menu of applications on a portable multifunction device in accordance with some embodiments.
Figure 5A:
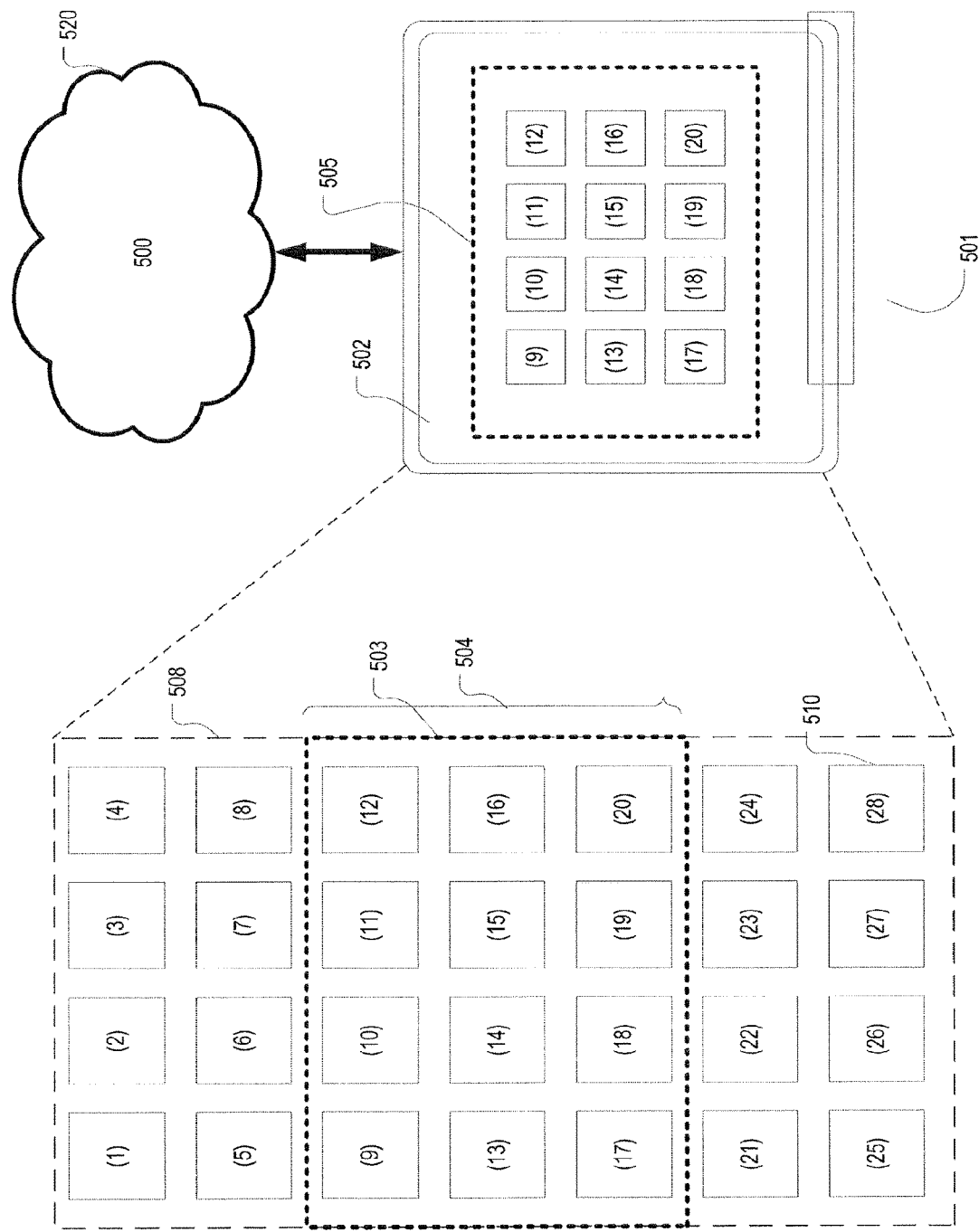
FIGS. 5A-5P illustrate exemplary embodiment of a layout configuration technique for configuring the layout of graphical representations of multiple data objects in a collection, in response to a change in the collection.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used here, the term "affordance" refers to a user-interactive graphical user interface object that may be displayed on the display screen of devices 100 and/or 300 (FIGS. 1 and 3). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that may be implemented on a multifunction device with a display, such as device 300 or portable multifunction device 100.

1. Configuration of Layout of Graphical Objects in Response to a Change in Collection of Data As briefly introduced above, an electronic device accesses a collection of data objects, e.g., stored remotely on a cloud storage, and displays a portion of the collection that is within its viewport. The device navigates through the collection by changing location of the viewport (thus changing the portion that is displayed on a display of the device). Optionally, the collection of data objects are a collection of image files, web contents, texts, video files, software application files, or any combination of these data types, etc. Before displaying the graphical representations of the data objects in the collection within the viewport, the device configures the layout of the graphical representations (e.g., determines how the graphical representations of the data objects within the viewport are to be arranged on the display).

While the device displays the graphical representations of the data objects in the collection within the viewport, a change may be made to the collection—e.g., to a data object within the viewport or outside the viewport. In some embodiments, such a change is made by a remote device different from the device displaying the graphical representations. Optionally, the remote device stores the collection. In some circumstances, the remote device accesses the collection via a cloud network to modify the data in the collection.

In FIG. 5A, device 501 displays graphical representations of data objects in collection 500. Collection 500 is a collection of data objects (e.g., image data, software application data, text data, video data, etc.) stored in cloud storage 520. The cloud storage comprises one or more remote devices distinct from device 501 that are connected via a network (e.g., public or private network, Internet, wireless network like WiFi or Bluetooth). Optionally, graphical representations (1)-(28) are data identifying, or otherwise associated with, the graphical representations of respective data objects in collection 500. Optionally, graphical representations include one or more of images, icons, text blocks, thumbnails, and any other graphical objects suitable for representing data.

In the illustrated example in FIG. 5A, device 501 configures the layout of graphical representations (1)-(28) in matrix 508. Since collection 500 includes more number of data objects than optimal number of data objects for simultaneously display on display 502, device 501 employs viewport 503. With use of viewport 503, device 501 can display only a portion of the collection in matrix 508 that is included in viewport 503 and navigate through the collection by changing the portion included in viewport 503. Optionally, a user of device 501 adjusts the current location of viewport 503 by a scroll input.

In the illustrated example in FIG. 5A, collection 500 is stored on cloud storage 520. Device 501 configures the layout of graphical representations of data objects in collection 500 based on one or more attributes of the data objects in collection 500 (e.g., data type, data size, number of data objects in the collection, etc.) and display properties associated with display 502, window 505, or viewport 503 (e.g., the size of display area, orientation, etc.), and specifically, determines that a four column matrix 508 would be an appropriate layout. Optionally, device 501 locally performs configuring the layout of graphical representations (1)-(28) of data objects in collection 500 stored on cloud storage 520, and this local processing does not affect the actual data objects stored on cloud storage 520. Optionally, device 501 customizes the layout configuration based on the factors and conditions specific to the device such as, the shape and size of display 502, window 505, any input received from a user of device 501, etc. So, in some circumstances, different devices configure the layout of graphical representations of the same data objects differently.

In some embodiments, collection 500 includes a large number of data objects, and viewport 503 includes a smaller number of data objects suitable for concurrent display. Optionally, device 501 generates graphical representations (1)-(28) of data objects in collection 500 and configures the layout using those generated graphical representations of entire collection 500 even though only a portion of such (in viewport 503) is displayed on display 502 at any given time. Optionally, device 501 generates graphical representations (9)-(20) that are within viewport 503 and generate placeholder data (e.g., identifying associated data object in cloud storage 520, corresponding graphical representation and related information including the position of the corresponding graphical representation when displayed on display 502 relative to other representations) for graphical representations (1)-(8) and (21)-(28) outside viewport 503. Optionally, the information in the placeholder data (e.g., the graphical representation layout information included in the placeholder data) is used by device 501 to configure the layout of graphical representations of data objects outside viewport 503, without generation of the full-sized graphical representations of such data objects. In some embodiments, the graphical representations that are referred to as being "outside" of the viewport are potential graphical representations of data objects that are not represented by the set of graphical representations that are displayed in the viewport (e.g., graphical representations that would be displayed if the user scrolled through the graphical representations in the viewport). Such delaying of generation of full-sized graphical representations until necessary (e.g., when viewport 503 is moved to include these graphical representations) can save computational power and memory space of device 501. This technique becomes particularly advantageous if there are a large number of data objects in collection 500 compared to the number that is included in viewport 503.

Optionally, the device configures the layout of graphical representations of the portion of the collection within viewport 503 and delays configuring the layout of graphical representations of other portions outside viewport 503. Optionally, the device configures the layout of different portions in the collection at different times—for example, the device configures the layout of the portion within viewport 503, then configures the layout of the portion above viewport 503, and then configures the layout of the portion below viewport 503. Optionally, the device configures the layout of graphical representations of the portion within viewport 503 and other portions outside viewport 503 at the same time (e.g., generates the layout for the entire collection). Optionally, the device uses the actual graphical representations or the graphical representation layout information included in the placeholder data to perform configuring the layout of graphical representations of different portions.

Referring to FIG. 5A, collection 500 includes 28 data objects, and, thus, there are 28 corresponding graphical representations (1)-(28). Viewport 503 includes subset 504—i.e., graphical representations (9)-(20) arranged in a four-column matrix,—which is displayed on display 502. Optionally, window 505 is used to display the portion in viewport 503 on display 502 Examples of the window include a web browser, an application window, or any other window that is suitable to display multiple graphical objects in an arrangement.

Figure 5B:
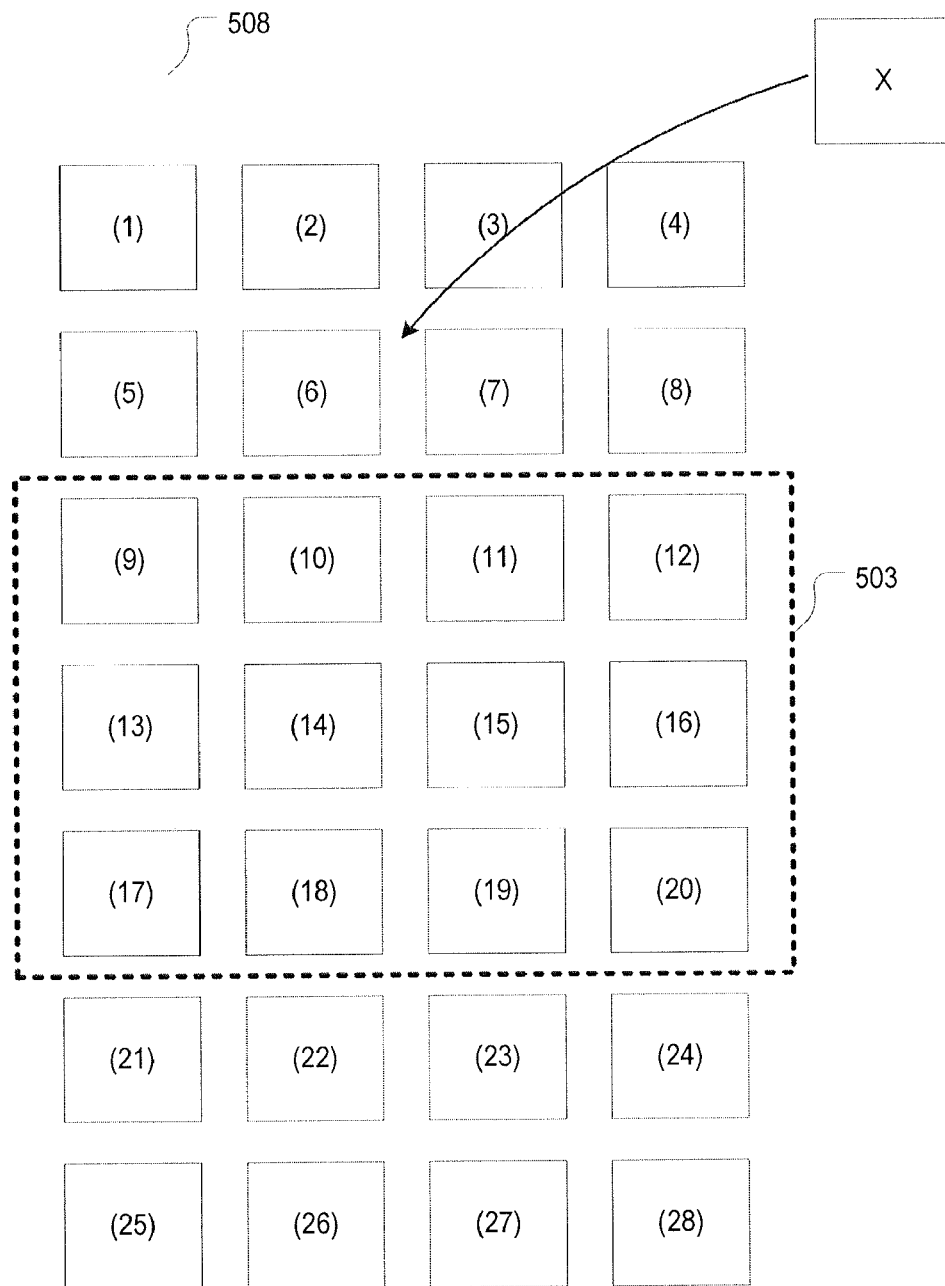
FIGS. 5Q-5R illustrate exemplary embodiment of a layout configuration technique for configuring the layout of graphical representations of multiple data objects in a collection, in response to a change in display properties.
Figure 5C:
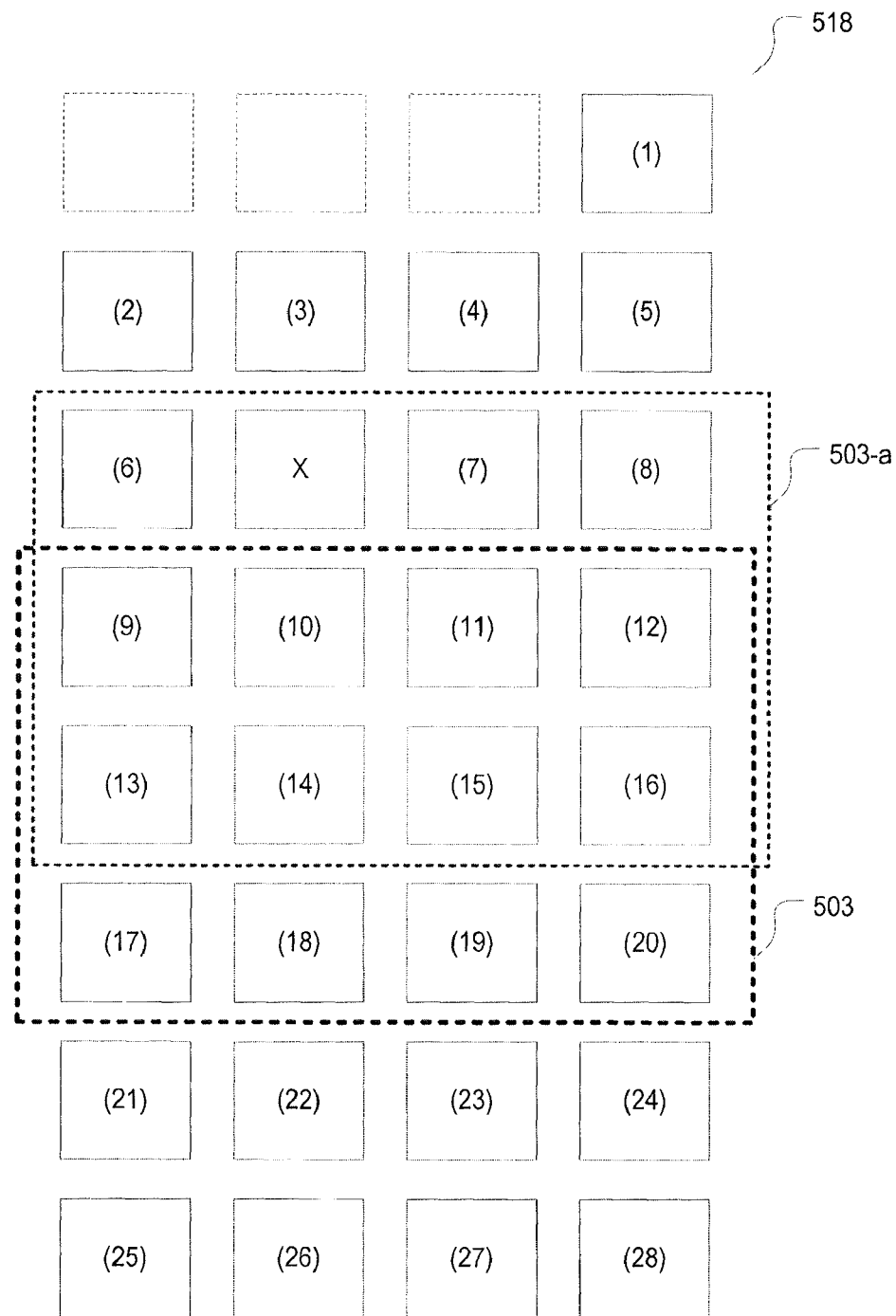

While device 501 displays subset 504 inside viewport 503 on display 502, device 501 detects a change in collection 500, as shown in FIG. 5B. In the illustrated example in FIG. 5B, the detected change is an addition of data object "X" in collection 500. The detected addition is associated with a position relative to other data objects, and from this information device 501 determines that the detected change is an addition of graphical representation of data object "X" at a specific location in matrix 508—between graphical representations (6) and (7). This location is above viewport 503 in matrix 508, and thus, device 501 determines that the detected change is associated with a location above viewport 503, e.g., above subset 504 (which corresponds to the location of viewport 503). For comparison, if the detected change in collection 500 translates to an addition of graphical representation of data object "Y" between graphical representations (26) and (27), as shown in FIG. 5F, device 501 determines that the detected change is associated with a location below viewport 503, e.g., below subset 504. If the detected change in collection 500 translates to an addition of graphical representation of data object "Z" between graphical representations (14) and (15), as shown in FIG. 5J, device 501 determines that the detected change is associated with a location within viewport 503, e.g., within subset 504.

In some embodiments, device 501 can determine the position (e.g., location associated with the detected change in collection 500 relative to other graphical representations in matrix 508 based on information such as the storage location of the affected data object in collection 500, category, file type, and/or other conditions possessed by the affected data object. For example, if graphical representations of data objects in collection 500 are ordered in an alphabetical order, the added graphical representation will be associated with a certain location in matrix 508 based on its starting alphabet character. If graphical representations of data objects in collection 500 are ordered (e.g., ascending or descending) by certain dates (e.g., last modified date, created date, etc.), the added graphical representation will be associated with a certain location in matrix 508 based on the relevant date associated with the added data object in collection 500. Many other different ordering schemes are possible. In certain circumstances, the location associated with the detected change is arbitrarily assigned by device 501. Optionally, the detected addition of a data object to collection 500 is performed by a user of a remote device different from device 501 (e.g., a user of a remote device sending a new file to cloud storage 520 for storage).

Referring back to FIG. 5B, in accordance with a determination that the detected change is associated with a location above subset 504, device 501 configures the layout of graphical representations in accordance with the detected change. For example, the graphical representation of data object "X" is inserted between (6) and (7) to reflect the change in the updated layout of the graphical representations. Further, to minimize disturbance on the layout of graphical representations within viewport 503 (thus currently being displayed on display 502), device 501 inserts the graphical representation of data object "X" and re-flows (e.g., rearrange) graphical representations (1)-(6) above viewport 503 (e.g., above subset 504), as illustrated in FIG. 5C. Optionally, the reflow occurs for graphical representations located in matrix 508 before the determined location of the change (between graphical representations (6) and (7)). Accordingly, as shown in FIGS. 5A-5C, the layout of graphical representations within viewport 503 is not disturbed, thereby, preventing disruption to the readability of displayed content on display 502. Device 501 can also maintain the display of subset 504 in the same way as before the change.

However, the layout of graphical representations above subset 504 has changed so that they are arranged in a direction ("first direction) from bottom right to top left in the matrix starting from an anchor in subset 504. In the illustrated examples in FIGS. 5A-5C, the anchor in subset 504 (inside viewport 503) is the top left element, i.e., graphical representation (9). Even though the change in the layout of graphical representations above subset 504 is not immediately displayable on display 502, when viewport 503 is moved up from 503 to 503-*a* to include graphical representations above subset 504 (FIG. 5C), the graphical representations inside viewport 503-*a* are displayed according to the changed layout (matrix 518) shown in FIG. 5C. For example, the graphical representations inside viewport 503-*a* are displayed on display 502 as being arranged from bottom right to top left in matrix 518 starting from the anchor in subset 504.

In some embodiments, an anchor is associated with a predetermined position in a viewport—e.g., top left, top center, top right, mid-center, bottom center, bottom right, bottom left, etc., of any given viewport. So, if the top left corner of a viewport is predefined as the anchor position, graphical representation (9) becomes the anchor for viewport 503, and but as it is moved to viewport 503-*a*, the anchor becomes graphical representation (6). In some circumstances, configuring layout involves rearranging graphical representations around the anchor (e.g., relative to the anchor) while the anchor remains stationary.

Optionally, the predetermined position associated with the anchor varies dynamically depending on the location of a viewport in the layout. For example, if a viewport is parked towards the beginning of the layout, the predetermined position for the anchor is the top left cell in the viewport. If the viewport is moved towards the end of the layout, the predetermined position for the anchor is changed to, for example, the bottom left cell in the viewport. This is just an example, and many other variations are possible to strategically select the anchor, which is the element that usually retains the most consistency on display 502, thereby, providing the effect to the users that the overall layout on display 502 remains substantially constant. For example, the anchor is set to be the graphical representation that is most recently manipulated (e.g., touched, focused, modified, etc.) by a user of device 501. Many other variations are possible.

Figure 5D:
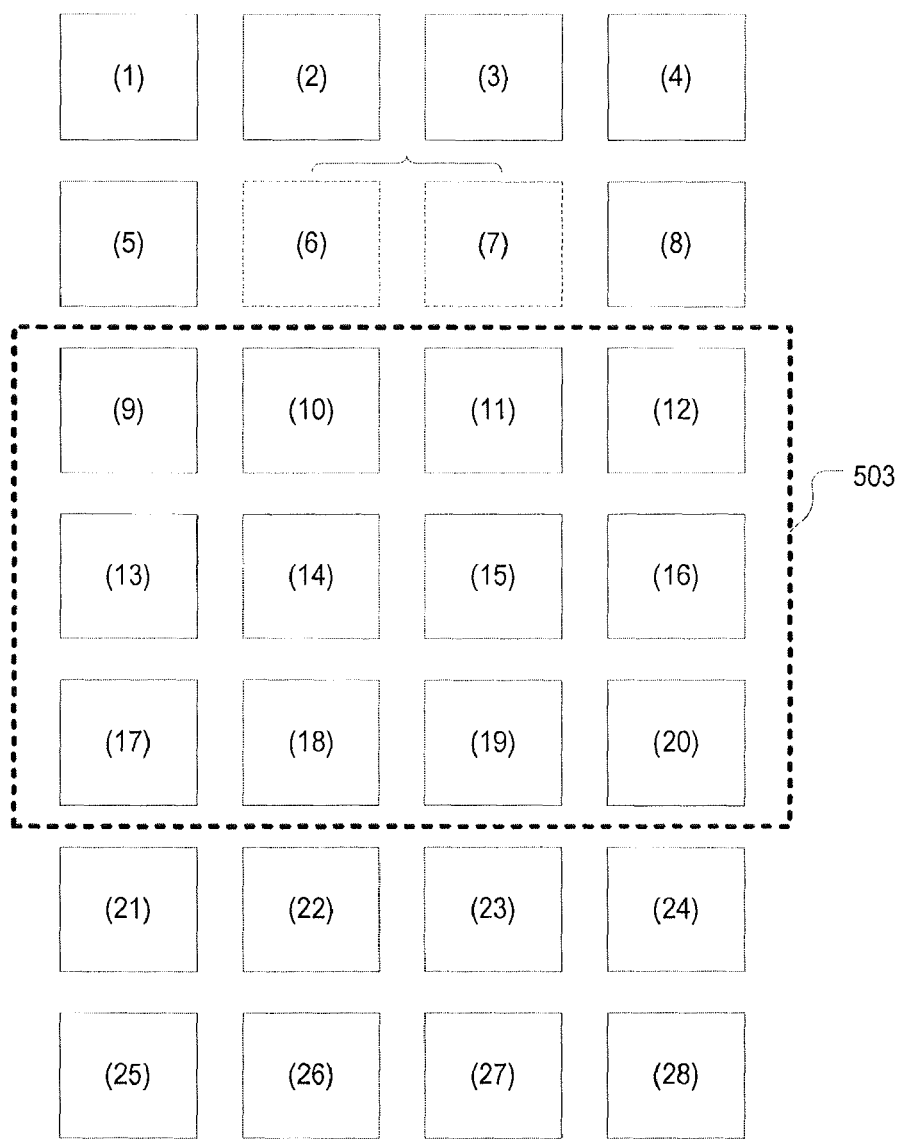

FIG. 5D illustrates another example of the layout configuration techniques for configuring the layout during display in response to a change in data. In this example, the detected change in collection 500 is a deletion of data objects (6) and (7). In some embodiments, as shown in the illustrated example of FIG. 5D, device 501 detects multiple changes to collection 500 and performs a single configuration of the layout based on an aggregate of those changes. In some circumstances, device 501 aggregates the changes that are detected within a predefined time period (e.g., 10 seconds, 30 seconds, 1 minute, 2 minutes, 3 minutes, 4 minutes, 5 minutes, etc.) and performs a layout configuration in response to all of those changes at once, instead of performing a separate configuration based on each change.

Figure 5E:
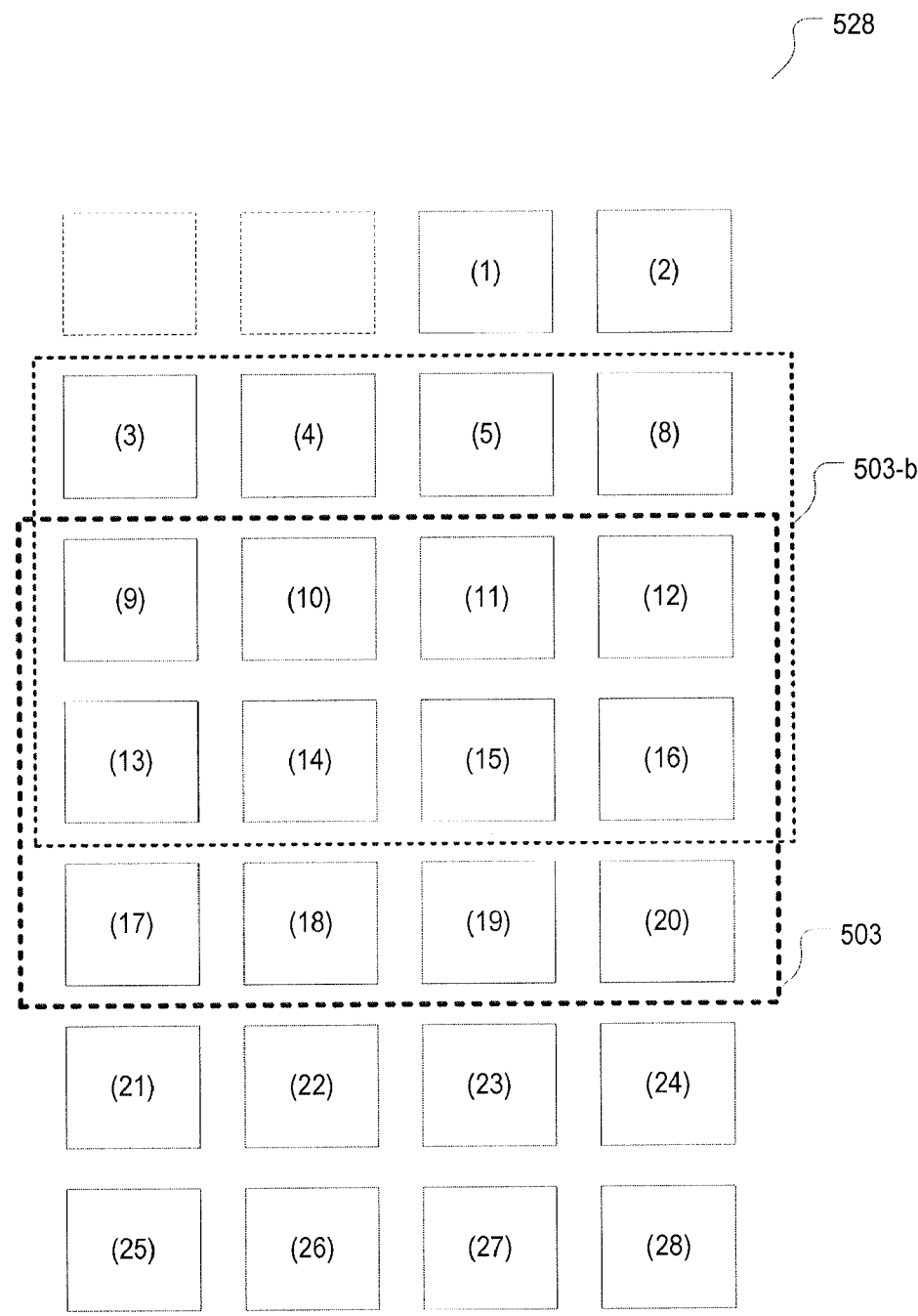
Figure 5F:
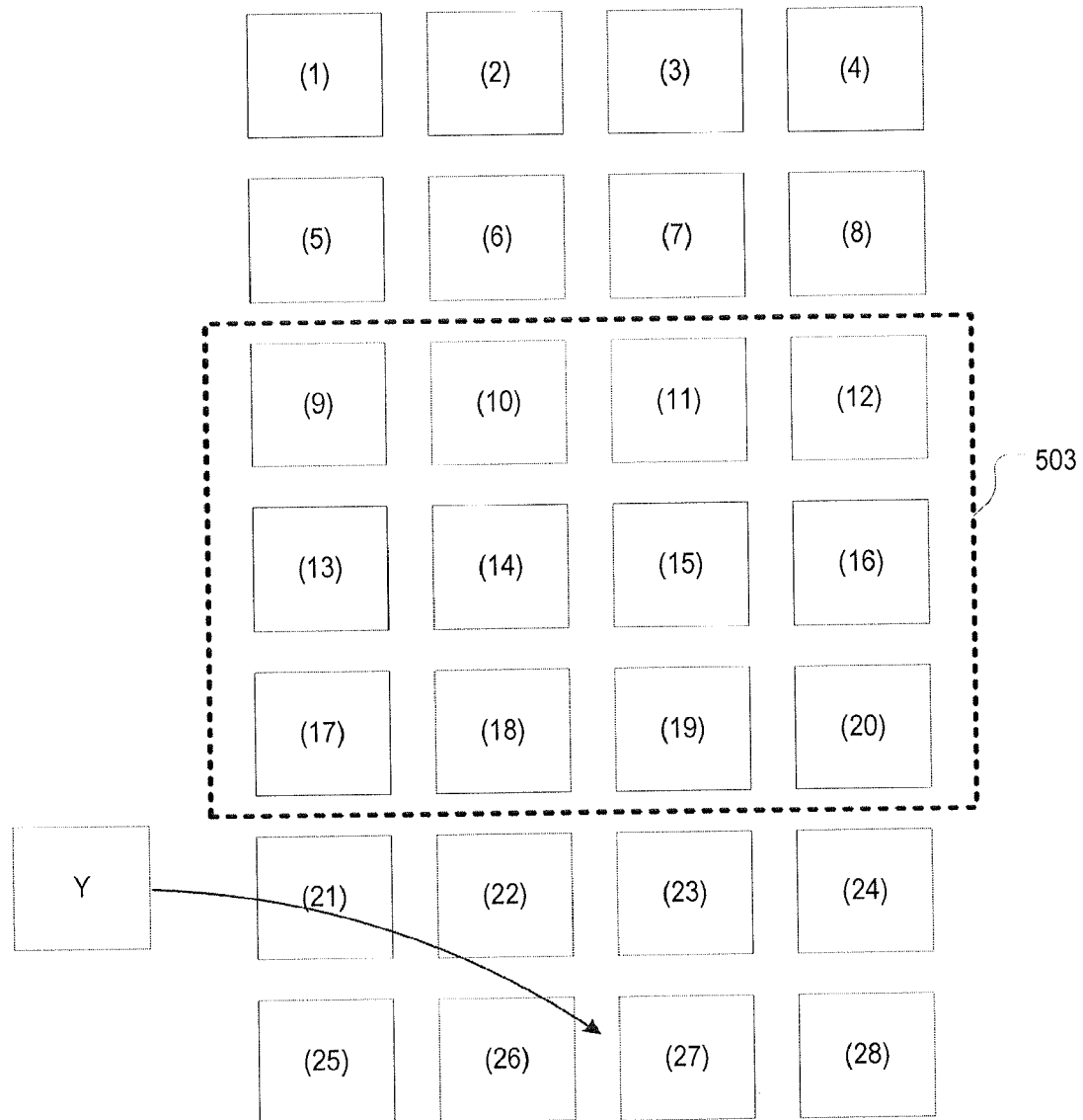

In FIG. 5D, device 501 detects the change in collection 500—the deletion of data objects (6) and (7)—and, in response, determines whether the change is associated with a location above, within or after subset 504 inside viewport 503. Device 501 determines that the change is associated with a location above subset 504 because the graphical representations to be deleted are both above subset 504. In accordance with such determination, device 501 configures the layout of data objects in the substantially similar manners described above in reference to FIGS. 5B and 5C where the change is also associated with a location above subset 504. For example, device 501 configures the layout of graphical representation to reflect the change—that is, graphical representations (6) and (7) are deleted—and such that graphical representations above subset 504 (or above the anchor in subset 504) are arranged in a direction from bottom right to top left starting from the anchor in subset 504. An updated layout 528 is shown in FIG. 5E.

Further, display 502 continues to display subset 504—graphical representations (9)-(20)—in the same arrangement as before the detection of the change. However, if viewport 503 is moved up to 503-*b*, graphical representations of data objects (3)-(16) without (6) and (7) are displayed to reflect the change. Also, graphical representations above subset 504—(3), (4), (5) and (8)—are displayed as being arranged in a direction from bottom right to top left starting from the anchor in subset 504, in accordance with the updated layout 528.

FIG. 5F illustrates another example of the layout configuration techniques for configuring the layout during display in response to a change in data. In this example, the detected change in collection 500 requests addition of a graphical representation of data object "Y" between (26) and (27) after subset 504. In accordance with a determination that the detected change in collection 500 is associated with a location after, e.g., below, subset 504 (that is inside current viewport 503), device 501 configures the layout of graphical representations of data objects in collection 500 in accordance with the detected change. For example, device 501 configures the layout so that the graphical representation of data object "Y" is inserted after (26) and graphical representations (27)-(28) are pushed toward bottom right by one cell in the matrix, as shown in updated layout 538 in FIG. 5G. Device 501 maintains the display of subset 504 in the same arrangement as before the change on display 502.

Figure 5G:
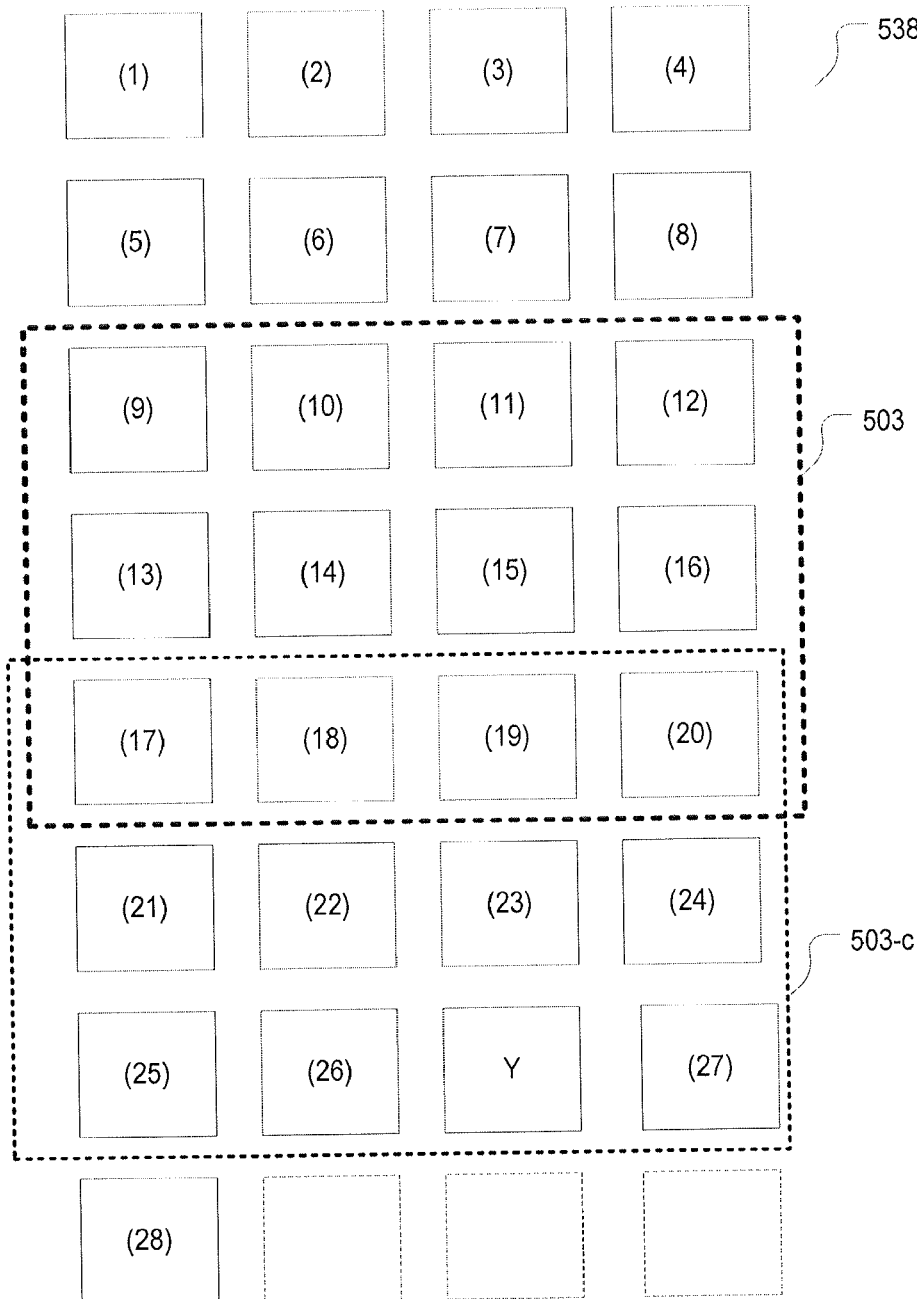

Subsequent to the detection of change and following configuration, viewport 503 is be moved down to 503-*c*, as shown in FIG. 5G. In response to viewport moving to 503-*c*, graphical representations (17)-(27) with that of "Y" inserted between (26) and (27) are displayed in accordance with updated layout 518. Thus, in some embodiments, when viewport 503 is moved down to 503-*c* to display graphical representations below subset 504, or below the anchor in subset 504, display 502 displays graphical representations below subset 504 as being arranged in a direction ("second direction") from top left to bottom right starting from the anchor in subset 504 (e.g., the anchor in the prior viewport before scrolling). In some circumstances, configuring the layout of graphical representations so that the graphical representations are arranged in the second direction from top left to bottom right in a matrix is referred to as "automatic reflow."

Figure 5H:
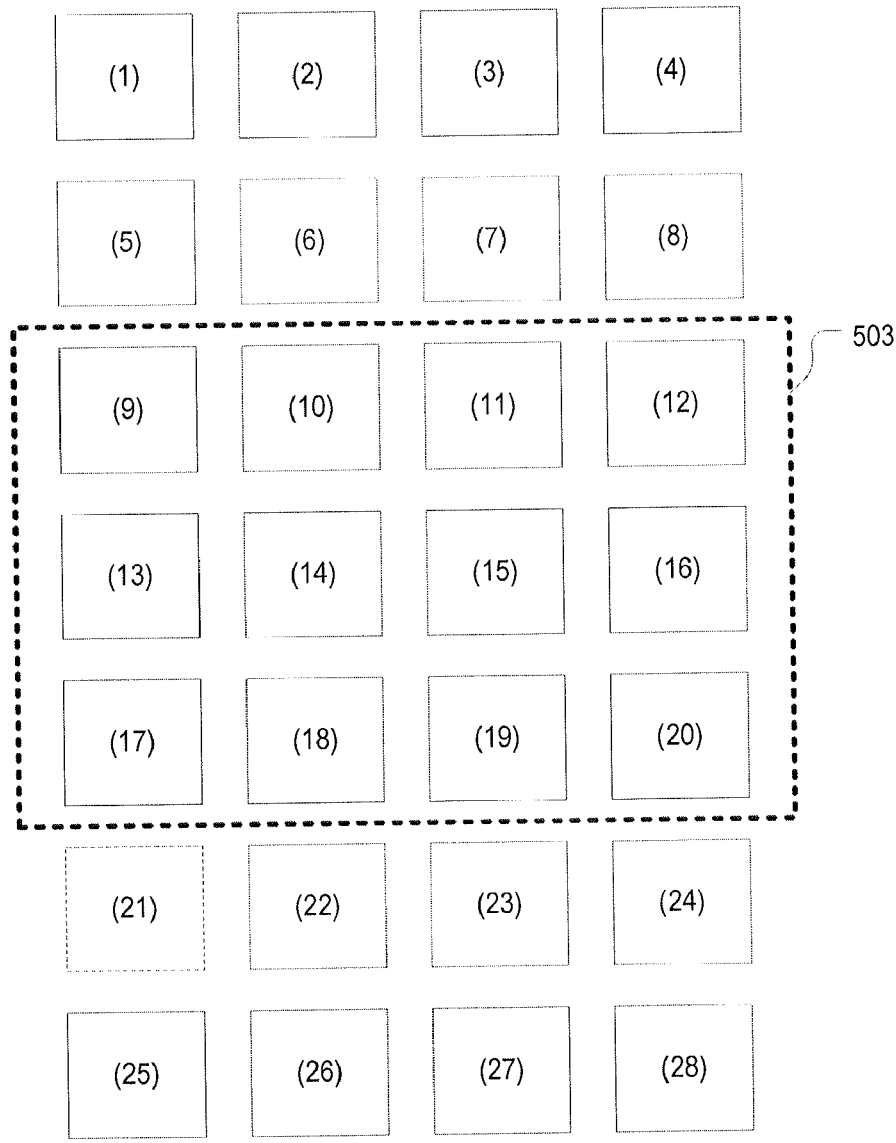
Figure 5I:
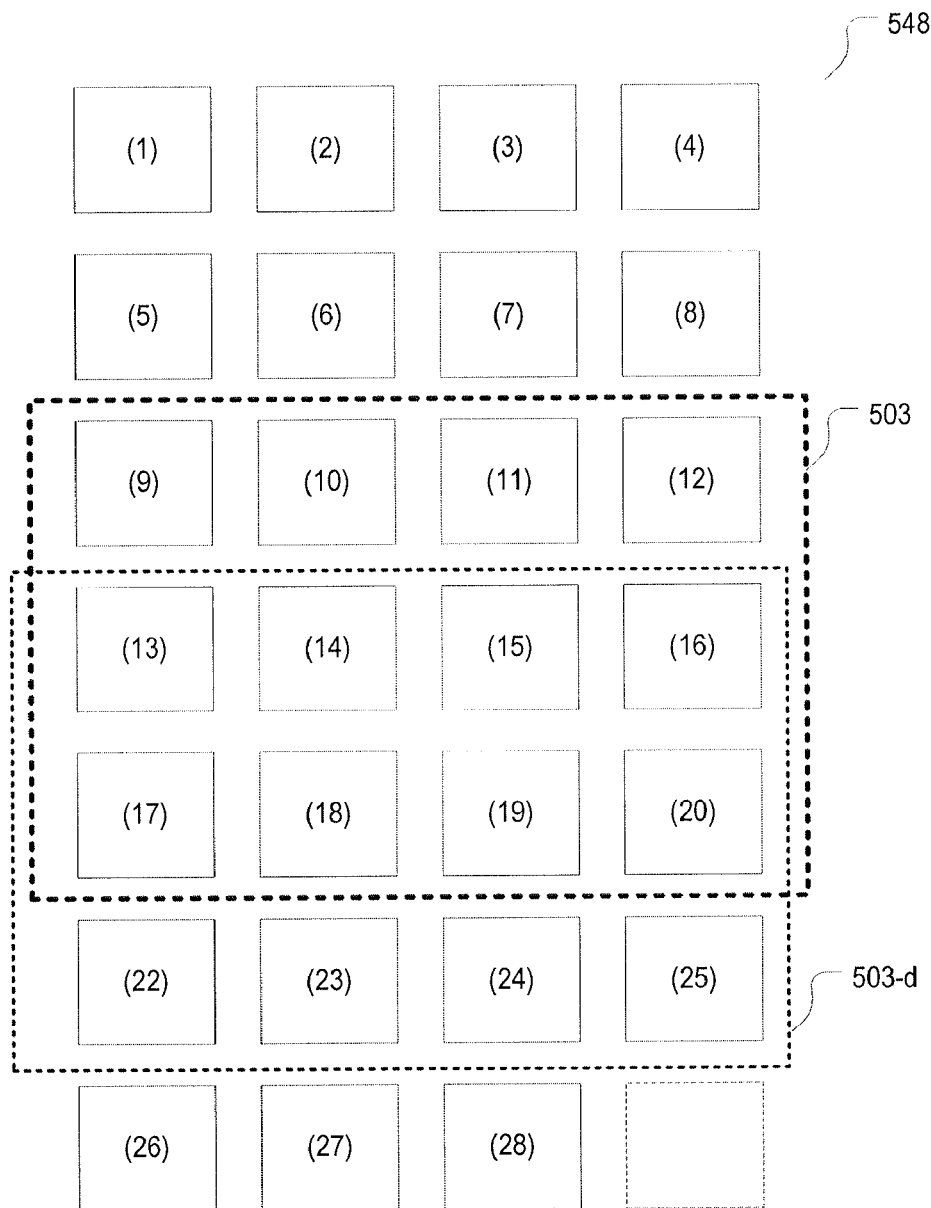

FIG. 5H illustrates another example of the layout configuration techniques for configuring the layout during display in response to a change in data. In this example, the detected change in collection 500 requests a deletion of the graphical representation of data object (21) after subset 504. In accordance with a determination that the detected change in collection 500 is associated with a location after subset 504 (inside current viewport 503), device 501 configures the layout of data objects in the substantially similar manners described above in reference to FIGS. 5F and 5G where the change was also associated with a location after subset 504. For example, device 501 configures the layout of graphical representation so that graphical representation (21) is deleted, and graphical representations after subset 504, or after the anchor in subset 504, are arranged in a direction from top left to bottom right starting from the anchor in subset 504, as shown in updated layout 548 in FIG. 5I.

Display 502 continues to display graphical representations (9)-(20) in the same arrangement as before the detection of the change until viewport 503 is moved. When viewport 503 is moved down to 503-*d*, graphical representations of data objects (13)-(25) without (21) are displayed in accordance with updated layout 548. Put differently, display 502 displays graphical representations after subset 504 as being arranged in a direction from top left to bottom right starting from the anchor in subset 504—graphical representation (9).

FIG. 5J illustrates another example of the layout configuration techniques for configuring the layout during display in response to a change in data. In this example, the detected change in collection 500 requests an addition of the graphical representation of data object "Z" between data objects (14) and (15), after the anchor within subset 504. In accordance with a determination that the detected change in collection 500 is associated with a location after the anchor within subset 504, device 501 configures the layout of graphical representations of data objects in collection 500 in accordance with the detected change. For example, device 501 configures the layout so that the graphical representation of data object "Z" is inserted after (14) and the following graphical representations (15)-(28) are pushed toward bottom right in the matrix by one cell. Further, device 501 configures the layout such that graphical representations after the anchor in subset 504 are arranged in a direction from top left to bottom right starting from the anchor in subset 504, as shown in updated layout 558 in FIG. 5K.

Figure 5J:
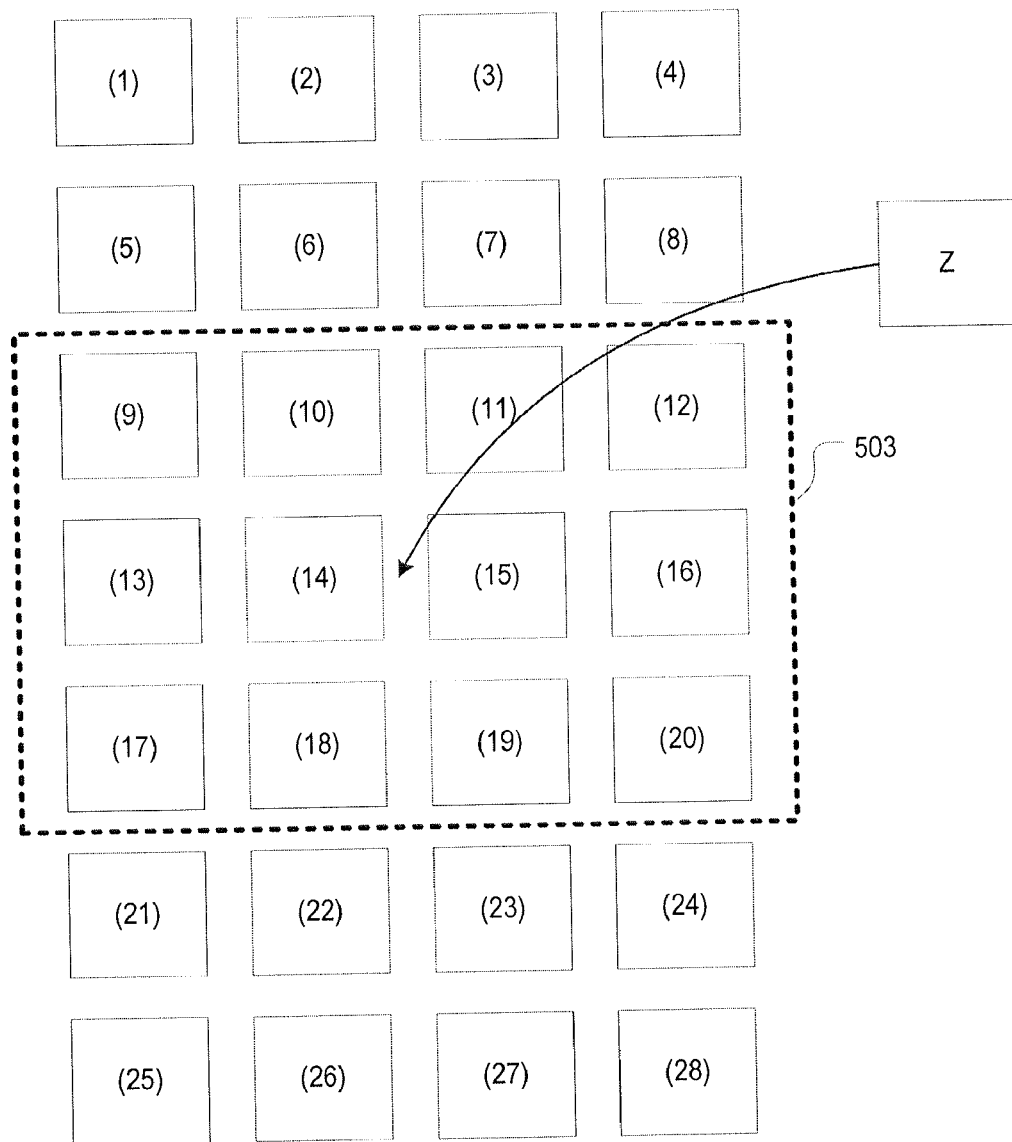
Figure 5K:
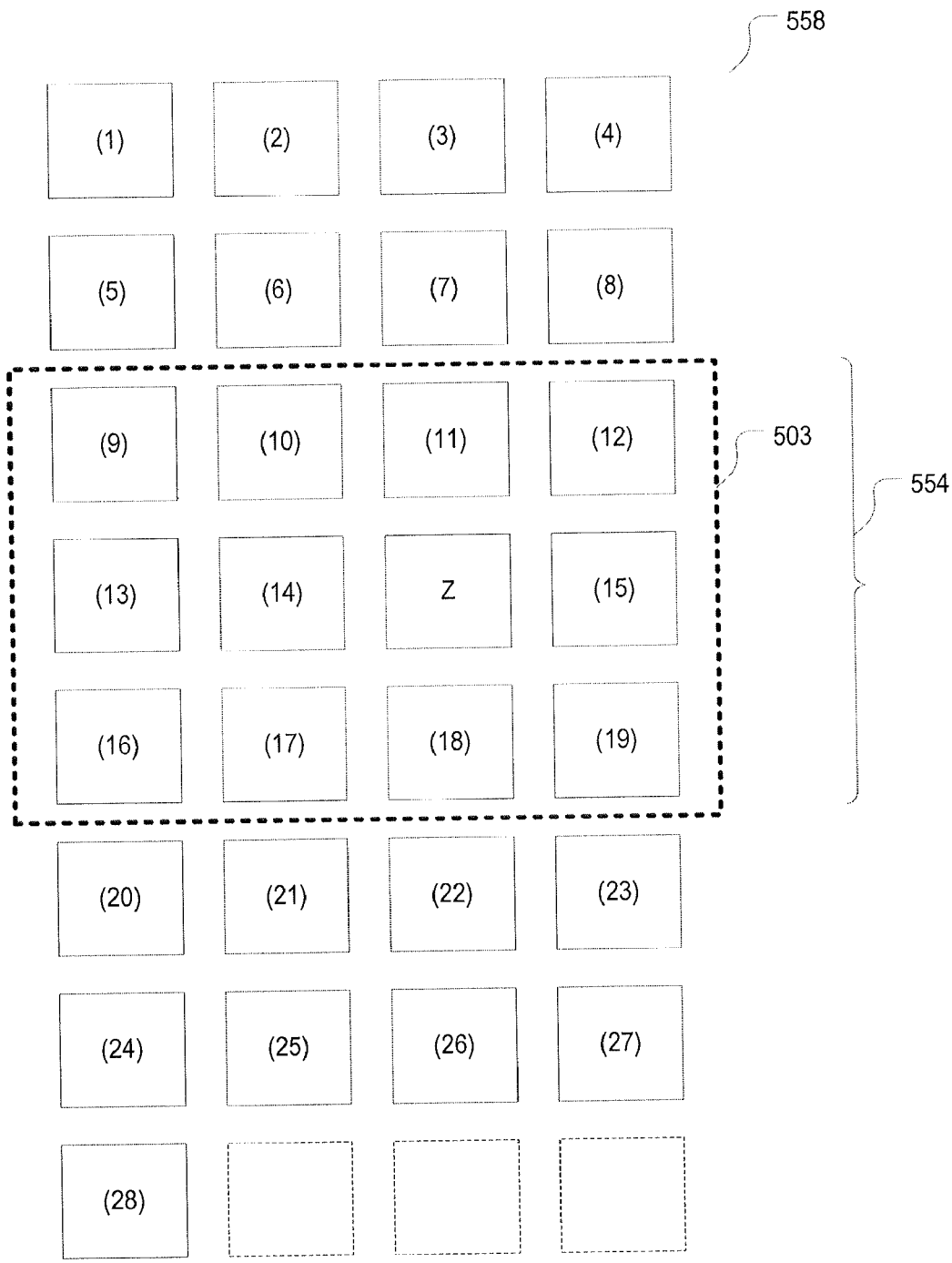

In some cases, configuring the layout as shown in the illustrated examples in FIGS. 5J and 5K causes a change in the layout of the graphical representations inside viewport 503. For example, the subset of graphical representation inside viewport 503 no longer corresponds to subset 504 (graphical representations (9)-(20) as shown in FIG. 5J) but changes to subset 554 (graphical representations (9)-(19) with "Z" inserted between (14) and (15) as shown in FIG. 5K.) Thus, in some embodiments, the subset that is within viewport 503 changes due to configuration of the layout even though viewport 503 has remained stationary.

In some embodiments, display 502 immediately updates the graphics on display 502 to replace the display of subset 504 with display of new subset 554. Optionally, display 502 waits until a predetermined condition is satisfied to refresh the display and update the graphics to subset 554 from subset 504. Examples of the predetermined condition include, but are not limited to, a lapse of a predefined time period since various time points (e.g., the first load up of the graphics corresponding to subset 504, the last input received by device 501, the last input received by device 501 associated with the window displaying subset 504, etc.), automatic window or page refreshing schedule, manual/touch input received from a user to fresh the window or page, or any other suitable conditions to trigger the replacement of the outdated graphics of subset 504 with updated graphics of subset 554.

In some embodiments, replacing the display of graphical representation in subset 504 with display of graphical representations in subset 554 includes displaying an animation of moving graphical representations on the display. For example, graphical representations of data objects (15)-(19) change positions on display 502 as display 502 transitions from subset 504 to subset 554. Optionality, these graphical representations are animated on display 502 as moving from one position (corresponding to potions in subset 504) to another position (corresponding to positions in subset 554) on display 502. Optionally, the graphical representation of data object (20), which is no longer included in viewport 503, are animated as falling off display 502 or window 505. Optionally, the graphical representation of data object "Z" is animated as fading in to display 502. Optionally, graphical representations (9)-(14) that are arranged before the position of the detected change remain stationary on display 502 as these graphical representations remain stationary between subset 504 and subset 554. Examples of the animation include, but are not limited to, rolling, sliding, jumping, wobbling, fading in/out, graying in/out, pop (e.g. replacing the old display with new display all at once), and any other visual effects suitable to display graphical objects appearing, disappearing, or changing positions on the display.

Figure 5L:
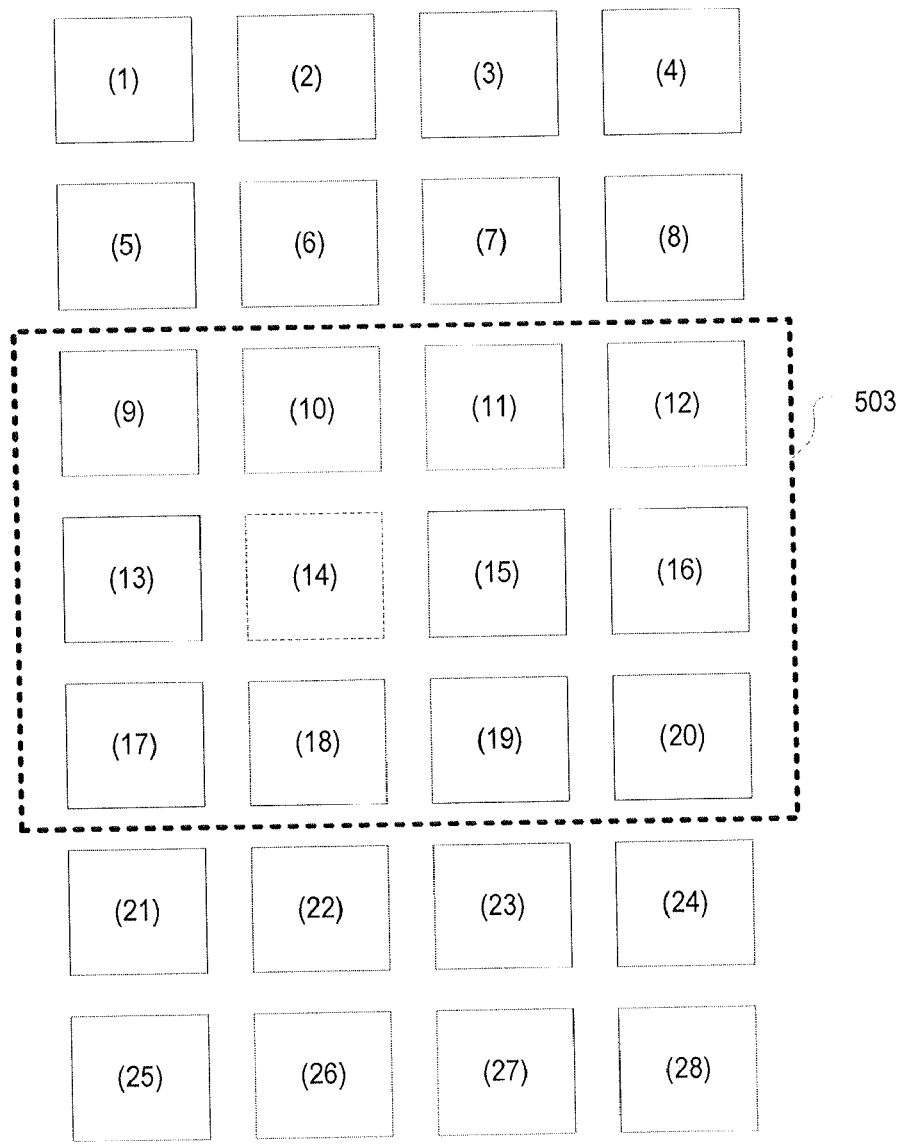
Figure 5M:
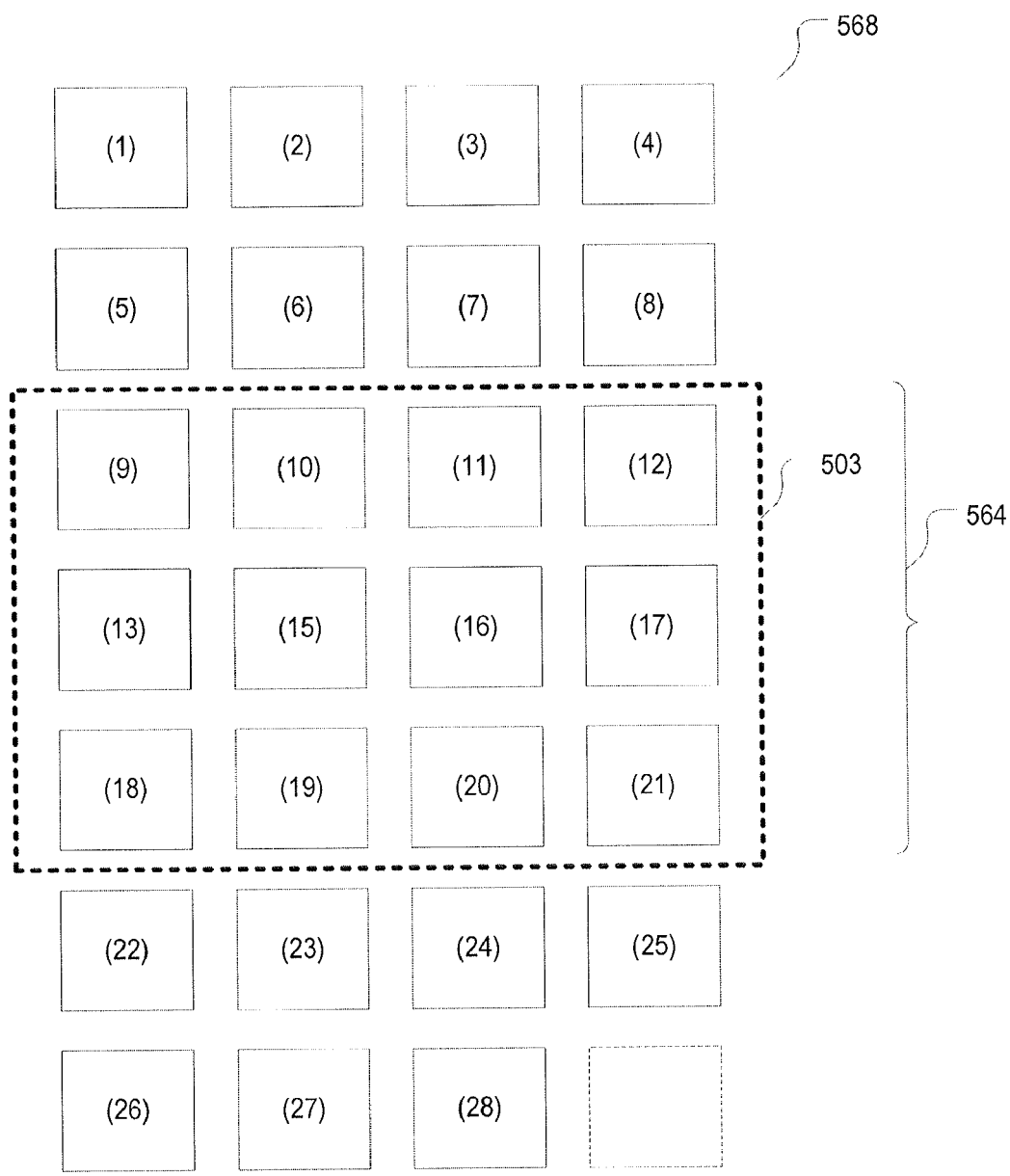

FIG. 5L illustrates another example of the layout configuration techniques for configuring the layout during display in response to a change in data. In this example, the detected change in collection 500 requests deletion of the graphical representation of data object (14) after the anchor within subset 504. In accordance with a determination that the detected change in collection 500 is associated with a location after the anchor within subset 504, device 501 configures the layout of graphical representations in the substantially similar manners described above for FIGS. 5J and 5K where the change was also associated with a location after the anchor within subset 504. For example, device 501 configure the layout of graphical representation to reflect the change—that is, graphical representation (14) is deleted— and such that graphical representations after the anchor in subset 504 are arranged in a direction from top left to bottom right starting from the anchor in subset 504. Updated layout 568 is shown in FIG. 5M. Optionally, display 502 initiates replacing the display of subset 504 with display of subset 564 in the similar manners described above for FIGS. 5J and 5K.

Figure 5N:
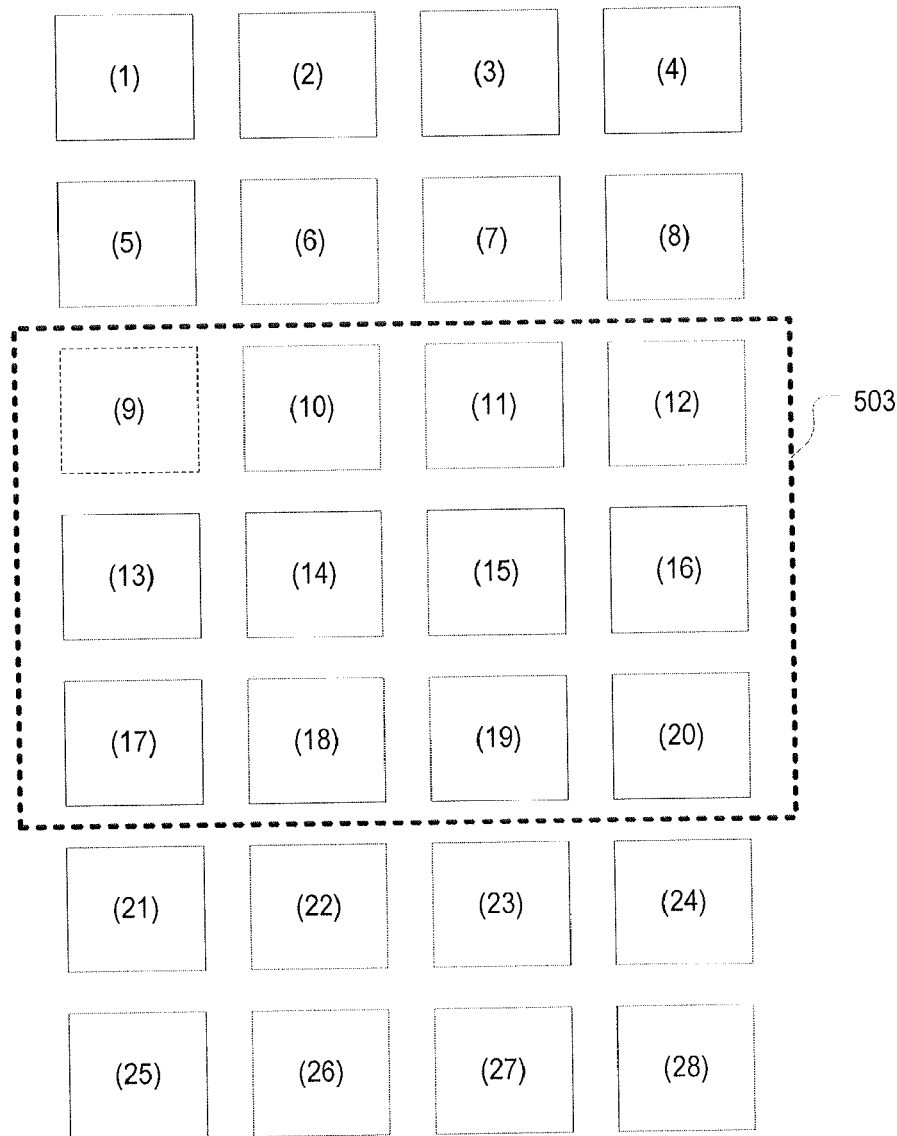

FIG. 5N illustrates another example of the layout configuration techniques for configuring the layout during display in response to a change in data. In this example, the detected change in collection 500 requests deletion of the anchor in subset 504—graphical representation (9). In response to detecting this change indicating that the anchor needs to be deleted, device 501 configures the layout so that the position associated with the anchor to be deleted can be occupied by another appropriate graphical representation.

Figure 5O:
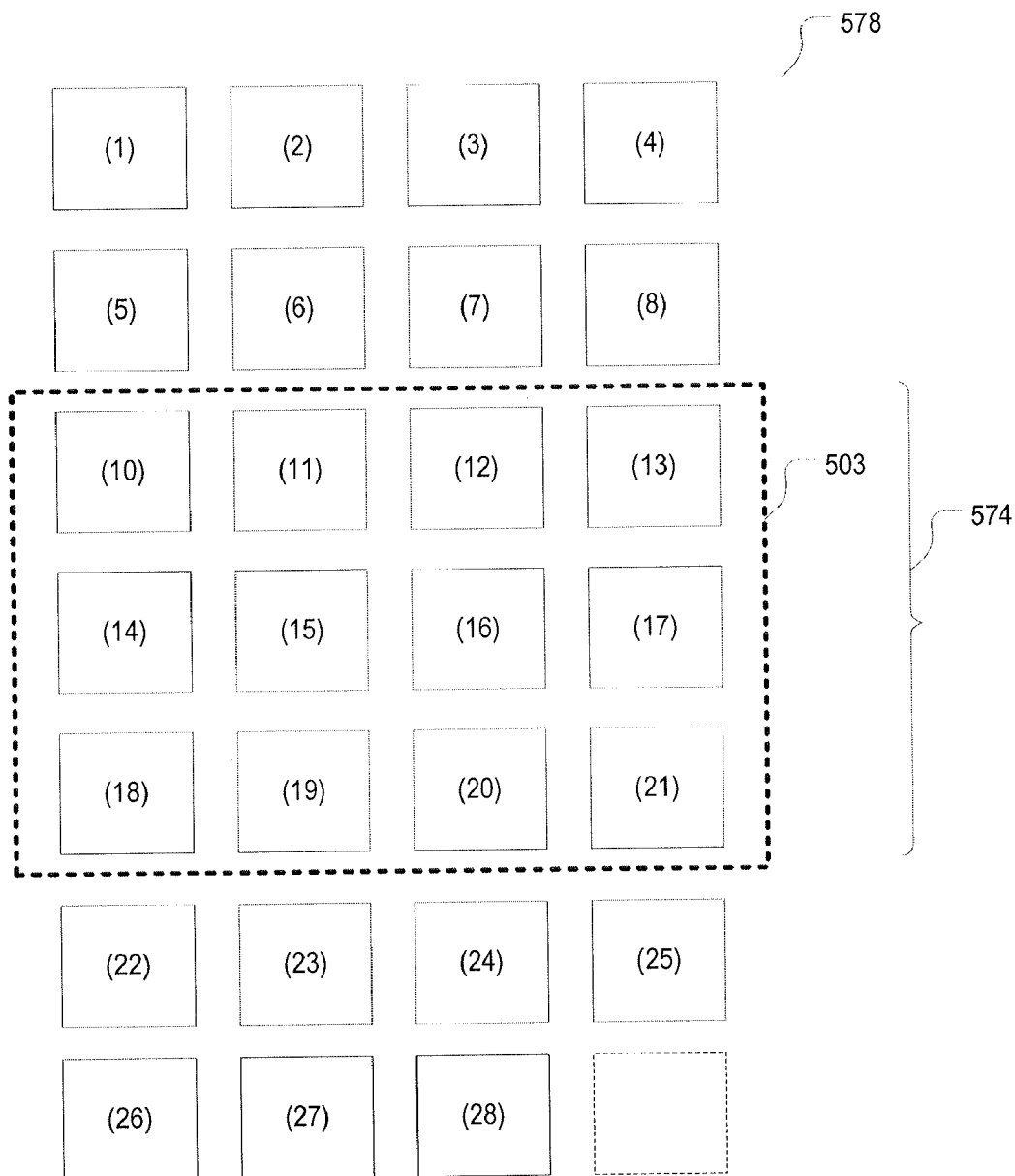
Figure 5P:
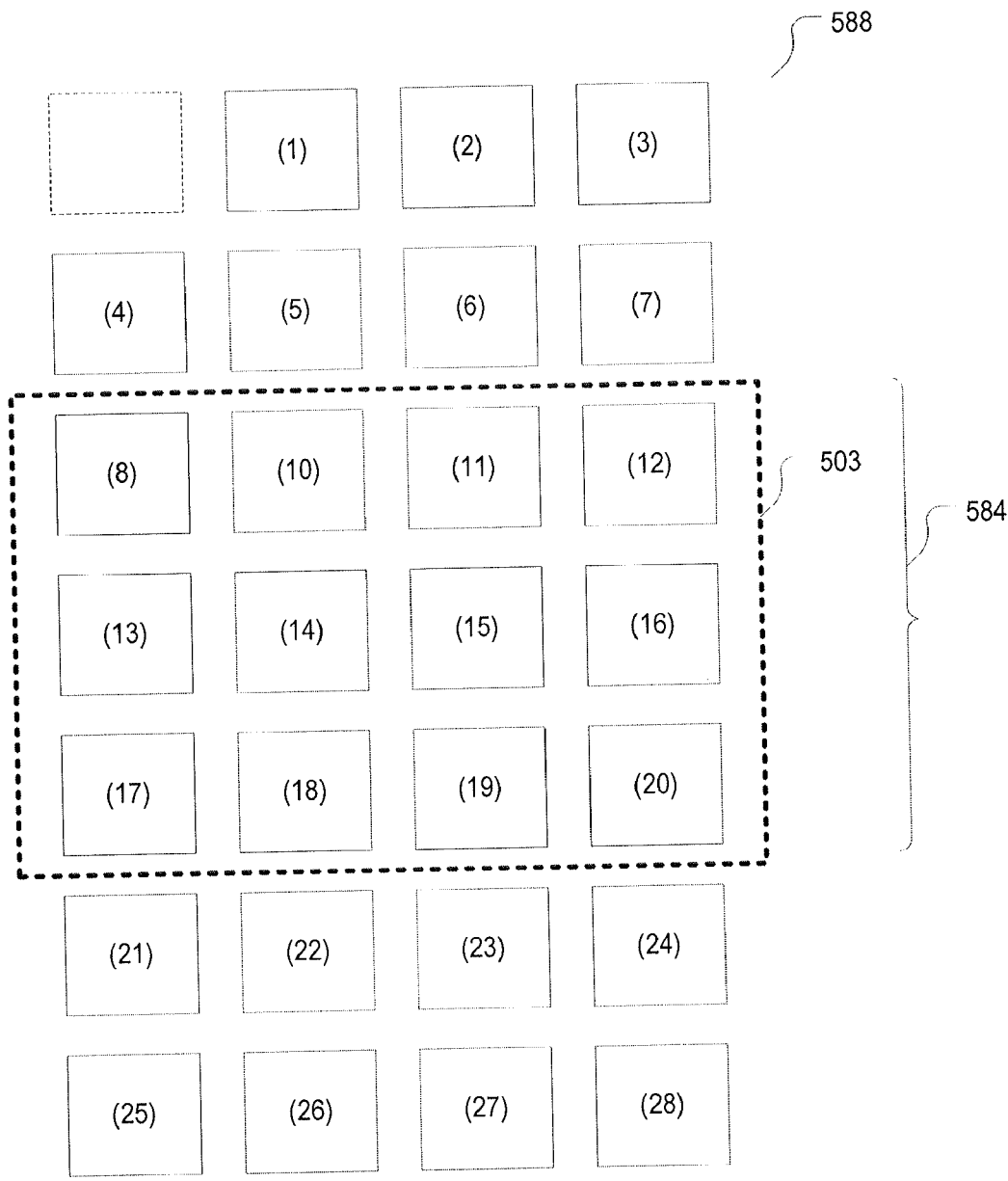
Figure 5Q:
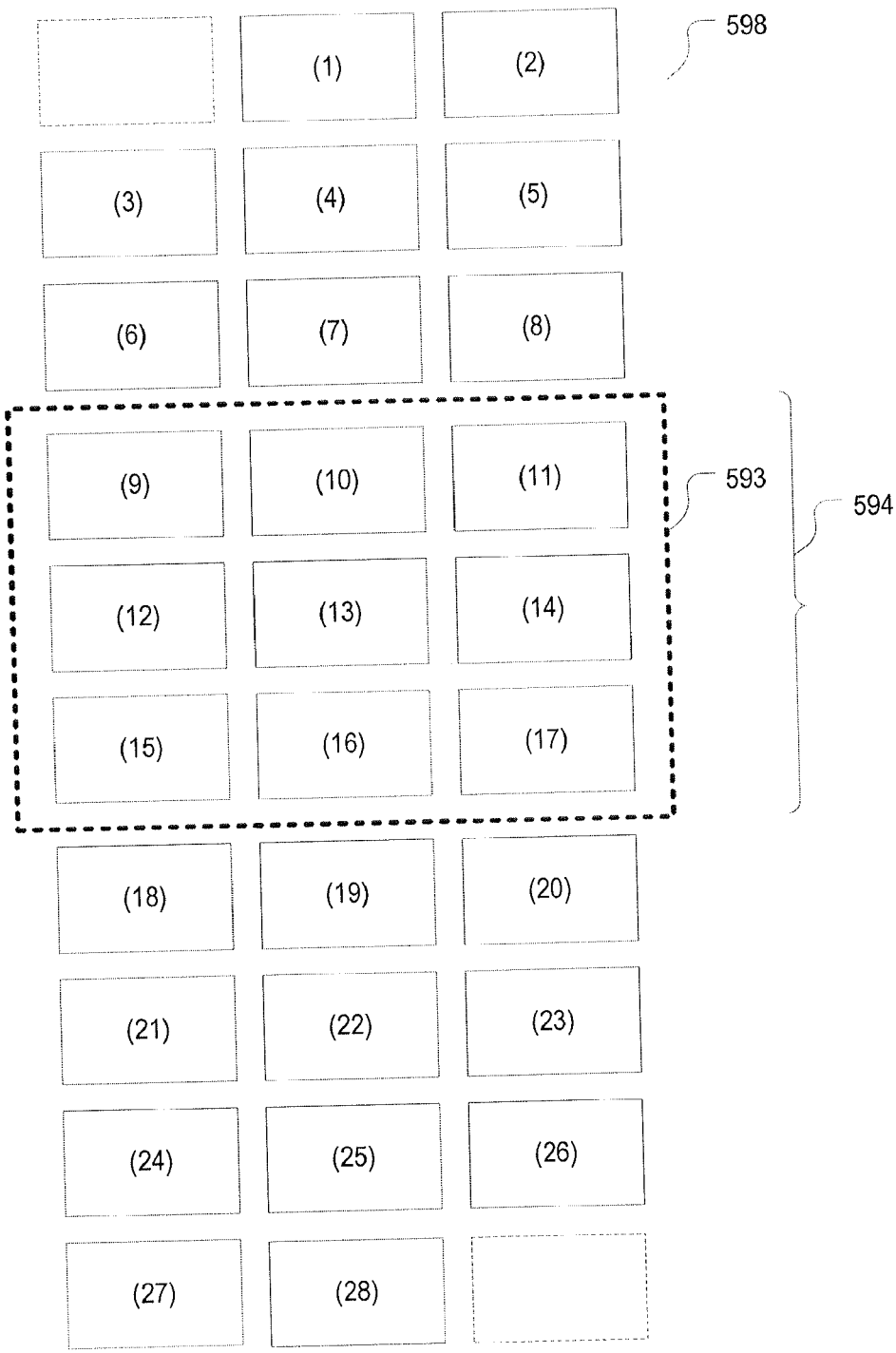
Figure 5R:
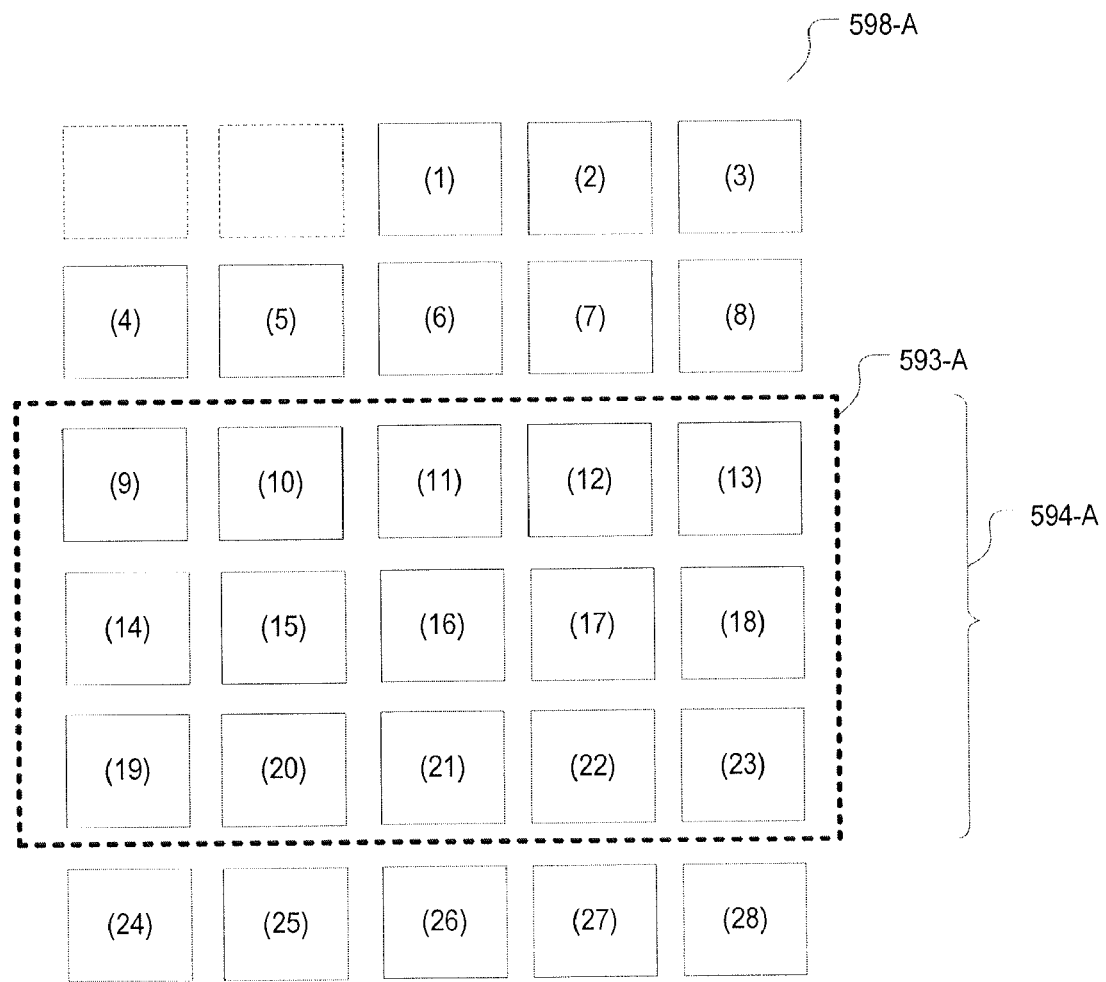

In some embodiments, shown in FIG. 5O, device 501 configures the layout of graphical representations in response to detecting the change requesting the anchor be deleted, so that graphical representations succeeding the deleted anchor are shifted toward the deleted anchor, as shown in updated layout 578. For example, graphical representations succeeding the deleted anchor are reflowed, e.g., rearranged, starting from the position associated with the deleted anchor in a direction from top left to bottom right. After the configuration, display 502 replaces the display of subset 504 with display of subset 574. In some circumstances, replacing the display of subset 504 with display of subset 574 include moving of all of the graphical representations in subset 504 on the display and introducing a new graphical representation at the bottom right edge of the window 505 on display 502.

In some embodiments, shown in FIG. 5P, device 501 configures the layout of graphical representations in response to detecting the change requesting the anchor be deleted, so that graphical representations before the deleted anchor are shifted toward the deleted anchor. Put differently, graphical representations before the deleted anchor are reflowed starting from the deleted anchor in the direction from bottom right to top left, as shown in updated layout 588. After configuration, display 502 replaces the display of subset 504 with display of subset 584. In some circumstances, replacing the display of subset 504 with display of subset 574 include maintaining the display of all of the graphical representations in subset 504 in window 505 and introducing a new graphical representation at the top left edge of the window.

As described above, the layout of graphical objects can be configured using different methodologies depending on the location associated with the detected change in collection 500—e.g., whether it is above, within, or below current viewport 503, e.g., subset 504 inside viewport 503. In some circumstances, the directions in which all or portions of the graphical representations are arranged differ based on the location associated with the detected change. Optionally, if the location associated with the detected change is above viewport 503, e.g., before subset 504, device 501 configures the layout such that a certain portion of the graphical representations in the layout are arranged in a direction from bottom right to top left ("first direction") starting from the anchor in subset 504. Optionally, if the location associated with the detected change is below viewport 503, e.g., after subset 504, device 501 configures the layout such that a different portion of the graphical representations in the layout are arranged in a direction from top left to bottom right ("second direction) starting from the anchor subset 504. Optionally, these changes are not immediately displayable on display 502 until viewport 503 is moved up or down to display respective portions of the graphical representations. Optionally, the second direction is different from (e.g., opposite) the first direction. In fact, the directions in which graphical representations are ordered are not limited to the above-described directions such as from bottom right to top left, or top left to bottom right, but include, non-exclusively, vertical-reading direction such as from top to bottom in one column and from top to bottom in the next column, Japanese-style reading direction such as from top left to bottom right, etc.

Further, the layout need not be limited to a grid (e.g., a matrix or a plurality of columns and rows) as shown in the illustrated embodiments in FIGS. 5A-5P. Examples of other layout configurations include, but are not limited to, a line, bar, arbitrary arrangement of different shapes, etc. Similarly, there is no limitation on the shape or size of viewport 503, even though viewport 503, as illustrated in FIGS. 5A-5P, has a rectangular shape with substantially the same width as the width of the layout (e.g., width of the columns in the matrix). For example, the shape of viewport 503 is any one of the following, non-exclusively, a rectangle, a square, a circle, and any other symmetric or non-symmetric shapes suitable for displaying contents therewithin. Also, optionally, the width of viewport 503 is smaller than the width of layout 508, allowing the viewport to be moved (e.g., scrolled) horizontally. Optionally, the viewport is configured to be moved in directions beyond the vertical and horizontal directions, like diagonal directions, or z-order directions (if the layout is a stack of multiple layers or pages).

Moreover, the detected change in collection 500 need not be limited to an addition or deletion of a data object in collection 500. Examples of other changes include, but are not limited to, a modification of content in data objects in collection 500, which is sometimes used to trigger layout configuration. Optionally, device 501 employs several distinct layout configuration schemes to be selectively applied depending on one or more attributes of the content of the data objects in collection 500. For example, if more than a certain percentage of data objects in collection 500 have resolutions over a threshold value, device 501 applies a first configuration rule (e.g., shaping and sizing the viewport and the layout so that a fewer number of graphical representations are included in any given viewport), and if not, device 501 applies a second configuration rule different from the first rule (e.g., shaping and sizing the viewport and the layout so that a more number of graphical representations are included in any given viewport). Many other properties of data can be used. Example of such properties includes, but are not limited to, data-types, size (e.g., individually and/or in aggregate), source, storage information, etc.

Optionally, data objects in collection 500 are stored locally in device 501 or, more likely, are stored in one or more remote devices. If stored remotely, in some circumstances, device 510 accesses the data through a network such as, non-exclusively, an internet, extranet, intranet, cloud network (e.g., iCloud® developed by Apple Inc., Cupertino, Calif., etc.) In some embodiments, device 501 uses a software application to access the collection data objects on a network (e.g., iCloud® of Apple Inc., Cupertino, Calif.) and to convert them into graphical representations and display the graphical representations on display 502. Examples of such software application include, but are not limited to, Finder® of Apple Inc., Cupertino, Calif., any web browser applications, or any layout engine applications to provide an organized view of multiple graphical representations on a display.

Further, the detected change in collection 500 may be made from one or more remote devices that are connected to device 501 and have access to the collection via such network. The change in collection 500 may be made upon demand by a user (e.g., of device 501 or other remote devices). The change in collection 500 may instead be made automatically as part of an automatic process of adding or deleting one or more data objects, like an automatic back-up or a purging process.

In some embodiments, graphical representations (1)-(28) are data objects of one or more types. Example of the data objects represented by graphical representations (1)-(28) include, but are not limited to, image data, video data, voice data, software application data, text data, etc. Such data objects are graphically represented in various forms as well. Examples of the graphical representation (510) include, but are not limited to, an image (e.g., photo), video, text, icon, thumbnail, folder, other graphical user interface objects (GUI) suitable for representing a data object, etc. Optionally, the graphical representation for any particular data object is fixed (e.g., stationary, not changed). Optionally, the graphical representation for any particular data object is dynamically changed based on changing content of the represented data. Optionally, the graphical representation is a graphical representation of a single data or a graphical representation of multiple data (e.g., a folder containing multiple data files).

2. Configuration of Layout of Graphical Objects in Response to a Change in Display Properties In some embodiments, device 501 triggers the configuration of the layout of graphical representations in response to not only changes in collection 500 but also changes in display properties associated with viewport 503, e.g., a view/display of subset 504. Examples of display properties associated with viewport 503 include, but are not limited to, a display orientation (e.g., between portrait and landscape), size of graphical representations displayed on display 502 (e.g., shrunk or enlarged), number of graphical representations that are simultaneously displayed on display 502, and size, shape, orientation, and other display properties associated with window 505 displaying the graphical representations in subset 504 within viewport 503.

In FIG. 5A, display 502 is in landscape mode, and, thus, viewport 503 for display 502 is configured to have a shape that fits the landscape view of display 502. For example, while displaying the graphical representations in subset 504, display 502 is put in portrait mode. In response to detecting this change in display orientation, device 501 configures the layout of the graphical representations as well as the shape and size of the viewport so that the graphical representations that are included in the updated viewport fit the changed view of display 502 in portrait mode. An updated layout of the graphical representations is shown in FIG. 5Q. For example, the width of updated layout 598 (e.g., three-column) has become smaller than the width of previous matrix 508 in FIG. 5A (e.g., four-column) to fit the portrait view of display 502.

As shown in FIG. 5Q, the layout of the graphical representations is updated so that the anchor in subset 504 remains stationary, and other graphical representations are moved relative to the anchor to be arranged in an order in updated three-column matrix 598. For example, the graphical representations before the anchor are reflowed or rearranged in the direction from bottom right to top left starting from the anchor in the updated matrix, whereas the graphical representations after the anchor are reflowed or rearranged in the direction from top left to bottom right starting from the anchor in the updated matrix.

In some embodiments, in configuring the layout as shown in FIG. 5Q, the shape and/or size of the viewport also change in accordance with the changes made to the layout of the graphical representations. The changed viewport is shown as 593 in the illustrated example. In reshaping the viewport, however, the area in the viewport directly above the anchor (e.g., the top left area of the viewport directly above the graphical representation (9)) remains stationary because the anchor also remains stationary during the configuration of the layout. Optionally, the viewport changes the shape and size as if it is fixed or pinned on the anchor (graphical representation (9)) in the top left corner of the viewport while the contours of the viewport is shrunk or enlarged to fit the changed layout. After the configuration is complete, updated viewport 593 corresponds to updated subset 594, not subset 504. Thus, display 502 transitions from the display of subset 504 to display subset 594.

In some embodiments, transitioning from displaying subset 504 to displaying subset 594 includes displaying an animation of moving graphical representations on the display. For example, graphical representations (10)-(17) change positions on display 502. Optionally, the change in positions for these graphical representations are animated on display 502 as moving from one position (corresponding to a potion in subset 504) to another position (corresponding to a position in subset 594) on display 502 of changed orientation. Optionally, graphical representations (18)-(20), which are no longer displayed in viewport 503 after the layout configuration is complete, are animated as falling off display 502 or window 505. Examples of the animation include, but are not limited to, rolling, sliding, jumping, wobbling, fading in/out, graying in/out, pop (e.g. replacing the old display with new display all at once), and any other visual effects suitable to display graphical objects appearing, disappearing, or changing positions on the display.

In some embodiments, after the configuration is complete, the anchor (graphical representation (9)) remains stationary relative to the edges of display window 505 on display 502 (e.g., continuing to occupy the same equivalent area in window 505 in portrait mode as in landscape mode.) Optionally, the anchor continues to occupy the top left area of display window 505 in portrait mode as in landscape mode.

FIG. 5R illustrates another example of the layout configuration techniques for configuring the layout during display in response to a change in display properties. In this example, device 501 detects a request to change the shape of a display area (e.g., window 505) to further widen the width of the display area and shorten the height (e.g., modifying the size of window 505.) In response to detecting such a change, device 501 configures the layout of graphical representation similar to the above-described process in FIG. 5Q—e.g., the anchor is fixed while other graphical representations are moved relative to the anchor to fit the updated display area. To briefly reiterate the process, the layout of graphical representations is configured so that the graphical representations are arranged in a five column matrix with the anchor continuing to occupy the top left cell of updated viewport 593-A. The graphical representations of data objects before the anchor are arranged in the first direction from bottom right to top left starting from the anchor to fill the cells in new matrix 598-A. In the meantime, the graphical representations of data objects after the anchor are arranged in the second direction from top left to bottom right starting from the anchor to fill the cells in new matrix 598-A. Thus, in some embodiments, representations of data objects are laid out so that they are reflowed toward the anchor (e.g., data objects before the anchor are arranged down toward the anchor, while data objects after the anchor are arranged up toward the anchor).

In some embodiments, as the layout and viewport are changed, the graphical representations of data objects in collection 500 also change in accordance with the changed layout and viewport. For example, if a graphical representation of a respective data object is an image when device 501 uses a grid of a first size to configure the layout of the graphical representations. As device 501 changes the layout of the graphical representations to a grid of a second size, a thumbnail graphical representation is used for the respective data object (e.g., if the new grid requires displaying too many graphical representations simultaneously on display 502, a thumbnail rather than an image may be more appropriate for display.)

3. Configuration of Layout of Graphical Objects in Response to a Scroll Request (e.g., Layout Optimization Through Orphan Fixing)

In addition to configuring the layout of graphical representations in response to various changes during display, there can be some instances where it might be beneficial for device 501 to further optimize the next view of the graphical representations in response to a user scrolling the display. For example, referring to FIG. 5A, collection 500 is configured so that the graphical representations of data objects in collection 500 are arranged in an order in a plurality of columns and rows (e.g., a matrix, grid). Graphical representations (1)-(28) are arranged from the top left cell of matrix 508 in the direction from top left to bottom right.

In this default settings, the number of graphical representations above the anchor (the anchor being graphical representation (9)) is evenly divisible by the number of columns (four). Put differently, there is no row above the row of the anchor that contains, e.g., includes, a number of graphical representations not evenly divisible by the number of columns. Each row above the row of the anchor contains four graphical representations (evenly divisible by the number of columns), and thus, the number of graphical representations contained in the two rows above the row of the anchor (eight) is evenly divisible by the number of columns.

However, as described above in reference to FIGS. 5A-5R, device 501 adjusts the layout of the graphical representations in response to various changes, and in so doing, may result in one or more rows above the row of the anchor to contain a number of graphical representations not evenly divisibly by the number of columns. This may cause the updated matrix to have one or more empty cells at the top, as shown, for example, in FIG. 5C. In some embodiments, the set of graphical representations corresponds to a set of data objects that is larger than the number of representations that are laid out at a time, and the "empty cells at the top" are determined to exist based on a calculation that the number of data objects before the data object that corresponds to an upper left corner of the viewpoint is not evenly divisible by the number of columns in the viewpoint even when the layout for the top of the arrangement of graphical representations has not yet been determined.

In FIG. 5C, the change in collection 500 causes the graphical representations above the anchor to be rearranged so that they are moved left and up by one cell as the additional graphical representation of data object "X" is inserted. This causes the number of graphical representations above the anchor to cease to be evenly divisible by the number of columns (e.g., 9 is not evenly divisible by 4). For example, the rows above the row of the anchor cease to contain the number of graphical representations that is evenly divisible by the number of columns. Optionally, there is at least one row that contains a number of graphical representations that is not evenly divisible by the number of columns (e.g., or less than the number of column).

Figure 6A:
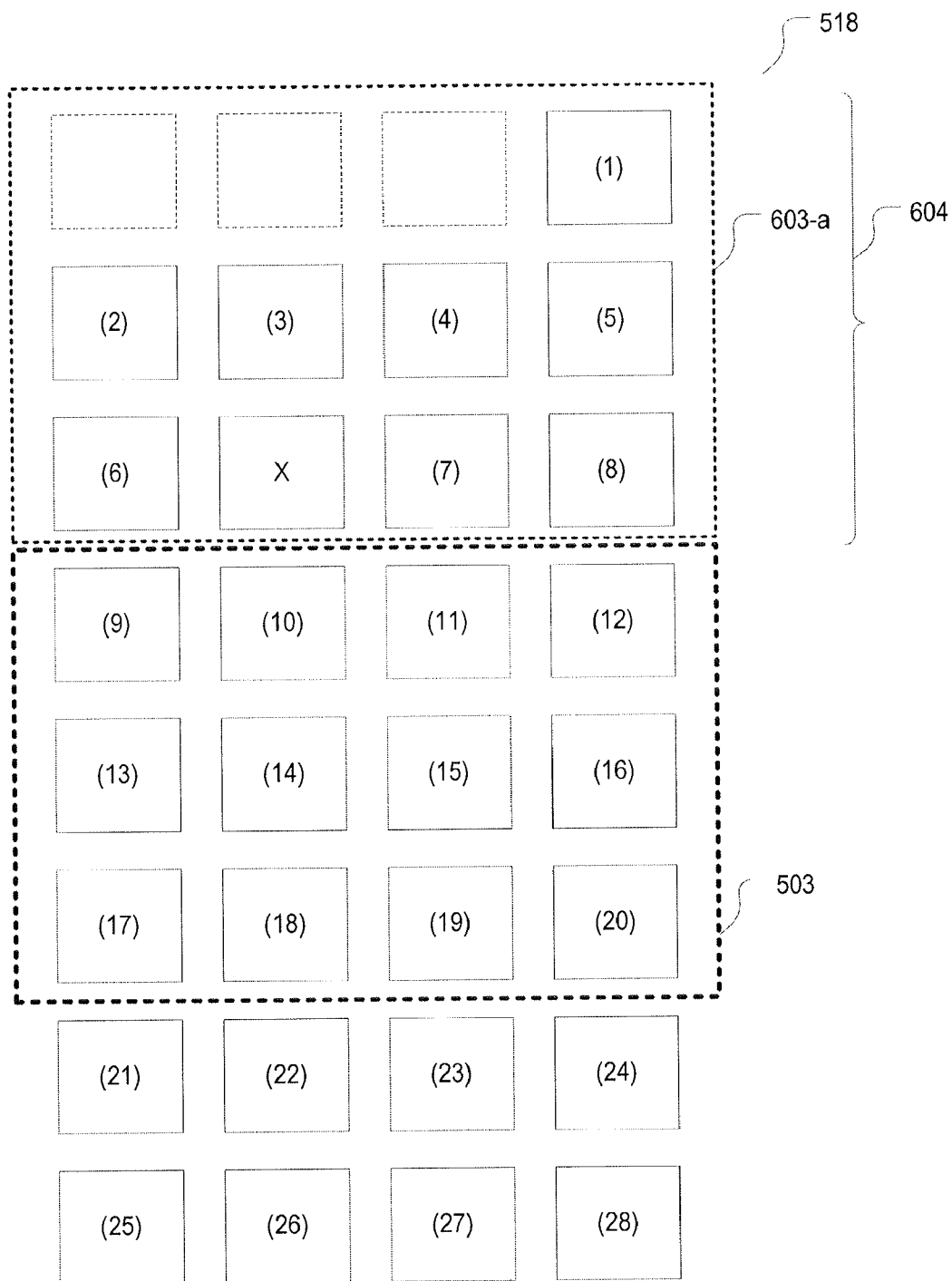
FIGS. 6A-6F illustrate exemplary embodiment of a layout configuration technique for configuring the layout of graphical representations of multiple data objects in a collection, in response to a scroll input.

This above phenomenon is referred to as orphaning, and graphical representation (1) in FIG. 5C is referred to as an orphaned element. In some circumstances, an orphaned graphical representation causes a disruption in the continuity of displayed content if the orphaned graphical representation is displayed on display 502 without removing the empty cell(s). For example, as shown in FIG. 6A, if viewport 503 is moved to 603-a, the graphical representations within the moved viewport 603-a, if displayed without being fixed, will be displayed as starting from the left edge of a window or page on display 502, with the area to the right being displayed as empty areas on display 502. This is not intuitive to users and, thus, causes unnecessary confusion to the users. Thus, device 501 removes the orphaning, for example when it determines that the user is about to see the orphaning by scrolling the display. Optionally, some orphaning (e.g., empty cells at the end of the collection) is disregarded, and orphaning at the top of the collection is fixed when necessary.

Figure 6B:
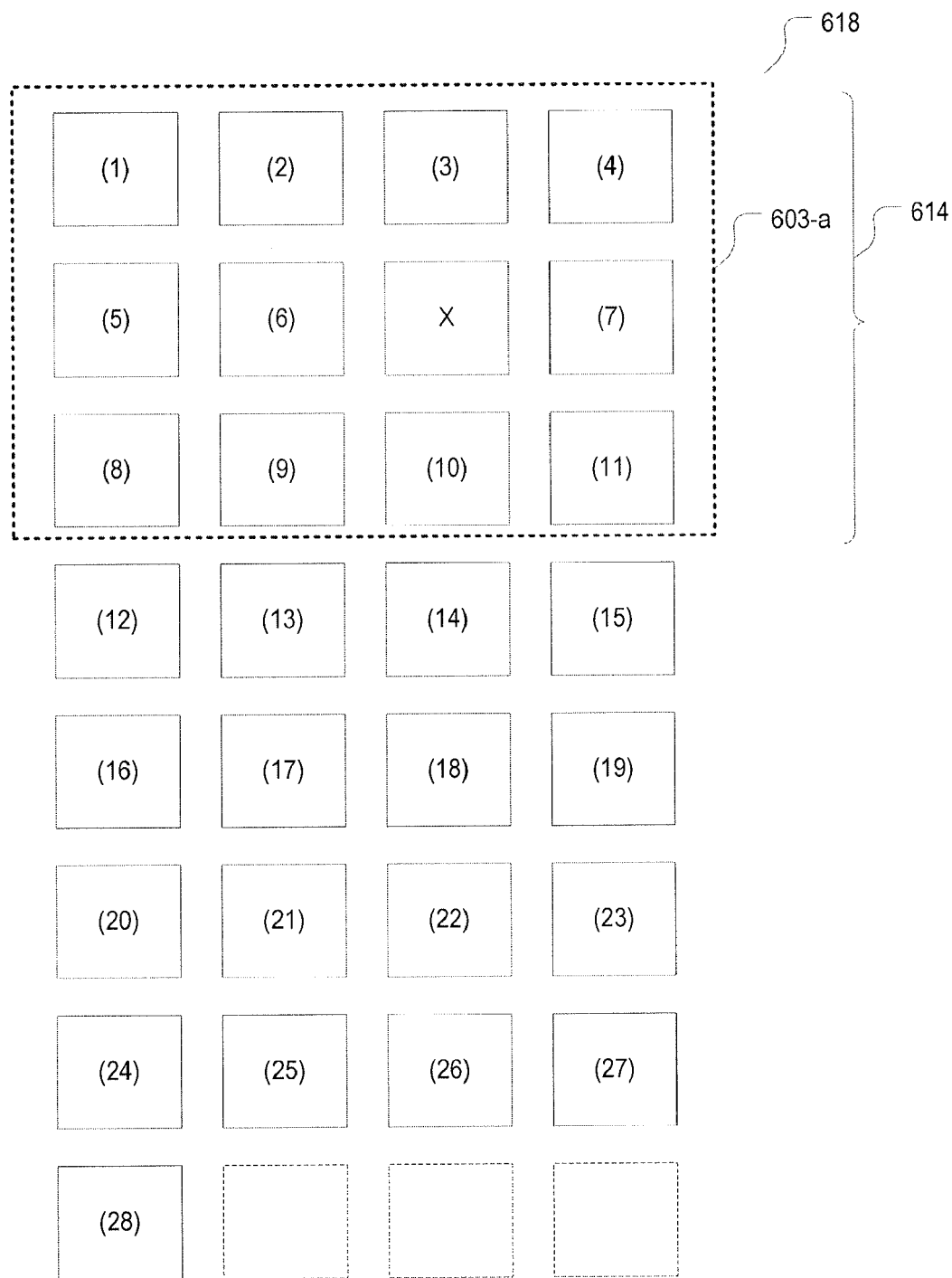

FIGS. 6A and 6B illustrate an exemplary situation in which an orphaned graphical representation is created from configuring the layout of the graphical representations in response to a change in collection 500. FIGS. 6C-6F illustrate an exemplary situation in which an orphaned graphical representation is created from configuring the layout of the graphical representations in response to a change in display properties associated with the viewport. For brevity, FIGS. 6C-6F are primarily used to describe the details of the orphan-fixing layout configuration techniques, but the same principles of operations may apply in other contexts including those illustrated in FIGS. 6A-6B.

Figure 6C:
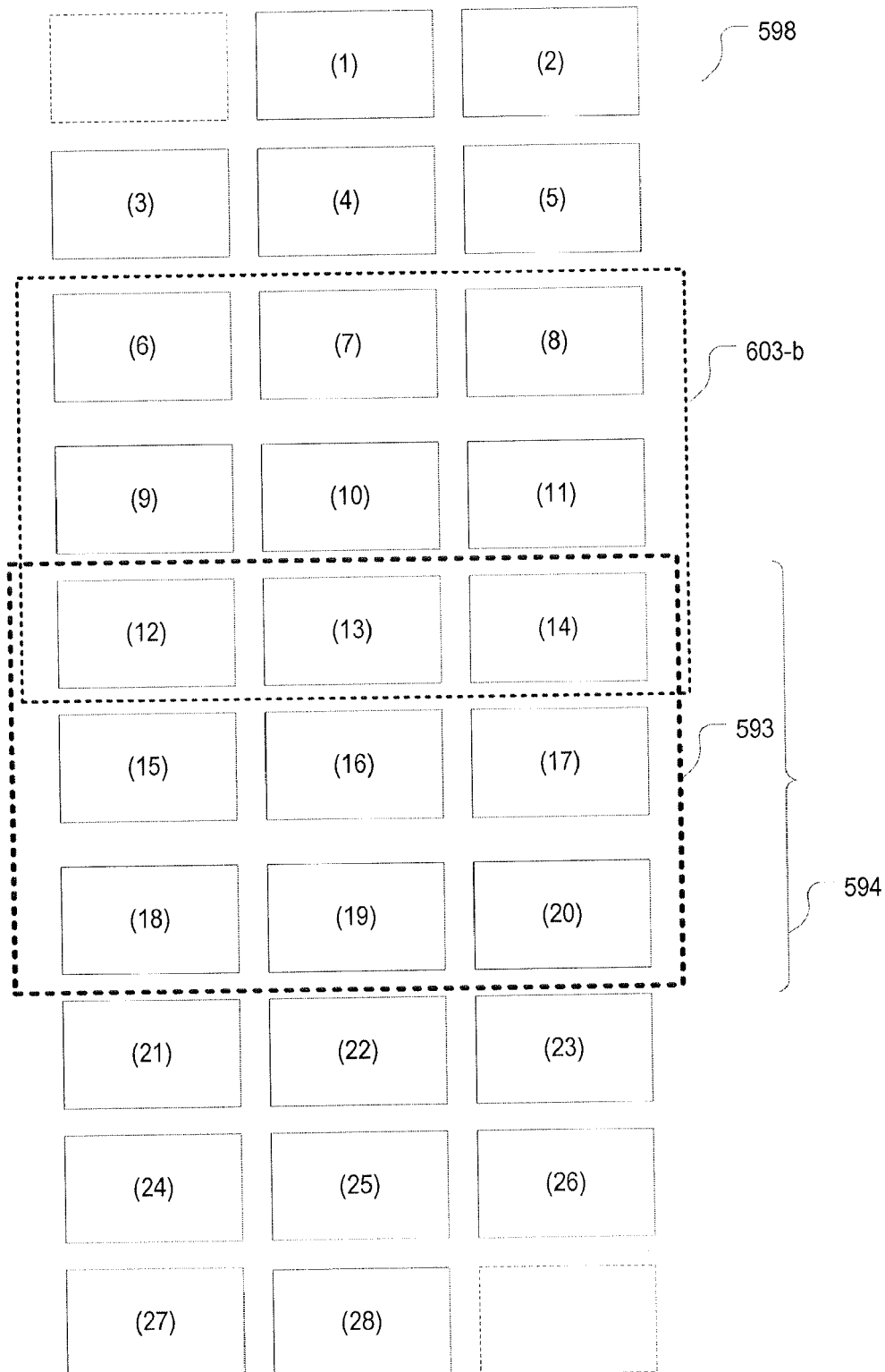

FIG. 6C is the layout resulting from the configuration of the layout of the graphical representations that was carried out in response to a detection of a change in display orientation from landscape to portrait. (See the descriptions above in conjunction with FIG. 5Q.) In FIG. 5Q, the layout configuration was done in a way that arranges the graphical representations above the anchor in the direction from bottom right to top left in updated layout 598 starting from the anchor (9). This has resulted in one empty cell at the top of the matrix, and two orphaned graphical representations (1)-(2), as shown in FIG. 6C. After the configuration is complete, the layout 508 has changed to layout 598, and viewport 503 has changed to viewport 593, as shown in FIGS. 5Q and 6C.

Figure 6D:
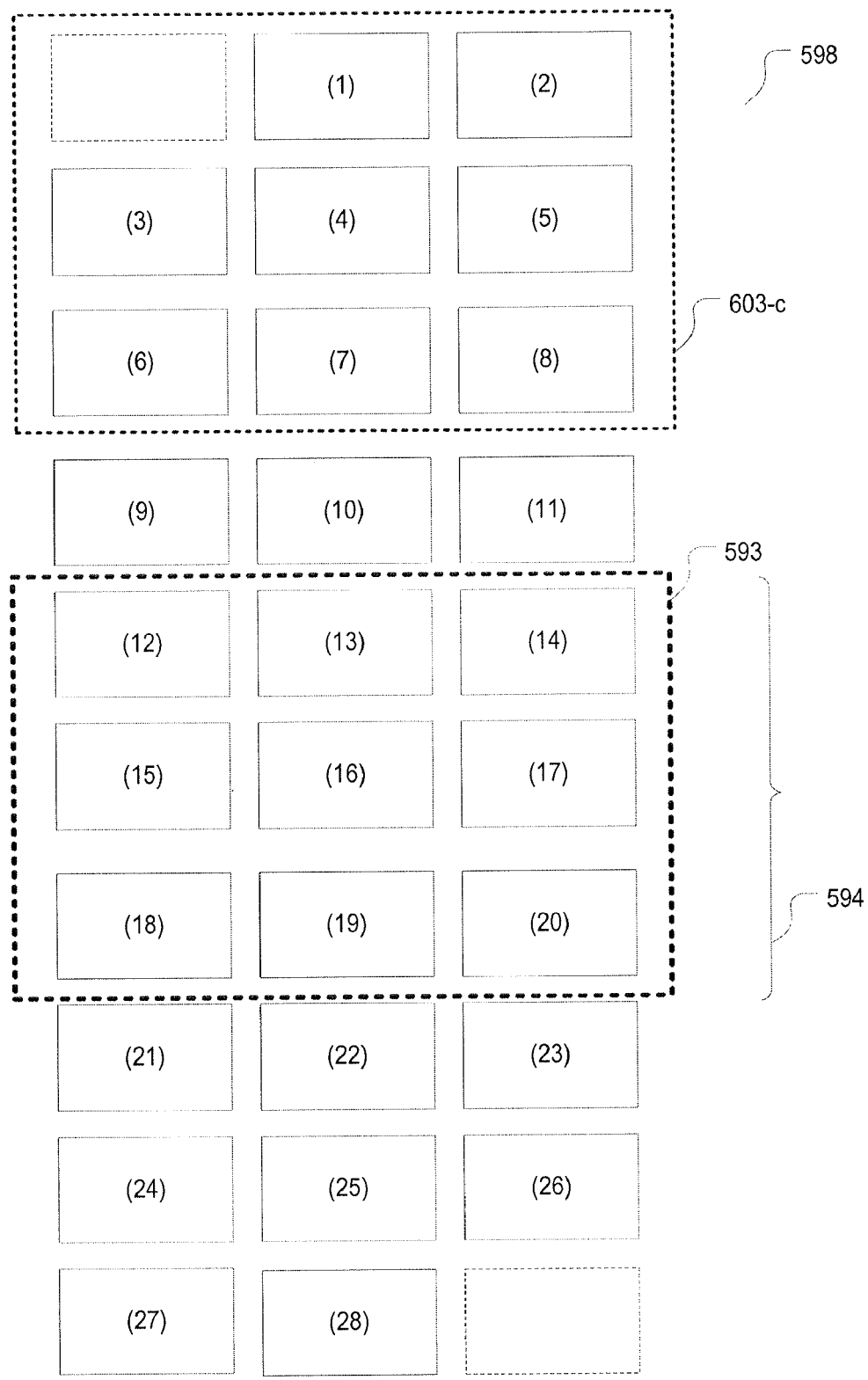
Figure 6E:
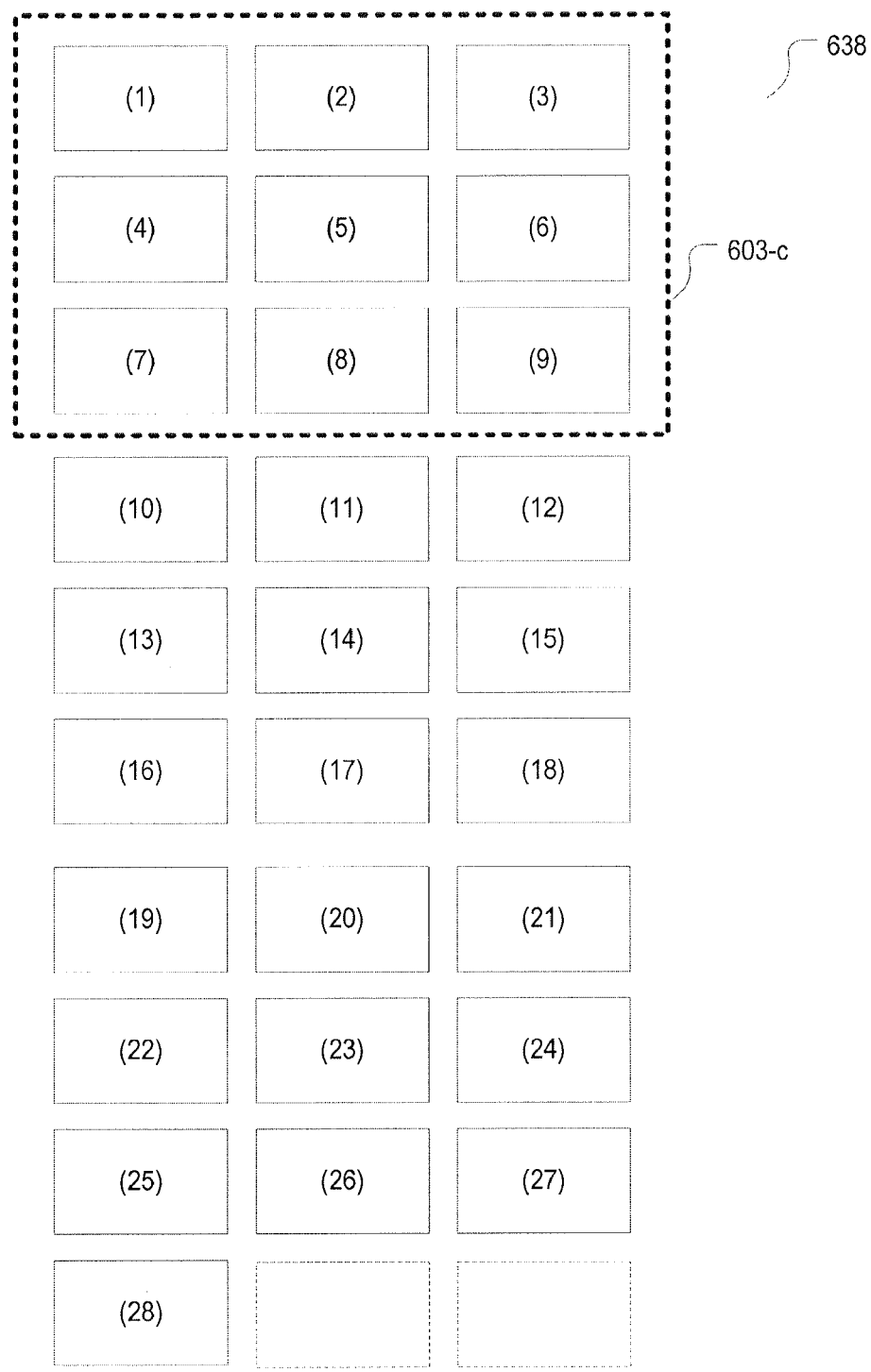

Subsequent to the configuration, device 501 detects an input corresponding to a request to move (e.g., scroll) viewport 593 to 603-b (FIG. 6C), 603-c (FIG. 6D) or 603-d (FIG. 6F), for example. In response to detecting the input, device 501 determines whether the detected input and the corresponding scrolling request (collectively, "detected input") meet the layout-adjustment criteria. If the detected input meets the layout-adjustment criteria, device 501 configures the layout of the graphical representations to remove the orphaning at the beginning of the matrix by reflowing the graphical representations from the beginning of matrix 598 in the direction from top left to bottom right, as shown in FIG. 6E. Device 501 then scrolls the viewport in accordance with the detected input in changed layout 638. If the detected input does not meet the layout-adjustment criteria, device 501 foregoes configuring the layout of graphical representations and proceeds to scroll the viewport in accordance with the input in layout 598, the same layout as before the scrolling. The layout-adjustment criteria may be set in a wide variety of ways and customized to different preference settings, a few examples of which are described below.

In some embodiments, the layout-adjustment criteria are met (thus triggering configuration of layout to fix/remove orphaning) when the detected input corresponds to a request to scroll the display to display a view of a different subset of graphical representations that are non-overlapping with subset 594 contained in prior viewport 593 before scrolling. Specifically, if the detected input corresponds to a request to move viewport 593 to 603-b, as shown in FIG. 6C, to display a view of a subset of graphical representations (6)-(14) which are at least partially overlapping with subset 594 previously contained in viewport 593—representations (12)-(14) are overlapping,—then, device 501 can determine that the layout-adjustment criteria are not met. In some embodiments, if the detected input corresponds to a request to move viewport 583 to 603-c, as shown in FIG. 6D, to display a view of a subset of graphical representations that are non-overlapping with subset 594, device 501 can determine that the layout-adjustment criteria are met, thereby trigger the configuration of the layout of graphical representations to remove orphaning at the beginning of the matrix (as shown in FIG. 6E).

In some embodiments, device 501 determines whether a certain percentage of the new subset of the graphical representations that are within the moved viewport is overlapping or non-overlapping with subset 594 that was contained in the previous viewport 593 before the scrolling. If the certain percentage of the new subset or more is overlapping with subset 594, device 501 determines that the layout-adjustment criteria are not met, thus not triggering a further layout configuration. Conversely, if the certain percentage of the new subset or more is non-overlapping with subset 594, device 501 determines that the layout-adjustment criteria are met, thereby, triggering a configuration of the layout to remove the orphaning (as shown in FIG. 6E).

In some embodiments, the layout-adjustment criteria are met when the detected input corresponds to a request to move up the viewport toward the beginning of the matrix, as opposed to a request to move down (e.g., scroll down) toward the bottom of the matrix. For example, in response to detecting an input corresponding to a request to move up viewport 593 to 603-*b* (FIG. 6C) or 603-*c* (FIG. 6D), device 501 determines that the layout-adjustment criteria are met (thus, triggering the layout configuration to remove orphaning), whereas in response to detecting an input corresponding to a request to move down viewport 593 to 603-*d* (FIG. 6F), it determines that the layout-adjustment criteria are not met and forgoes the layout configuration.

In some embodiments, the layout-adjustment criteria are met when the final location of the moved viewport, after the input corresponding to a scroll request ends, corresponds to one of the predefined locations in the matrix (e.g. the current layout of the graphical representations.) Example of the predetermined locations include, but are not limited to, the top row in the matrix, the first cell, the top left cell, the top center cell, the top right cell, or any other locations where undesired orphaning may occur in the matrix. For example, in FIG. 6D, the top row is one of many predetermined locations, and in response to detecting a request to scroll viewport 593 to 603-*c* which includes the top row, device 501 determines that the adjustment criteria are met. Optionally, device 501 designates different locations as predetermined location for different display property settings (e.g., if display 502 is in landscape mode, the predetermined location includes the top left cell, if portrait mode, the entire top row, etc.).

In some embodiments, the layout-adjustment criteria are met when the detected input corresponds to a request to move the viewport at a determinable speed, and the determinable speed is higher than or equal to a threshold speed. In some circumstances, the detected input is a touch gesture comprising movement of a finger on a touch-sensitive display, and the speed of the movement of the finger on the display is associated with (e.g., proportional to, equal to, otherwise having a certain formulaic relationship with) the speed of the requested scrolling. In some circumstances, the detected input is a hand gesture (e.g., a hand motion hovering over a display, etc.) which has a speed associated with it that can be used to infer the speed of the requested scrolling. Optionally, the detected input is an input from a mouse scrolling, which can have an associated speed as well. For example, if the requested scrolling is at a pace faster than a threshold, the purpose of the scrolling may not likely be to read continually from a previous screen to new screen. So, when the requested scrolling is at a pace faster than a threshold, device 501 proceeds to perform configuring the layout to fix orphaning.

In some embodiments, the layout-adjustment criteria are met when the detected input corresponds to a request to move the viewport over a determinable distance (e.g., amount), and the determinable distance (e.g., amount) is greater than or equal to a threshold distance (e.g., amount). In some circumstances, the detected input is a touch gesture comprising movement of a finger on a touch-sensitive display over a distance, and the distance moved by the finger on the display is associated with (e.g., proportional to, equal to, otherwise having a certain formulaic relationship with) the distance (e.g., amount) of the requested scrolling. In some circumstances, the detected input is a hand gesture (e.g., a hand motion hovering over a display, etc.) which has an associated amount of displacement that can be used to infer the distance/amount of the requested scrolling. Optionally, the detected input is an input from a mouse scrolling, which can have an associated amount of displacement as well. For example, if the requested scrolling is over a distance or amount greater than or equal to a threshold, the purpose of the scrolling may not likely be to read continually from a previous screen to new screen. Thus, when the requested scrolling is over a distance or amount greater than or equal to a threshold, device 501 proceeds to perform configuring the layout to fix orphaning.

One or more of the layout-adjustment criteria described above can be used in any alternative or additive combinations. For example, in additive combinations, the layout-adjustment criteria are met if two or more of the criteria are met—e.g., satisfy both the speed and directionality criteria. In alternative combinations, the layout-adjustment are met if any one of the multiple criteria is met—e.g., satisfy either the speed or directionality criteria. Many other permutations are possible. Further, it is to be noted that there can be many other conditions beyond the criteria described herein that can be used in any combinations with one or more criteria above.

In some circumstances, device 501 controls the times at which the fixing of orphaning occurs by controlling the requirement of the layout-adjustment criteria. For example, if the requirement requires detection of the final location of the moved viewport, the scroll input needs to end before device 501 can determine whether it meets the layout-adjustment criteria. Thus, the layout configuration does not start until the completion of the scroll input. If the requirement only requires detection of the directionality of the scroll input (e.g., up/down), device 501 can determine whether it meets the layout-adjustment criteria before the completion of the scroll input. Thus, in such cases, the process of configuring the layout of graphical representations is initiated before the completion of the scroll input.

In some embodiments, when the layout-adjustment criteria are met, only the orphaning that exists in the direction of the scrolling is fixed—e.g., if the input requests to scroll up the display, only the orphaning above current viewport 593 is fixed, and if the input requests to scroll down the display, only the orphaning below current viewport 593 is fixed. In some circumstances, the orphaning below viewport 593 is not fixed regardless of the direction of the scrolling. In some circumstances, the orphaning above viewport 593 is fixed regardless of the direction of the scrolling.

It is to be noted that the detected input corresponding to a request to scroll the display may be an input of various different types, a few example types of which include, but are not limited to, a mouse input, keyboard input, other input from mechanical input devices, touch input using a touch-sensitive surface or touch-sensitive display, finger contact (e.g., a single finger or multi-finger contact gestures such as drag gestures), voice input, motion input (e.g., a hand gesture such as waving or hovering over one or more sensors, display or other input devices, shaking the device, etc.,), and any other suitable types of input to command scrolling of the display.

FIGS. 7A-7E are a flow diagram illustrating process 700 for configuring layout of graphical representations of data objects in collection 500 in response to a change in collection 500 or in response to a change in display properties associated with viewport 503 covering subset 504 (FIG. 5A). Process 700 may be performed at an electronic device with a display and a touch-sensitive surface, like device 100 (FIG. 1), device 300 (FIG. 3), and device 460 (FIG. 4C). At block 702, the device displays, on a display, a subset of graphical representations of data objects in a collection. Optionally, at block 702-1, displaying the subset comprises displaying the graphical representations of data objects in the subset arranged in an order. Optionally, at block 702-2, graphical representations are arranged in a plurality of columns and rows (e.g., matrix 508 in FIGS. 5A and 5B), and while displaying the subset on the display, the number of graphical representations above the subset is evenly divisible by the number of columns in the plurality of columns (e.g., no orphaning).

At block 704, the device detects a change in the collection of data objects. Optionally, at block 704-1, the detected change in the collection is an addition of a data object in the collection or deletion of a data object from the collection. Such changes cause an addition of the graphical representation of the added data object in the layout of graphical representations (e.g., detected changes shown in FIGS. 5B, 5F and 5J) or deletion of the graphical representation of the deleted data object from the layout of graphical representations (e.g., detected changes shown in FIGS. 5D, 5H, 5L and 5N).

Optionally, at block 704-2, the detected change causes the number of graphical representations above the subset (being covered in the viewport and thus displayed on the display) to cease to be evenly divisible by the number of columns in the plurality of columns (e.g., the addition of graphical representation of data object "X" causes the number of graphical representations of data objects above subset 504 to become 9 from 8, so no longer evenly divisible by the number of columns, 4). Optionally, at block 704-3, the detected change in the collection is made from a device remote from the device detecting the change.

At block 706, the device determines a position associated with the detected change in the collection relative to the subset. At block 708, in accordance with a determination that the detected change is associated with a location above the subset, e.g., before the subset, before an anchor in the subset, (e.g., detected addition of graphical representation of data object "X" in FIG. 5B, or detected deletion of graphical representations of data objects (6) and (7) in FIG. 5D), the device configures the layout of graphical representations in accordance with the detected change. Optionally, at block 708-1, the layout is configured so that graphical representations of data objects above the subset are displayed as being arranged in a first direction (e.g., from bottom right to top left) in the plurality of columns and rows starting from an anchor in the subset (e.g., arrangement of graphical representations of data objects above subset 504 in FIGS. 5C and 5E). These changes are displayed on display 502 when the display is scrolled to display graphical representations above the subset.

Optionally, at block 708-2, the anchor in the subset is the graphical representation that is displayed in a predetermined position in a window used to display the subset of graphical representations on the display (e.g., anchor graphical representation (9) in FIG. 5A). For example, at block 708-3, the predetermined position is the top left area of the window.

At block 710, the device maintains the display of the subset of graphical representations on the display (e.g., the layout inside viewport 503 remains the same in FIGS. 5C and 5E, so the display of subset 504 on display 502 remains the same).

Figure 7A:
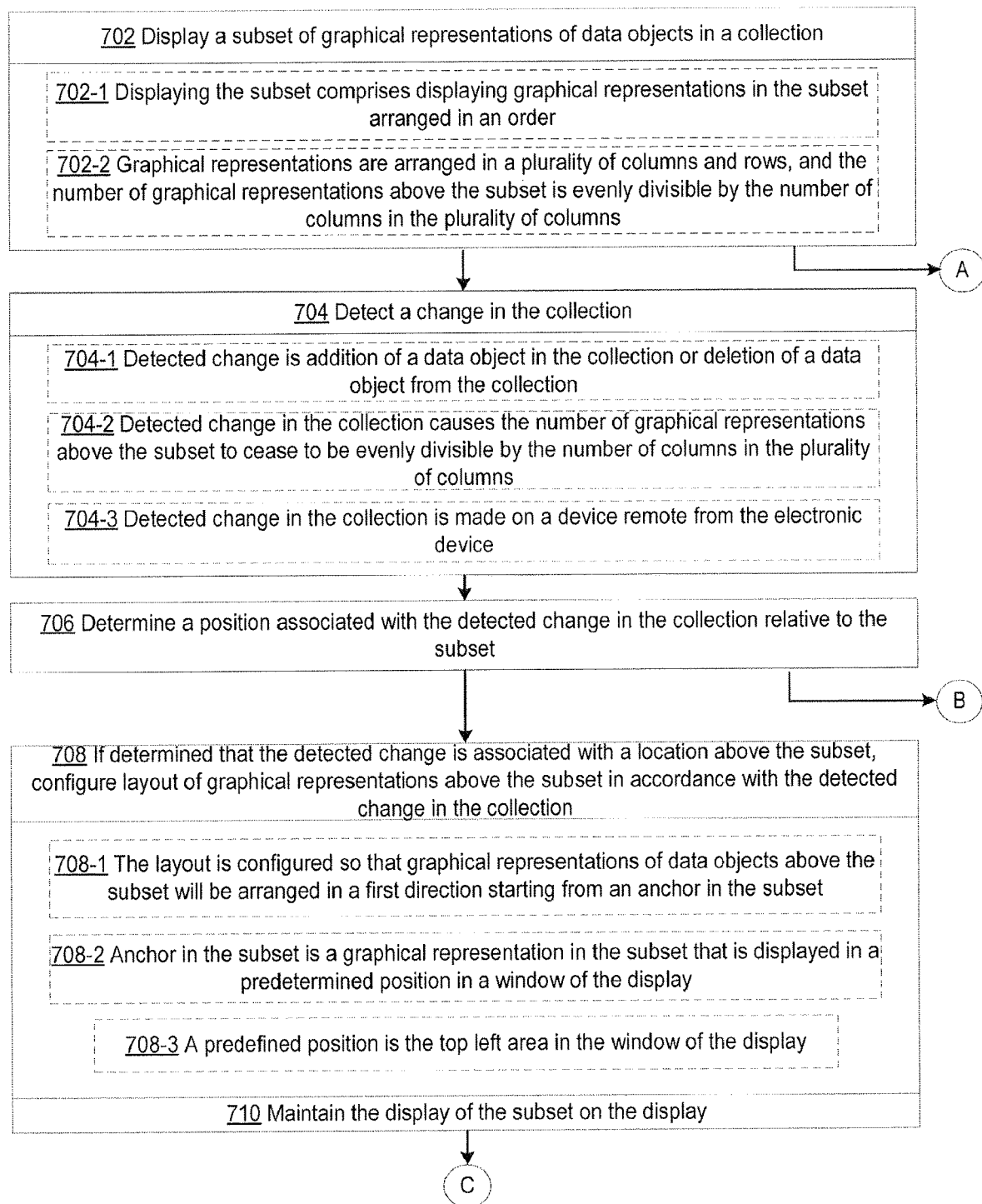
Figure 7B:
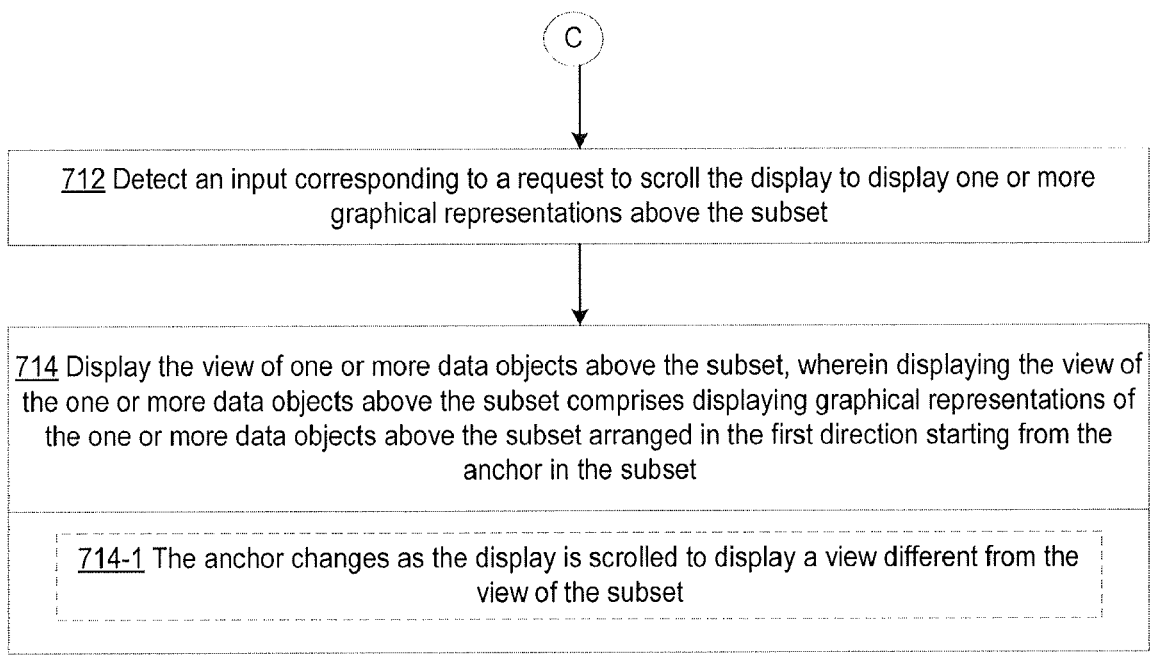
Figure 7E:
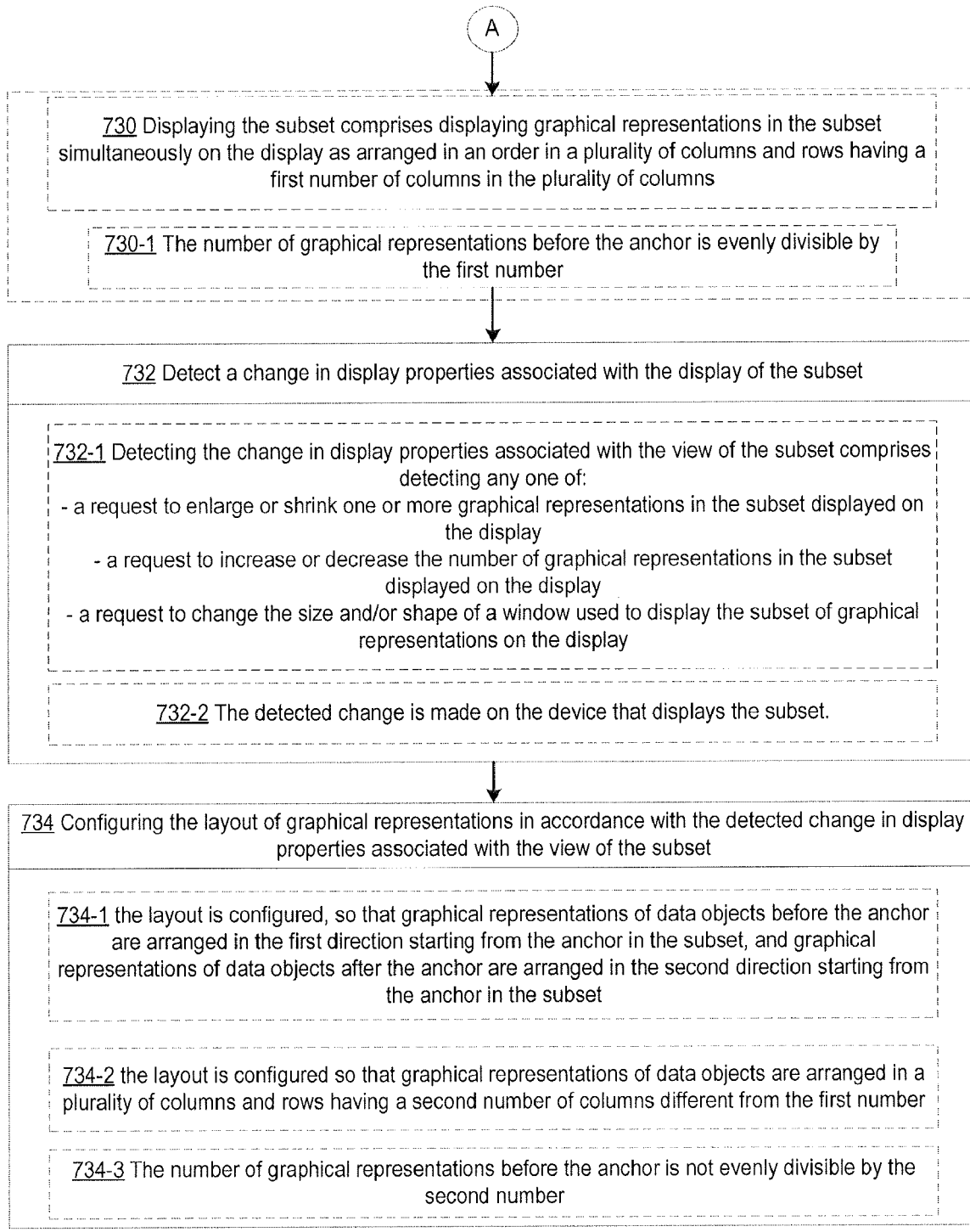

Continuing from FIG. 7A to FIG. 7B at point C, at block 712, the device detects an input corresponding to a request to scroll the display to display one or more graphical representations above the subset (e.g., the request to scroll viewport 503 to 503-*a* above subset 504 in FIG. 5C, or the request to scroll viewport 503 to 503-*b* above subset 504 in FIG. 5E). Optionally, the detected input is a touch scrolling gesture, mouse scrolling input, or any other equivalent scrolling input. The detected input corresponds to a request to scroll up the viewport as it corresponds to a request to display graphical representations "above" the subset that is included in the current viewport.

At block 714, the device scrolls the display in accordance with the input and displays the one or more graphical representations above the subset (e.g., the arrangement of graphical representations inside moved viewport 503-*a* in FIG. 5C, or the arrangement of graphical representations inside moved viewport 503-*b* in FIG. 5E). These graphical representations are arranged in the first direction (e.g., from bottom right to top left) starting from the anchor in the subset in accordance with the layout configured in block 708. Optionally, at block 714-1, as the viewport changes (e.g., as the display is scrolled), the anchor for the changed viewport is different from the anchor in the subset (e.g., the anchor changes from graphical representation (9) to (6) as viewport changes from 503 to 503-*a* in FIG. C, or the anchor changes from graphical representation (9) to (3) as viewport changes from 503 to 503-*b* in FIG. E). The graphical representations above the subset are arranged in the first direction starting from the anchor in the subset, i.e., the anchor in the previous subset within the viewport before scrolling (e.g., graphical representation (9) in FIGS. 5C and 5E).

Continuing from FIG. 7A to FIG. 7C at point B, at block 716, the device determines that the detected change in the collection is associated with a location after the anchor within the subset in response to detecting the change in the collection (e.g., addition of graphical representation of data object "Z" in FIG. 5J, deletion of graphical representation of data object (14) in FIG. 5L, or deletion of graphical representation of data object (9) in FIG. 5N). In accordance with such determination, the device configures layout of graphical representations in accordance with the detected change—e.g., to add/delete/modify the graphical representations(s) of the affected data objects in the collection.

Optionally, at block 716-1, the layout is configured so that graphical representations of data objects after the anchor within the subset are arranged in the second direction (e.g., from top left to bottom right) starting from the anchor in the subset (e.g., arrangement of graphical representations of data objects after the anchor in FIGS. 5K, 5M, 5O and 5P). Optionally, at blocks 716-2 and 716-3, the second direction is different from (e.g., opposite) the first direction.

Optionally, at block 716-4, arranging in the first direction includes arranging in a plurality of columns and rows from bottom right to top left (e.g., arrangement of graphical representations of data objects above subset 504 in FIGS. 5C and 5E). Optionally, at block 716-5, arranging in the second direction includes arranging in a plurality of columns and rows from top left to bottom right (e.g., arrangement of graphical representations of data objects after the anchor in FIGS. 5K, 5M, 5O and 5P).

Optionally, at block 716-6, in response to configuring the layout, the device displays, on the display, an animation of moving one or more graphical representations of the subset (e.g., changing layout of graphical representations within viewport 503 in FIGS. 5K, 5M, 5O and 5P). Optionally, at block 716-7, in response to configuring the layout, the device maintains the display of the graphical representation of the data object corresponding to the anchor in the subset on the display (e.g., graphical representation (9) corresponding to the anchor remains stationary within viewport 503 and on display 502 in FIGS. 5K, 5M, 5O and 5P).

At block 718, the device detects an input corresponding to a request to scroll the display to display one or more graphical representations above or below the subset. Optionally, the detected input is a touch scrolling gesture, mouse scrolling input, or any other equivalent scrolling input. At block 720, in response to the detected scrolling input, the display is scrolled in accordance with the scrolling input to display the graphical representations in accordance with the updated layout from the configuration (e.g., updated matrices 558, 568, 578, 588 in FIGS. 5K, 5M, 5O and 5P). Optionally, at block 720-1, as the viewport changes, the anchor for the new viewport also changes from the anchor in the subset.

Continuing from FIG. 7A to FIG. 7D at point B, at block 722, the device determines that the detected change in the collection is associated with a location below the subset in response to detecting the change in the collection (e.g., addition of graphical representation of data object "Y" in FIG. 5F, or deletion of graphical representation of data object (21) in FIG. 5H). In accordance with such determination, the device configures the layout of graphical representations in accordance with the detected change.

Optionally, at block 722-1, the layout is configured so that graphical representations after the subset are arranged in the second direction (e.g., from top left to bottom right) starting from the anchor in the subset (e.g., arrangement of graphical representations of data objects below subset 504 in FIGS. 5G and 5I). These changes are displayed when the display is scrolled to display graphical representations below the subset.

Optionally, at block 722-2, the anchor in the subset is the graphical representation that is displayed in a predetermined position in a window used to display the subset of graphical representations on the display (e.g., anchor graphical representation (9) in FIG. 5A). For example, at block 722-3, the predetermined position is the top left area of the window.

At block 724, the device maintains the display of the subset of graphical representations on the display (e.g., the layout inside viewport 503 remains the same in FIGS. 5G and 5I, so the display of subset 504 on display 502 remains the same).

At block 726, the device detects an input corresponding to a request to scroll the display to display one or more graphical representations below the subset (e.g., the request to scroll viewport 503 to 503-*c* below subset 504 in FIG. 5G, or the request to scroll viewport 503 to 503-*d* above subset 504 in FIG. 5I). Optionally, the detected input is a touch scrolling gesture, mouse scrolling input, or any other equivalent scrolling input. The detected input corresponds to a request to scroll down the viewport as it corresponds to a request to display graphical representations "below" the subset that is included in the current viewport.

At block 728, the device displays the graphical representations below the subset as being arranged in the second direction from the anchor in the subset (e.g., the arrangement of graphical representations inside moved viewport 503-*c* in FIG. 5G, or the arrangement of graphical representations inside moved viewport 503-*d* in FIG. 5I). These graphical representations are arranged in the second direction (e.g., from top left to bottom right) starting from the anchor in the subset in accordance with the layout configured in block 722. Optionally, at block 728-1, as the viewport changes (e.g., as the display is scrolled), the anchor for the changed viewport is different from the anchor in the subset (e.g., the anchor changes from graphical representation (9) to (17) as viewport changes from 503 to 503-*c* in FIG. G, or the anchor changes from graphical representation (9) to (13) as viewport changes from 503 to 503-*d* in FIG. I). The graphical representations below the subset are arranged in the second direction starting from the anchor in the subset, i.e., the anchor in the previous subset within the viewport before scrolling (e.g., graphical representation (9) in FIGS. 5G and 5I).

Continuing from FIG. 7A to FIG. 7E at point A, at block 730, the device is displaying the subset of graphical representations of data objects in the collection. Displaying the subset on the display comprises displaying graphical representations in the subset simultaneously on the display as arranged in an order in a plurality of columns and rows (e.g., matrix 508 in FIG. 5A). The plurality of columns and rows may have a first number of columns. Optionally, at block 730-1, the number of graphical representations before the anchor may be evenly divisible by the first number (e.g., in FIG. 5A, the number of graphical representations before anchor (9) is eight, which is evenly divisible by the first number, four).

At block 732, the device detects a change in display properties associated with the display of the subset while the device displays the subset (e.g., change in display orientation in FIG. 5Q or change in the shape of display window in FIG. 5R). Optionally, at block 732-1, detecting the change in display properties comprises detecting the request to change size (e.g., enlarge or shrink) of one or more graphical representations in the subset displayed on the display, detecting the request to change the number (e.g., increase or decrease) of the graphical representations in the subset, and/or detecting the request to change the size and/or shape of the window used to display the subset of graphical representations on the display. Optionally, at block 732-2, the detected change is made on the device that displays the subset.

At block 734, in response to detecting such a change, the device configures the layout of graphical representations in accordance with the detected change in display properties associated with the view of the subset (e.g., changing the layout as shown in FIGS. 5Q and 5R). Optionally, at block 734-1, the layout is configured so that graphical representations of data objects before the subset are arranged in the first direction starting from the anchor, and graphical representations of data objects after the subset are arranged in the second direction starting from the anchor (e.g., graphical representations (1)-(8) before anchor (9) are arranged in the first direction, and graphical representations (10)-(28) after anchor (9) are arranged in the second direction in respective matrices in FIGS. 5Q and 5R).

Optionally, at block 734-2, the layout is configured so that the graphical representations of data objects are arranged in a plurality of columns having a second number of columns different from the first number (e.g., in changing the layout from matrix 508 in FIG. 5A to 598 in FIG. 5Q, the number of columns has changed from four to three, and in changing the layout from matrix 508 in FIG. 5A to 598-A in FIG. 5R, the number of columns has changed from four to five).

Optionally, at block 734-3, the number of graphical representations before the anchor is not evenly divisible by the second number (e.g., the number of graphical representations before anchor (9), eight, is not evenly divisible by either the respective second numbers in FIGS. 5Q and 5R, i.e., three and five).

It should be understood that the particular order in which the operations in FIGS. 7A-7E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 800) are also applicable in an analogous manner to method 700 described above with respect to FIGS. 7A-7E. For example, the inputs, collections, graphical representations, anchors, and data objects, described above with reference to method 700 optionally have one or more of the characteristics of the inputs, collections, graphical representations, anchors, and data objects described herein with reference to other methods described herein (e.g., method 800). For brevity, these details are not repeated here.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 7A-7E are, optionally, implemented by components depicted in FIGS. 1A-1B. For example, detection operations 712, 718, and 726, displaying operations 714 and 720, and configuring operations 716 and 722 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 8A-8B is a flow diagram illustrating process 800 for detecting a scrolling request and removing orphaning when the layout-adjustment criteria are met. In FIG. 8A, at block 802, the device displays a subset of graphical representations of data objects in a collection (e.g., the subset within viewport 503 in FIG. 6A, or the subset within viewport 593 in FIG. 6C). Optionally, at block 802-1, the graphical representations are arranged in an order in a plurality of columns and rows (e.g., the graphical representations are arranged in an order in matrix 518 in FIG. 6A, or in matrix 598 in FIG. 6C).

Figure 6F:
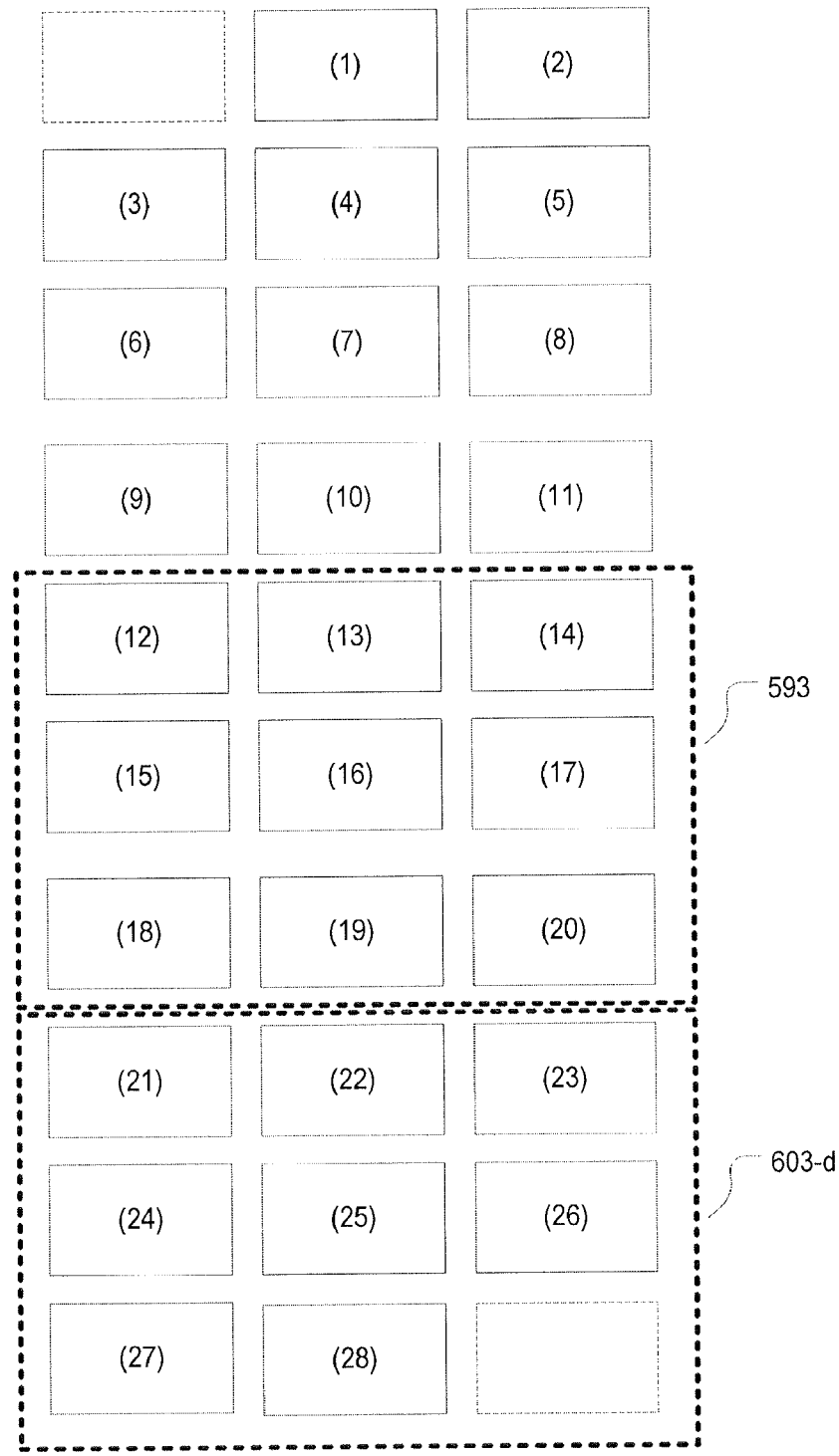

Optionally, at block 802-2, there may be one or more rows above the subset that contain a number of graphical representations not evenly divisible by the number of columns in the plurality of columns (e.g., in FIGS. 6A, 6C, 6D and 6F). In FIG. 6A, the top row above the subset within viewport 503 contains only one graphical representation, which is not evenly divisible by the number of columns, four. In FIGS. 6C, 6D and 6F, the top row above the subset within viewport 593 contains two graphical representations, which is not evenly divisible by the number of columns, three.

Optionally, at block 802-3, the device detects a change in the collection of data objects that causes the one or more rows in the plurality of rows above the subset to contain the number of graphical representations that is not evenly divisible by the number of columns (e.g., addition or deletion of a data object as shown in FIGS. 5B-5P). For example, the layout of matrix 518 shown in FIG. 6A results from detecting a change in collection 500 above subset 504, as described in reference to in FIGS. 5B-5C.

Optionally, at block 802-4, the device detects a change in display properties associated with the view of the subset that causes the one or more rows in the plurality of rows above the subset to contain the number of graphical representations that is not evenly divisible by the number of columns (e.g., change in display orientation or shape of display window as shown in FIGS. 5Q-5R). For example, the layout of matrix 598 shown in FIGS. 6C, 6D and 6F results from detecting a change in display properties associated with the view of subset 504, as described in reference to FIG. 5Q.

At block 804, the display detects an input corresponding to a request to scroll the display to display one or more graphical representations above the subset (e.g., the request to scroll up viewport 503 to 603-a in FIG. 6A, the request to scroll up viewport 593 to 603-b in FIG. 6B, or the request to scroll up viewport 593 to 603-c in FIG. 6D). Optionally, if the detected input corresponds to a request to scroll the display one or more graphical representations below the subset (e.g., the request to scroll down viewport 593 to 603-d in FIG. 6F), the device proceeds to scroll the display in accordance with the input, foregoing the determination at block 806.

At block 806, in response to detecting the scrolling input, the device determines whether the detected input meets the layout-adjustment criteria. Optionally, at block 806-1, the adjustment criteria are met when the detected input corresponds to a request to scroll the display to display a view of a different subset of graphical representations that are non-overlapping with the first subset (e.g., in FIG. 6A the subset in scrolled viewport 603-a is non-overlapping with the subset in prior viewport 503, or in FIG. 6D the subset in scrolled viewport 603-c is non-overlapping with the subset in prior viewport 593). Optionally, at block 806-2, the adjustment criteria are met when the detected input corresponds to a request to scroll the display to display a graphical representation representing the beginning data object in the collection (e.g., in FIG. 6A, the subset in scrolled viewport 603-a includes the beginning (1) of the collection, and in FIG. 6D the subset in scrolled viewport 603-c includes the beginning (1) of the collection).

Optionally, at block 806-3, the adjustment criteria are met when the detected input is movement of a finger on the display, and the detected movement is associated with a speed greater than or equal to a threshold speed (e.g., speed associated with movement of a finger on touch-sensitive display 502 in FIG. 5A). Optionally, at block 806-4, the adjustment criteria are met when the detected input is movement of a finger on the display, and the detected movement on the display is associated with a distance greater than or equal to a threshold distance on the display (e.g., distance associated with movement of a finger on touch-sensitive display 502 in FIG. 5A).

Continuing from FIG. 8A to FIG. 8B at point A, at block 808, if the device determines that the detected input does not meet the layout-adjustment criteria, the device scrolls the display in accordance with the detected input to display one or more graphical representations in accordance with the same layout as before the detection of the scrolling input (e.g., FIGS. 6C and 6F). Optionally, at block 808-1, the one or more rows in the plurality of rows above the subset, which was previously determined at block 802 to contain the number of graphical representations not evenly divisible by the number of columns, continues to contain the same number of graphical representations not evenly divisible by the number of columns (e.g., in FIGS. 6C and 6F the top row continues to contain two graphical representations). Optionally, at block 808-2, the one or more rows above the subset that continues to contain the number of graphical representations not evenly divisible by the number of columns include the top row (e.g., FIGS. 6C and 6F). Optionally, at block 808-3, in response to a determination that the adjustment criteria are not met, the device forgoes configuring the layout of graphical representations to fix the orphaning and directly proceeds to scroll the display in accordance with the detected scrolling input.

At block 810, if the device determines that the detected scrolling input meets the layout-adjustment criteria, the device configures the layout of graphical representation so that the one or more rows above the subset that was previously determined at block 802 to contain the number of data objects not evenly divisible by the number of columns, contains a different number of data objects that is evenly divisible by the number of columns (e.g., in FIGS. 6B and 6E). In FIG. 6B, after configuration of the layout of graphical representations, the top row contains four graphical representations, which is evenly divisible by the number of columns, four. In FIG. 6E, after configuration of the layout of graphical representations, the top row contains three graphical representations, which is evenly divisible by the number of columns, three.

At block 812, after the layout is configured at block 810, the device scrolls the display to display one or more graphical representations above the subset in accordance with the changed layout (e.g., updated matrix 618 in FIG. 6B, and updated matrix 638 in FIG. 6E). Optionally, at block 812-1, the device displays a predefined visual effect before displaying the one or more graphical representations within the scrolled viewport above the subset, as requested by the scrolling input (e.g., a pop visual effect). The visual effect may indicate to users that the graphical objects have been reflowed.

In some embodiments (e.g., touchscreen embodiments), the device that is performing process 700 and 800 has a touch screen display and a touch-sensitive surface is on the display. In some embodiments (e.g., non-touchscreen embodiments), the device has a display separate from the touch-sensitive surface. For example, in touchscreen embodiments, the device may detect a change in display properties associated with the view of the subset (e.g., the viewport 503 in FIG. 5A) or input corresponding to a scrolling request from touch input using a touch object, such as a tap, a long-duration touch, a flick, a swipe, or another applicable touch gesture. In non-touchscreen embodiments, the device may detect such change and input from mouse events generated using a mouse or equivalent input device, such as a click, double click, drag, and so forth. Combinations of the embodiments are possible. For example, a touchscreen device can be responsive to an external wireless mouse, thus devices in the touchscreen embodiments can also be responsive to mouse and mouse cursor input techniques. Likewise, a non-touchscreen device can be responsive to a touch-sensitive surface (e.g., touchpad), thus devices of the non-touchscreen embodiments can also be responsive to touch input.

In some embodiments, the device may detect a change in the collection that is made by a different device on a network while the device is displaying a view of a subset of the collection. The change made by the different device can be detected over a lower-powered wireless communication protocol or a higher-powered wireless communication protocol. The lower-powered wireless communication protocol may have a lower bandwidth and/or slower data transfer rate, meaning that the lower-powered wireless communication protocol has a lower data transfer capacity. In some embodiments, the lower-powered wireless communication protocol is a peer-to-peer protocol and the higher-powered wireless communication protocol is a local-area-network protocol. In some embodiments, the lower-powered wireless communication protocol is the Bluetooth or Bluetooth Low Energy protocol, and the higher-powered wireless communication protocol is a IEEE 802.11x WiFi protocol.

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 800 described above with respect to FIGS. 8A-8B. For example, the inputs, collections, graphical representations, anchors, and data objects, described above with reference to method 800 optionally have one or more of the characteristics of the inputs, collections, graphical representations, anchors, and data objects described herein with reference to other methods described herein (e.g., method 700). For brevity, these details are not repeated here.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 8A-8B are, optionally, implemented by components depicted in FIGS. 1A-1B. For example, displaying operation 802, detecting operation 804, scrolling operations 808 and 812, and configuring operation 810, are optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 9:
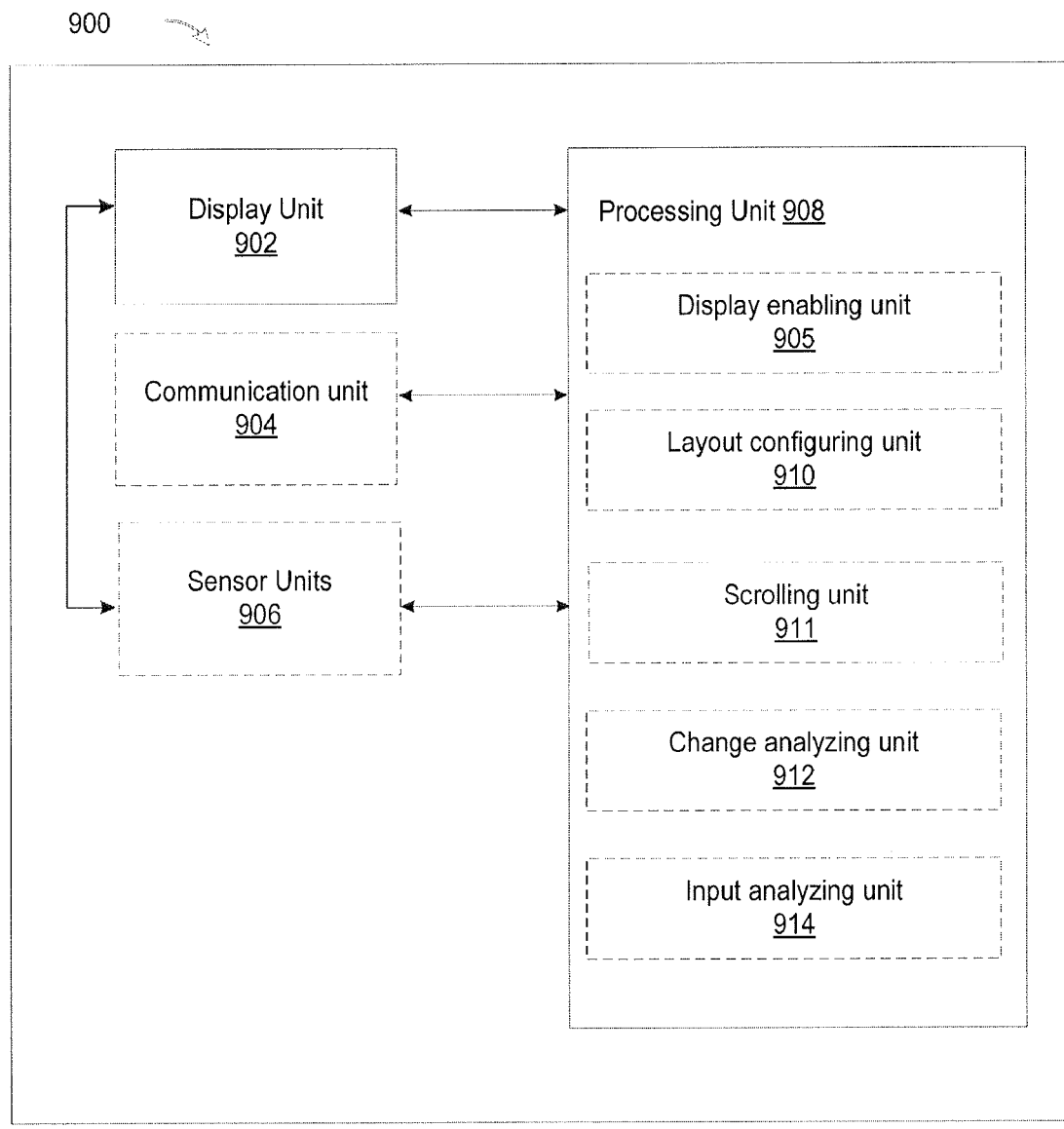
FIG. 9 is a functional block diagram of an electronic device in accordance with some embodiments.

FIG. 9 shows exemplary functional blocks of an electronic device 900 that, in some examples, perform the features described above. The functional blocks of the device are, optionally, implemented by hardware, software, or a combination of hardware and software to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 optionally includes a display unit 902 configured to display graphical representations of data objects in a collection; a communication unit 904 configured to access a collection of data objects stored remotely and detect a change in the collection, one or more sensor units 906 configured to detect a change associated with a viewport; and a processing unit 908 coupled to display unit 902, communication unit 904, and sensor units 906. In some embodiments, processing unit 908 is configured to use display enabling unit 905 to display graphical representations of data objects that are within a current viewport using the layout configured in layout configuring unit 910. In some embodiments, processing unit 908 is configured to detect a change in collection stored remotely, through communication unit 904, and analyze one or more attributes of the detected change in change analyzing unit 912. In some embodiments, processing unit 908 is configured to detect an input from a user operating device 900, from sensor units 906, and analyze the detected input in input analyzing unit 914.

In some embodiments, display enabling unit 905 of device 900 causes display unit 102 to display a subset of graphical representations of data objects in a collection. Optionally, device 900 displays, according to the layout determined in layout configuring unit 910, the subset so that the graphical representations of data objects in the subset are arranged in an order in a plurality of columns and rows (e.g., matrix 508 in FIGS. 5A and 5B). Optionally, layout configuring unit 910 configures the layout of graphical representations so that the number of graphical representations above the subset is evenly divisible by the number of columns in the plurality of columns (e.g., no orphaning).

In some embodiments, device 900 detects a change in the collection of data objects using communication unit 904. Optionally, the change is made by a device remote from device 900 and is detected by communication unit 904 of device 900. Device 900 is configured to communicate with the remote device and access the collection stored remotely using communication unit 904.

After detecting the change, change analyzing unit 912 determines one or more attributes of the detected change, such as whether the detected change is an addition of a data object in the collection or deletion of a data object from the collection, etc. The information of the detected change is communicated to layout configuring unit 910 so that layout configuring unit 910 determines whether it needs to configure the layout in response to the detected change, and if so, how the layout should be updated in view of the change (e.g., whether the change is an addition or deletion of one or more data objects in the collection, whether the detected change is associated with a location above, below, or within the subset currently within the viewport, etc.).

In some embodiments, change analyzing unit 912 determines the position associated with the detected change in the collection relative to the subset that is currently being viewed in viewport 503. Optionally, in accordance with a determination of change analyzing unit 912 that the detected change in the collection is associated with a location above the subset, e.g., before the subset, before an anchor in the subset, (e.g., detected addition of graphical representation of data object "X" in FIG. 5B, or detected deletion of graphical representations of data objects (6) and (7) in FIG. 5D), layout configuring unit 910 configures the layout (e.g., updates the layout) so that graphical representations of data objects above the subset are displayed as being arranged in a first direction, e.g., from bottom right to top left, in the plurality of columns and rows starting from an anchor in the subset (e.g., arrangement of graphical representations of data objects above subset 504 in FIGS. 5C and 5E).

Optionally, in accordance with a determination of change analyzing unit 912 that the detected change in the collection is associated with a location after the anchor within the subset (e.g., addition of graphical representation of data object "Z" in FIG. 5J, deletion of graphical representation of data object (14) in FIG. 5L, or deletion of graphical representation of data object (9) in FIG. 5N), layout configuring unit 910 configures the layout so that graphical representations of data objects after the anchor within the subset are arranged in the second direction, e.g., from top left to bottom right, starting from the anchor in the subset (e.g., arrangement of graphical representations of data objects after the anchor in FIGS. 5K, 5M, 5O and 5P). In some circumstances, layout configuring unit 910 configures the layout so that the second direction is different from (e.g., opposite) the first direction.

Optionally, in accordance with a determination of change analyzing unit 912 that the detected change in the collection is associated with a location below the subset in response to detecting the change in the collection (e.g., addition of graphical representation of data object "Y" in FIG. 5F, or deletion of graphical representation of data object (21) in FIG. 5H), layout configuring unit 910 configures the layout so that graphical representations after the subset are arranged in the second direction, e.g., from top left to bottom right, starting from the anchor in the subset (e.g., arrangement of graphical representations of data objects below subset 504 in FIGS. 5G and 5I). Optionally, layout configuring unit 910 configures the layout so that these changes are not displayed on display unit 902 until device 100 scrolls (e.g., with scrolling unit 911) a user interface on display unit 902 to display graphical representations below the subset.

In some embodiments, layout configuring unit 910 configures the layout so that the number of graphical representations above the subset (currently included in the viewport) ceases to be evenly divisible by the number of columns in the plurality of columns (e.g., in FIG. 5C, the addition of graphical representation of data object "X" causes the number of graphical representations of data objects above subset 504 to become nine from eight, so no longer evenly divisible by the number of columns, four).

In some embodiments, layout configuring unit 910 selects the anchor in the subset to be the graphical representation displayed in a predetermined position in a window used to display the subset of graphical representations on display unit 902 (e.g., anchor graphical representation (9) in FIG.

5A). Optionally, layout configuring unit 910 has a pre-set and/or modifiable setting specifying that the predetermined position is the top left area of the window.

Optionally, layout configuring unit 910 configures the layout so that arranging in the first direction includes arranging in a plurality of columns and rows from bottom right to top left (e.g., arrangement of graphical representations of data objects above subset 504 in FIGS. 5C and 5E). Optionally, layout configuring unit 910 configures the layout so that arranging in the second direction includes arranging in a plurality of columns and rows from top left to bottom right (e.g., arrangement of graphical representations of data objects after the anchor in FIGS. 5K, 5M, 5O and 5P).

Optionally, device 900 displays, on display unit 902, an animation of moving one or more graphical representations of the subset (e.g., changing layout of graphical representations within viewport 503 in FIGS. 5K, 5M, 5O and 5P). Optionally, display unit 902 maintains the display of the graphical representation of the data object corresponding to the anchor in the subset on the display (e.g., graphical representation (9) corresponding to the anchor remains stationary within viewport 503 and on display 502 in FIGS. 5K, 5M, 5O and 5P).

Device 900 detects, from sensor units 906, an input corresponding to a request to scroll the display to display one or more graphical representations above or below the subset (e.g., input to scroll viewport 503 to 503-*a* in FIG. 5C, input to scroll viewport 503 to 503-*b* in FIG. 5E, input to scroll viewport 503 to 503-*c* in FIG. 5G, or input to scroll viewport 503 to 503-*d* in FIG. 5I). Optionally, sensor units 906 detect the scrolling input by detecting a touch scrolling gesture, a mouse scrolling input, or any other equivalent scrolling input. Input analyzing unit 914 determines that the detected input corresponds to a request to scroll up or down the viewport. Device 900 then scrolls (e.g., with scrolling unit 911) a user interface displayed on display unit 902 in accordance with the detected scrolling input and displays (e.g., with display enabling unit 905) graphical representations that are within the scrolled viewport (e.g., the subset in 503-*a* in FIG. 5C, the subset in 503-*b* in FIG. 5E, the subset in 503-*c* in FIG. 5G, or the subset in 503-*d* in FIG. 5I) on display unit 902.

In some embodiments, sensor units 906 detect a change in display properties associated with display of the subset while the subset is displayed on display unit 902 (e.g., orientation of display unit 902 or any other attributes associated with display unit 902, as shown in FIGS. 5Q and 5R). Optionally, sensor units 906 detect such a change in display properties by detecting the request to change size (e.g., enlarge or shrink) of one or more graphical representations in the subset displayed on the display, detecting the request to change the number (e.g., increase or decrease) of the graphical representations in the subset, and/or detecting the request to change the size and/or shape of the window used to display the subset of graphical representations on the display. Optionally, sensor units 906 detect the change by an input directly received by device 900.

In response to detecting the change in display properties using sensor units 906, layout configuring unit 910 configures the layout of graphical representations in accordance with the changed display properties (e.g., changing the layout as shown in FIGS. 5Q and 5R). Optionally, layout configuring unit 910 configures the layout so that graphical representations of data objects before the subset are arranged in the first direction starting from the anchor, and graphical representations of data objects after the subset are arranged in the second direction starting from the anchor (e.g., graphical representations (1)-(8) before anchor (9) are arranged in the first direction, and graphical representations (10)-(28) after anchor (9) are arranged in the second direction in respective matrices in FIGS. 5Q and 5R).

Optionally, layout configuring unit 910 configures the layout so that graphical representations of data objects are arranged in a plurality of columns having a second number of columns different from the first number (e.g., in changing the layout from matrix 508 in FIG. 5A to 598 in FIG. 5Q, the number of columns has changed from four to three, and in changing the layout from matrix 508 in FIG. 5A to 598-A in FIG. 5R, the number of columns has changed from four to five). Optionally, layout configuring unit 910 configures the layout so that the number of graphical representations before the anchor is not evenly divisible by the second number (e.g., the number of graphical representations before anchor (9), eight, is not evenly divisible by either the respective second numbers in FIGS. 5Q and 5R, i.e., three and five).

The functional blocks of the device 900 are, optionally, implemented by hardware, software, or a combination of hardware and software to carry out the principles of the various described examples. It is understood by persons of skill in the art that the functional blocks described in FIG. 9 are, optionally, combined or separated into sub-blocks to implement the principles of the various described examples. Therefore, the description herein optionally supports any possible combination or separation or further definition of the functional blocks described herein.

Figure 10:
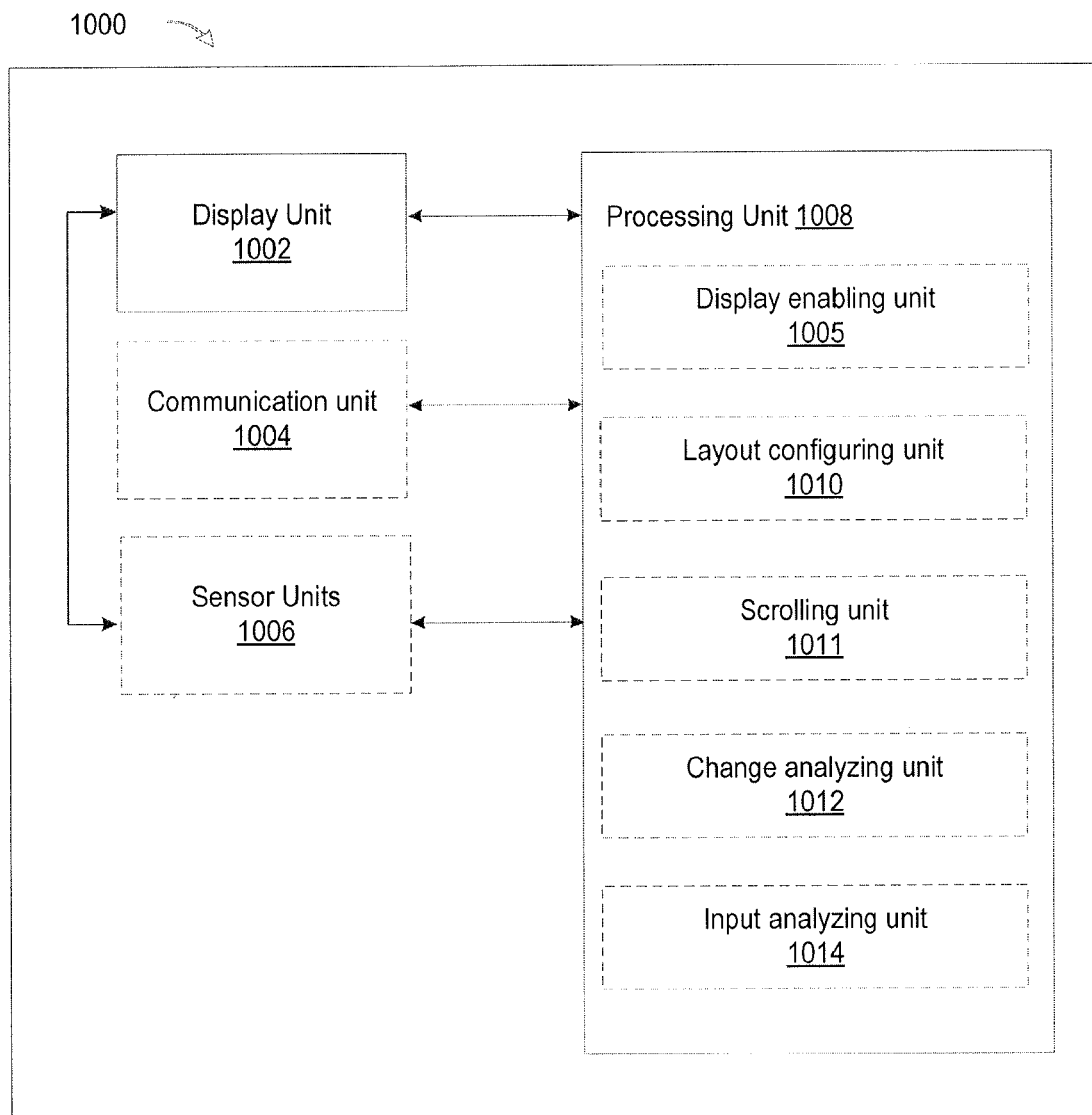
FIG. 10 is a functional block diagram of an electronic device in accordance with some embodiments.

FIG. 10 shows exemplary functional blocks of an electronic device 1000 that, in some examples, perform the features described above. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 optionally includes a display unit 1002 configured to display graphical representations of data objects in a collection; a communication unit 1004 configured to access a collection of data objects stored remotely and detect a change in the collection; one or more sensor units 1006 configured to detect a change associated with a viewport; and a processing unit 1008 coupled to display unit 1002, communication unit 1004, and sensor units 1006. In some embodiments, processing unit 1008 is configured to use display enabling unit 1005 to display graphical representations of data objects that are within a current viewport using the layout configured in layout configuring unit 1010. In some embodiments, processing unit 1008 is configured to detect a change in collection stored remotely, through communication unit 1004, and analyze one or more attributes of the detected change in change analyzing unit 1012. In some embodiments, processing unit 1008 is configured to detect an input from a user operating device 1000, from sensor units 1006, and analyze the detected input in input analyzing unit 1014. In some embodiments, processing unit 1008 is configured to determine whether the detected input meets the layout adjustment criteria; and based on the determination, layout configuring unit 1010 performs different layout configuration.

In some embodiments, displaying enabling unit 1005 of device 1000 causes display unit 1002 to display a subset of graphical representations of data objects in a collection (e.g., the subset within viewport 503 in FIG. 6A, or the subset within viewport 593 in FIG. 6C). Optionally, in accordance with the layout configured by layout configuring unit 1010, the graphical representations are arranged in an order in a plurality of columns and rows (e.g., the graphical representations are arranged in an order in matrix 518 in FIG. 6A, or in matrix 598 in FIG. 6C).

Optionally, in accordance with the layout configured by layout configuring unit 1010, there are one or more rows above the subset that contain a number of graphical representations not evenly divisible by the number of columns in the plurality of columns (e.g., in FIGS. 6A, 6C, 6D and 6F). For example, device 1000 detects, using communication unit 1004, a change in the collection of data objects that causes the one or more rows in the plurality of rows above the subset to contain the number of graphical representations that is not evenly divisible by the number of columns (e.g., addition or deletion of a data object as shown in FIGS. 5B-5P). For example, device 1000 detects, using sensor units 1006, a change in display properties associated with the view of the subset that causes the one or more rows in the plurality of rows above the subset to contain the number of graphical representations that is not evenly divisible by the number of columns (e.g., change in display orientation or shape of display window as shown in FIGS. 5Q-5R).

In some embodiments, device 1000 detects, using sensor units 1006, an input. Device 1000 then determines, using input analyzing unit 1014 whether the detected input corresponds to a request to scroll the display to display one or more graphical representations above the subset (e.g., the request to scroll up viewport 503 to 603-a in FIG. 6A, the request to scroll up viewport 593 to 603-b in FIG. 6B, or the request to scroll up viewport 593 to 603-c in FIG. 6D) or below the subset (e.g., the request to scroll down viewport 593 to 603-d in FIG. 6F).

In some embodiments, input analyzing unit 1014 further determines whether the detected input meets the layout adjustment criteria. Optionally, input analyzing unit 1014 determines that the adjustment criteria are met when the detected input corresponds to a request to scroll the display to display a view of a different subset of graphical representations that are non-overlapping with the first subset (e.g., in FIG. 6A the subset in scrolled viewport 603-a is non-overlapping with the subset in prior viewport 503, or in FIG. 6D the subset in scrolled viewport 603-c is non-overlapping with the subset in prior viewport 593). Optionally, input analyzing unit 1014 determines that the adjustment criteria are met when the detected input corresponds to a request to scroll the display to display a graphical representation representing the beginning data object in the collection (e.g., in FIG. 6A, the subset in scrolled viewport 603-a includes the beginning (1) of the collection, and in FIG. 6D the subset in scrolled viewport 603-c includes the beginning (1) of the collection). Optionally, input analyzing unit 1014 determines that the adjustment criteria are met when the detected input is movement of a finger on the display, and the detected movement is associated with a speed greater than or equal to a threshold speed (e.g., speed associated with movement of a finger on touch-sensitive display 502 in FIG. 5A). Optionally, input analyzing unit 1014 determines that the adjustment criteria are met when the detected input is movement of a finger on the display, and the detected movement on the display is associated with a distance greater than or equal to a threshold distance on the display (e.g., distance associated with movement of a finger on touch-sensitive display 502 in FIG. 5A).

In some embodiments, if input analyzing unit 1014 determines that the detected input does not meet the layout-adjustment criteria, device 1000 scrolls (e.g., with scrolling unit 1011) a user interface displayed on display unit 1002 in accordance with the detected input to display one or more graphical representations in accordance with the same layout as before the detection of the scrolling input (e.g., FIGS. 6C and 6F). Optionally, the one or more rows in the plurality of rows above the subset, which was previously determined at block 802 to contain the number of graphical representations not evenly divisible by the number of columns, continues to contain the same number of graphical representations not evenly divisible by the number of columns (e.g., in FIGS. 6C and 6F the top row continues to contain two graphical representations). Optionally, the one or more rows above the subset that continues to contain the number of graphical representations not evenly divisible by the number of columns include the top row (e.g., FIGS. 6C and 6F). Optionally, in response to a determination by input analyzing unit 1014 that the adjustment criteria are not met, layout configuring unit 1010 forgoes configuring the layout of graphical representations to fix the orphaning and directly proceeds to scroll the display in accordance with the detected scrolling input.

In some embodiments, if input analyzing unit 1014 determines that the detected input meets the layout-adjustment criteria, layout configuring unit 1010 configures the layout of graphical representation so that the one or more rows above the subset that was previously determined to contain the number of data objects not evenly divisible by the number of columns, contains a different number of data objects that is evenly divisible by the number of columns (e.g., in FIGS. 6B and 6E). For example, in FIG. 6B, after configuration of the layout of graphical representations, the top row contains four graphical representations, which is evenly divisible by the number of columns, four. In FIG. 6E, after configuration of the layout of graphical representations, the top row contains three graphical representations, which is evenly divisible by the number of columns, three.

After the layout is configured by layout configuring unit 1010, device 1000 scrolls (e.g., with scrolling unit 1011) a user interface displayed on display unit 1002 to display one or more graphical representations above the subset in accordance with the changed layout (e.g., updated matrix 618 in FIG. 6B, and updated matrix 638 in FIG. 6E). Optionally, display unit 1002 displays a predefined visual effect before displaying the one or more graphical representations within the scrolled viewport above the subset, as requested by the scrolling input (e.g., a pop visual effect). Optionally, the visual effect is used to indicate to users that the graphical objects have been reflowed.

The functional blocks of the device 1000 are, optionally, implemented by hardware, software, or a combination of hardware and software to carry out the principles of the various described examples. It is understood by persons of skill in the art that the functional blocks described in FIG. 10 are, optionally, combined or separated into sub-blocks to implement the principles of the various described examples. Therefore, the description herein optionally supports any possible combination or separation or further definition of the functional blocks described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A non-transitory computer-readable storage medium storing one or more programs, the one or more programs comprising instructions, which when executed by an electronic device with a display, cause the device to:
    display, on the display, a first subset of graphical representations of data objects in a collection, wherein the graphical representations of data objects in the collection are arranged in an order;
    while displaying the first subset of graphical representations, detecting a change in the collection of data objects;
    in response to detecting the change in the collection of data objects:
        in accordance with a determination that the detected change is associated with a location above the first subset of graphical representations, wherein the location above the first subset of graphical representations is a location in the collection that is not currently displayed:
            configure a layout of a second subset of graphical representations of data objects in the collection, wherein the second subset of graphical representations does not include any graphical representations of the first subset of graphical representations in accordance with the detected change in the collection, so that one or more graphical representations above the first subset of graphical representations are arranged in a first direction starting from an anchor in the first subset of graphical representations; and
            maintain the display of the first subset of graphical representations on the display in the same arrangement as before the detected change; and
        in accordance with a determination that the detected change is associated with a location after the anchor and in the first subset of graphical representations:
            configure a layout of graphical representations in accordance with the detected change, so that one or more graphical representations after the anchor in the first subset of graphical representations are arranged in a second direction starting from the anchor in the first subset of graphical representations, wherein the second direction is different from the first direction.

2. The non-transitory computer-readable storage medium of claim 1, further comprising instructions to cause the device to:
    after determining that the detected change in the collection is associated with a location above the first subset of graphical representations:
        detect an input corresponding to a request to scroll the display to display one or more graphical representations above the first subset; and
        in response to detecting the input corresponding to a request to scroll the display to display one or more graphical representations above the first subset:
            display, on the display, the one or more graphical representations above the first subset in accordance with the detected input, wherein the one or more graphical representations are arranged in the first direction starting from the anchor in the first subset.

3. The non-transitory computer-readable storage medium of claim 1, further comprising instructions to cause the device to:
    in response to detecting the change in the collection of data objects:
        in accordance with a determination that the detected change in the collection is associated with a location below the first subset of graphical representations:
            configure a layout of graphical representations in accordance with the detected change in the collection, so that graphical representations below the first subset are arranged in the second direction starting from the anchor in the first subset; and
            maintain the display of the first subset of graphical representations on the display.

4. The non-transitory computer-readable storage medium of claim 1, further comprising instructions to cause the device to:
    after determining that the detected change in the collection is associated with a location below the first subset of graphical representations:
        detect an input corresponding to a request to scroll the display to display one or more graphical representations below the first subset; and
        in response to detecting the input corresponding to a request to scroll the display to display one or more graphical representations below the first subset:
            display, on the display, the one or more graphical representations below the first subset in accordance with the detected input, wherein the one or more graphical representations below the first subset are arranged in the second direction starting from the anchor in the first subset.

5. The non-transitory computer-readable storage medium of claim 1, wherein the second direction is opposite the first direction.

6. The non-transitory computer-readable storage medium of claim 1, wherein:
    graphical representations arranged in the first direction represent the graphical representations arranged in a direction from bottom right to top left in a plurality of columns and rows; and
    graphical representations arranged in the second direction represent the graphical representations arranged in a direction from top left to bottom right in a plurality of columns and rows.

7. The non-transitory computer-readable storage medium of claim 1, further comprising:
    in accordance with a determination that the detected change in the collection is associated with a location after the anchor in the first subset of graphical representations:
        display, on the display, animation of moving graphical representations in the first subset.

8. The non-transitory computer-readable storage medium of claim 1, further comprising:
    in accordance with a determination that the detected change in the collection is associated with a location after the anchor in the first subset of graphical representations:
        maintain the display of graphical representation of data object corresponding to the anchor in the first subset.

9. The non-transitory computer-readable storage medium of claim 1, wherein the anchor is a graphical representation in the first subset of graphical representations that is displayed in a predetermined position in a window on the display.

10. The non-transitory computer-readable storage medium of claim 9, wherein the predetermined position is a top left area in the window on the display.

11. The non-transitory computer-readable storage medium of claim 1, wherein the anchor changes when the display is scrolled to display a new subset of graphical representations different from the first subset of graphical representations.

12. The non-transitory computer-readable storage medium of claim 1, wherein the detected change in the collection of data objects is an addition of a data object in the collection or deletion of a data object from the collection.

13. The non-transitory computer-readable storage medium of claim 12, wherein a position associated with the detected change is a position of graphical representation of the added data object in the collection, or a position of graphical representation of the deleted data object from the collection.

14. The non-transitory computer-readable storage medium of claim 1, wherein:
while displaying the first subset of graphical representations and prior to detecting the change in the collection:
the graphical representations are arranged in a plurality of columns and rows, and
a number of graphical representations above the first subset is evenly divisible by a number of columns in the plurality of columns; and
after detecting the change in the collection:
the number of graphical representations above the first subset changes to be not evenly divisible by the number of columns.

15. The non-transitory computer-readable storage medium of claim 1, further comprising:
while displaying the first subset of graphical representations, detecting a change in display properties associated with the display of the first subset; and
in response to detecting the change in display properties associated with the display of the first subset:
configure a layout of graphical representations in accordance with the detected change in display properties, so that graphical representations after the anchor in the first subset are arranged in the second direction starting from the anchor in the first subset, and graphical representations before the anchor in the first subset are arranged in the first direction starting from the anchor in the first subset.

16. The non-transitory computer-readable storage medium of claim 15, wherein:
while displaying the first subset of graphical representations and prior to detecting the change in display properties associated with the display of the first subset:
the graphical representations are arranged in a plurality of columns and rows having a first number of columns, and the number of graphical representations above the first subset is evenly divisible by the first number; and
after detecting the change in display properties associated with the display of the first subset:
the graphical representations are arranged in a plurality of columns and rows having a second number of columns, and the number of graphical representations above the first subset is not evenly divisible by the second number.

17. The non-transitory computer-readable storage medium of claim 16, wherein:
detecting the change in display properties associated with the display of the first subset of graphical representations comprises detecting:
a request to enlarge or shrink one or more graphical representations in the first subset displayed on the display;
a request to increase or decrease the number of graphical representations in the first subset displayed on the display; and
a request to change a size or shape of a window used to display the first subset of graphical representations on the display.

18. The non-transitory computer-readable storage medium of claim 14, wherein the detected change in display properties associated with the display of the first subset of graphical representations is made on the electronic device.

19. The non-transitory computer-readable storage medium of claim 1, wherein the collection of data objects is stored in a device different than the electronic device.

20. The non-transitory computer-readable storage medium of claim 1, wherein the change in the collection is made on a device remote from the electronic device, and the electronic device detects the change in the collection via a network.

21. A method, comprising:
at an electronic device with a display:
displaying, on the display, a first subset of graphical representations of data objects in a collection, wherein the graphical representations of data objects in the collection are arranged in an order;
while displaying the first subset of graphical representations, detecting a change in the collection of data objects;
in response to detecting the change in the collection of data objects:
in accordance with a determination that the detected change is associated with a location above the first subset of graphical representations, wherein the location above the first subset of graphical representations is a location in the collection that is not currently displayed:
configuring a layout of a second subset of graphical representations of data objects in the collection, wherein the second subset of graphical representations does not include any graphical representations of the first subset of graphical representations in accordance with the detected change in the collection, so that one or more graphical representations above the first subset of graphical representations are arranged in a first direction starting from an anchor in the first subset of graphical representations; and
maintaining the display of the first subset of graphical representations on the display in the same arrangement as before the detected change; and
in accordance with a determination that the detected change is associated with a location after the anchor and in the first subset of graphical representations:
configuring a layout of graphical representations in accordance with the detected change; so that one or more graphical representations after the anchor in the first subset of graphical representations are arranged in a second direction starting from the anchor in the first subset of graphical representations, wherein the second direction is different from the first direction.

22. An electronic device, comprising:
a display; and
one or more processors coupled to the display, the one or more processors configured to:
  display, on the display, a first subset of graphical representations of data objects in a collection, wherein the graphical representations of data objects in the collection are arranged in an order;
  while displaying the first subset of graphical representations; detecting a change in the collection of data objects;
  in response to detecting the change in the collection of data objects:
    in accordance with a determination that the detected change is associated with a location above the first subset of graphical representations, wherein the location above the first subset of graphical representations is a location in the collection that is not currently displayed:
      configure a layout of a second subset of graphical representations of data objects in the collection, wherein the second subset of graphical representations does not include any graphical representations of the first subset of graphical representations in accordance with the detected change in the collection, so that one or more graphical representations above the first subset of graphical representations are arranged in a first direction starting from an anchor in the first subset of graphical representations; and
      maintain the display of the first subset of graphical representations on the display in the same arrangement as before the detected change; and
    in accordance with a determination that the detected change is associated with a location after the anchor and in the first subset of graphical representations:
      configure a layout of graphical representations in accordance with the detected change, so that one or more graphical representations after the anchor in the first subset of graphical representations are arranged in a second direction starting from the anchor in the first subset of graphical representations, wherein the second direction is different from the first direction.

23. The method of claim 21, further comprising:
after determining that the detected change in the collection is associated with a location above the first subset of graphical representations:
  detecting an input corresponding to a request to scroll the display to display one or more graphical representations above the first subset; and
  in response to detecting the input corresponding to a request to scroll the display to display one or more graphical representations above the first subset:
    displaying, on the display, the one or more graphical representations above the first subset in accordance with the detected input, wherein the one or more graphical representations are arranged in the first direction starting from the anchor in the first subset.

24. The method of claim 21, further comprising:
in response to detecting the change in the collection of data objects:
  in accordance with a determination that the detected change in the collection is associated with a location below the first subset of graphical representations:
    configuring a layout of graphical representations in accordance with the detected change in the collection, so that graphical representations below the first subset are arranged in the second direction starting from the anchor in the first subset; and
    maintaining the display of the first subset of graphical representations on the display.

25. The method of claim 21, further comprising:
after determining that the detected change in the collection is associated with a location below the first subset of graphical representations:
  detecting an input corresponding to a request to scroll the display to display one or more graphical representations below the first subset; and
  in response to detecting the input corresponding to a request to scroll the display to display one or more graphical representations below the first subset:
    displaying, on the display, the one or more graphical representations below the first subset in accordance with the detected input, wherein the one or more graphical representations below the first subset are arranged in the second direction starting from the anchor in the first subset.

26. The method of claim 21, wherein the second direction is opposite the first direction.

27. The method of claim 21, wherein:
graphical representations arranged in the first direction represent the graphical representations arranged in a direction from bottom right to top left in a plurality of columns and rows; and
graphical representations arranged in the second direction represent the graphical representations arranged in a direction from top left to bottom right in a plurality of columns and rows.

28. The method of claim 21, further comprising:
in accordance with a determination that the detected change in the collection is associated with a location after the anchor in the first subset of graphical representations:
  displaying, on the display, animation of moving graphical representations in the first subset.

29. The method of claim 21, further comprising:
in accordance with a determination that the detected change in the collection is associated with a location after the anchor in the first subset of graphical representations:
  maintaining the display of graphical representation of data object corresponding to the anchor in the first subset.

30. The method of claim 21, wherein the anchor is a graphical representation in the first subset of graphical representations that is displayed in a predetermined position in a window on the display.

31. The method of claim 30, wherein the predetermined position is a top left area in the window on the display.

32. The method of claim 21, wherein the anchor changes when the display is scrolled to display a new subset of graphical representations different from the first subset of graphical representations.

33. The method of claim 21, wherein the detected change in the collection of data objects is an addition of a data object in the collection or deletion of a data object from the collection.

34. The method of claim 33, wherein a position associated with the detected change is a position of graphical representation of the added data object in the collection, or a position of graphical representation of the deleted data object from the collection.

35. The method of claim 21, wherein:
while displaying the first subset of graphical representations and prior to detecting the change in the collection:
the graphical representations are arranged in a plurality of columns and rows, and
a number of graphical representations above the first subset is evenly divisible by a number of columns in the plurality of columns; and
after detecting the change in the collection:
the number of graphical representations above the first subset changes to be not evenly divisible by the number of columns.

36. The method of claim 21, further comprising:
while displaying the first subset of graphical representations, detecting a change in display properties associated with the display of the first subset; and
in response to detecting the change in display properties associated with the display of the first subset:
configuring a layout of graphical representations in accordance with the detected change in display properties, so that graphical representations after the anchor in the first subset are arranged in the second direction starting from the anchor in the first subset, and graphical representations before the anchor in the first subset are arranged in the first direction starting from the anchor in the first subset.

37. The method of claim 36, wherein:
while displaying the first subset of graphical representations and prior to detecting the change in display properties associated with the display of the first subset:
the graphical representations are arranged in a plurality of columns and rows having a first number of columns, and the number of graphical representations above the first subset is evenly divisible by the first number; and
after detecting the change in display properties associated with the display of the first subset:
the graphical representations are arranged in a plurality of columns and rows having a second number of columns, and the number of graphical representations above the first subset is not evenly divisible by the second number.

38. The method of claim 37, wherein:
detecting the change in display properties associated with the display of the first subset of graphical representations comprises detecting:
a request to enlarge or shrink one or more graphical representations in the first subset displayed on the display;
a request to increase or decrease the number of graphical representations in the first subset displayed on the display; and
a request to change a size or shape of a window used to display the first subset of graphical representations on the display.

39. The method of claim 35, wherein the detected change in display properties associated with the display of the first subset of graphical representations is made on the electronic device.

40. The method of claim 21, wherein the collection of data objects is stored in a device different than the electronic device.

41. The method of claim 21, wherein the change in the collection is made on a device remote from the electronic device, and the electronic device detects the change in the collection via a network.

42. The electronic device of claim 22, the one or more processors further configured to:
after determining that the detected change in the collection is associated with a location above the first subset of graphical representations:
detect an input corresponding to a request to scroll the display to display one or more graphical representations above the first subset; and
in response to detecting the input corresponding to a request to scroll the display to display one or more graphical representations above the first subset:
display, on the display, the one or more graphical representations above the first subset in accordance with the detected input, wherein the one or more graphical representations are arranged in the first direction starting from the anchor in the first subset.

43. The electronic device of claim 22, the one or more processors further configured to:
in response to detecting the change in the collection of data objects:
in accordance with a determination that the detected change in the collection is associated with a location below the first subset of graphical representations:
configure a layout of graphical representations in accordance with the detected change in the collection, so that graphical representations below the first subset are arranged in the second direction starting from the anchor in the first subset; and
maintain the display of the first subset of graphical representations on the display.

44. The electronic device of claim 22, the one or more processors further configured to:
after determining that the detected change in the collection is associated with a location below the first subset of graphical representations:
detect an input corresponding to a request to scroll the display to display one or more graphical representations below the first subset; and
in response to detecting the input corresponding to a request to scroll the display to display one or more graphical representations below the first subset:
display, on the display, the one or more graphical representations below the first subset in accordance with the detected input, wherein the one or more graphical representations below the first subset are arranged in the second direction starting from the anchor in the subset.

45. The electronic device of claim therein the second direction is opposite the first direction.

46. The electronic device of claim 22, wherein:
graphical representations arranged in the first direction represent the graphical representations arranged in a direction from bottom right to top left in a plurality of columns and rows; and
graphical representations arranged in the second direction represent the graphical representations arranged in a direction from top left to bottom right in a plurality of columns and rows.

47. The electronic device of claim 22, the one or more processors further configured to:

in accordance with a determination that the detected change in the collection is associated with a location after the anchor in the first subset of graphical representations:
  display, on the display, animation of moving graphical representations in the first subset.

48. The electronic device of claim 22, the one or more processors further configured to:
in accordance with a determination that the detected change in the collection is associated with a location after the anchor in the first subset of graphical representations:
  maintain the display of graphical representation of data object corresponding to the anchor in the first subset.

49. The electronic device of claim 22, wherein the anchor is a graphical representation in the first subset of graphical representations that is displayed in a predetermined position in a window on the display.

50. The electronic device of claim 49, wherein the predetermined position is a top left area in the window on the display.

51. The electronic device of claim 22, wherein the anchor changes when the display is scrolled to display a new subset of graphical representations different from the first subset of graphical representations.

52. The electronic device of claim 22, wherein the detected change in the collection of data objects is an addition of a data object in the collection or deletion of a data object from the collection.

53. The electronic device of claim 52, wherein a position associated with the detected change is a position of graphical representation of the added data object in the collection, or a position of graphical representation of the deleted data object from the collection.

54. The electronic device of claim 22, wherein:
while displaying the first subset of graphical representations and prior to detecting the change in the collection:
  the graphical representations are arranged in a plurality of columns and rows, and
  a number of graphical representations above the first subset is evenly divisible by a number of columns in the plurality of columns; and
after detecting the change in the collection:
  the number of graphical representations above the first subset changes to be not evenly divisible by the number of columns.

55. The electronic device of claim 22, the one or more processors further configured to:
while displaying the first subset of graphical representations, detecting a change in display properties associated with the display of the first subset; and
in response to detecting the change in display properties associated with the display of the first subset:
  configure a layout of graphical representations in accordance with the detected change in display properties, so that graphical representations after the anchor in the first subset are arranged in the second direction starting from the anchor in the first subset, and graphical representations before the anchor in the first subset are arranged in the first direction starting from the anchor in the first subset.

56. The electronic device of claim 55, wherein:
while displaying the first subset of graphical representations and prior to detecting the change in display properties associated with the display of the first subset:
  the graphical representations are arranged in a plurality of columns and rows having a first number of columns, and the number of graphical representations above the first subset is evenly divisible by the first number; and
after detecting the change in display properties associated with the display of the first subset:
  the graphical representations are arranged in a plurality of columns and rows having a second number of columns, and the number of graphical representations above the first subset is not evenly divisible by the second number.

57. The electronic device of claim 56, wherein:
detecting the change in display properties associated with the display of the first subset of graphical representations comprises detecting:
  a request to enlarge or shrink one or more graphical representations in the first subset displayed on the display;
  a request to increase or decrease the number of graphical representations in the first subset displayed on the display; and
  a request to change a size or shape of a window used to display the first subset of graphical representations on the display.

58. The electronic device of claim 54, wherein the detected change in display properties associated with the display of the first subset of graphical representations is made on the electronic device.

59. The electronic device of claim 22, wherein the collection of data objects is stored in a device different than the electronic device.

60. The electronic device of claim 22 wherein the change in the collection is made on a device remote from the electronic device, and the electronic device detects the change in the collection via a network.

* * * * *

UNITED STATES PATENT AND TRADEMARK OFFICE
CERTIFICATE OF CORRECTION

PATENT NO. : 10,761,712 B2
APPLICATION NO. : 15/660759
DATED : September 1, 2020
INVENTOR(S) : Michael Cohen et al.

Page 1 of 1

It is certified that error appears in the above-identified patent and that said Letters Patent is hereby corrected as shown below:

In the Claims

In Column 62, Line 64, Claim 21, delete "change;" and insert -- change, --, therefor.

In Column 63, Line 12-13, Claim 22, delete "representations;" and insert -- representations, --, therefor.

In Column 66, Line 54, Claim 44, before "subset." insert -- first --.

In Column 66, Line 55, Claim 45, delete "therein" and insert -- 22, wherein --, therefor.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*